US009191202B2

(12) United States Patent
Isozaki et al.

(10) Patent No.: US 9,191,202 B2
(45) Date of Patent: Nov. 17, 2015

(54) INFORMATION PROCESSING DEVICE AND COMPUTER PROGRAM PRODUCT

(71) Applicant: Kabushiki Kaisha Toshiba, Minato-ku (JP)

(72) Inventors: Hiroshi Isozaki, Kawasaki (JP); Jun Kanai, Fuchu (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 4 days.

(21) Appl. No.: 14/150,157

(22) Filed: Jan. 8, 2014

(65) Prior Publication Data

US 2014/0298026 A1 Oct. 2, 2014

(30) Foreign Application Priority Data

Mar. 26, 2013 (JP) ................................. 2013-065227

(51) Int. Cl.
*G06F 21/00* (2013.01)
*H04L 9/08* (2006.01)
*G06F 21/60* (2013.01)
*G06F 21/53* (2013.01)
*H04L 9/32* (2006.01)
*G06F 21/62* (2013.01)
*G06F 21/70* (2013.01)

(52) U.S. Cl.
CPC .............. *H04L 9/0825* (2013.01); *G06F 21/53* (2013.01); *G06F 21/604* (2013.01); *G06F 21/6281* (2013.01); *H04L 9/0822* (2013.01); *H04L 9/0897* (2013.01); *H04L 9/3234* (2013.01); *H04L 9/3236* (2013.01); *H04L 9/3247* (2013.01); *G06F 21/70* (2013.01)

(58) Field of Classification Search
CPC .......... G06F 21/50; G06F 21/53; G06F 21/57; G06F 21/21; G06F 21/575; G06F 21/70; G06F 21/71
See application file for complete search history.

(56) References Cited

U.S. PATENT DOCUMENTS

2011/0044451 A1* 2/2011 Anzai et al. ..................... 380/45

FOREIGN PATENT DOCUMENTS

JP 2008-135004 A 6/2008

OTHER PUBLICATIONS

U.S. Appl. No. 14/012,127, filed Aug. 28, 2013, Hiroshi Isozaki.
U.S. Appl. No. 14/014,962, filed Aug. 30, 2013, Hiroshi Isozaki.
ARM Limited, "ARM Security Technology, Building a Secure System using TrustZone Technology", PRD29-GENC-009492C, Apr. 2009, 107 pages.
U.S. Appl. No. 14/198,029, filed Mar. 5, 2014, Kanai, et al.

* cited by examiner

*Primary Examiner* — Edward Zee
(74) *Attorney, Agent, or Firm* — Oblon, McClelland, Maier & Neustadt, L.L.P.

(57) ABSTRACT

According to an embodiment, a device includes a processor unit, a control unit, a setting unit, a writing unit, and an executing unit. The processor unit is configured to switch between secure and non-secure modes, read/write data from/to a memory unit, and write an OS execution image of a secure OS unit to the memory unit. The setting unit is configured to set a shared memory area allowing reading and writing in both modes and an execution module memory area allowing reading and writing in the secure mode but not allowing reading or writing in the non-secure mode with respect to the control unit. The writing unit is configured to write an execution module to be executed in the secure OS unit to the shared memory area. The executing unit is configured to execute the execution module that has been written to the execution module memory area.

17 Claims, 36 Drawing Sheets

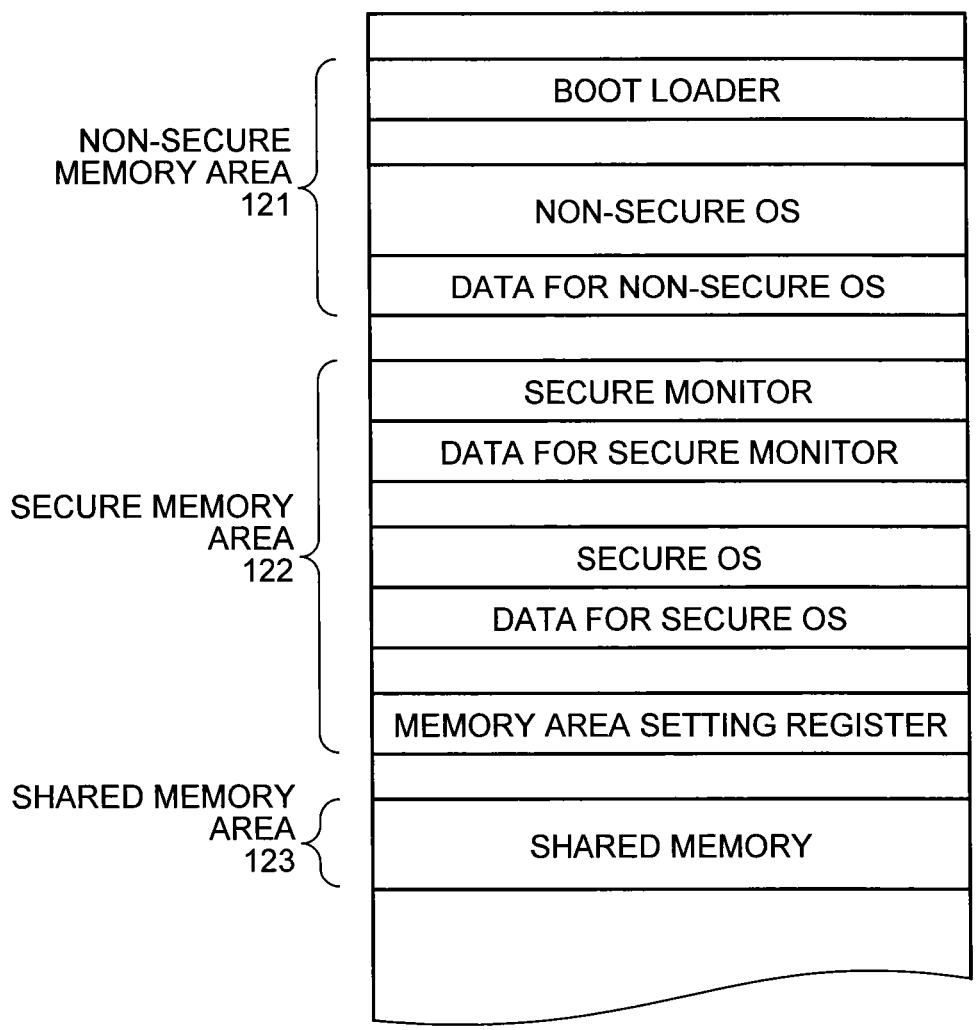

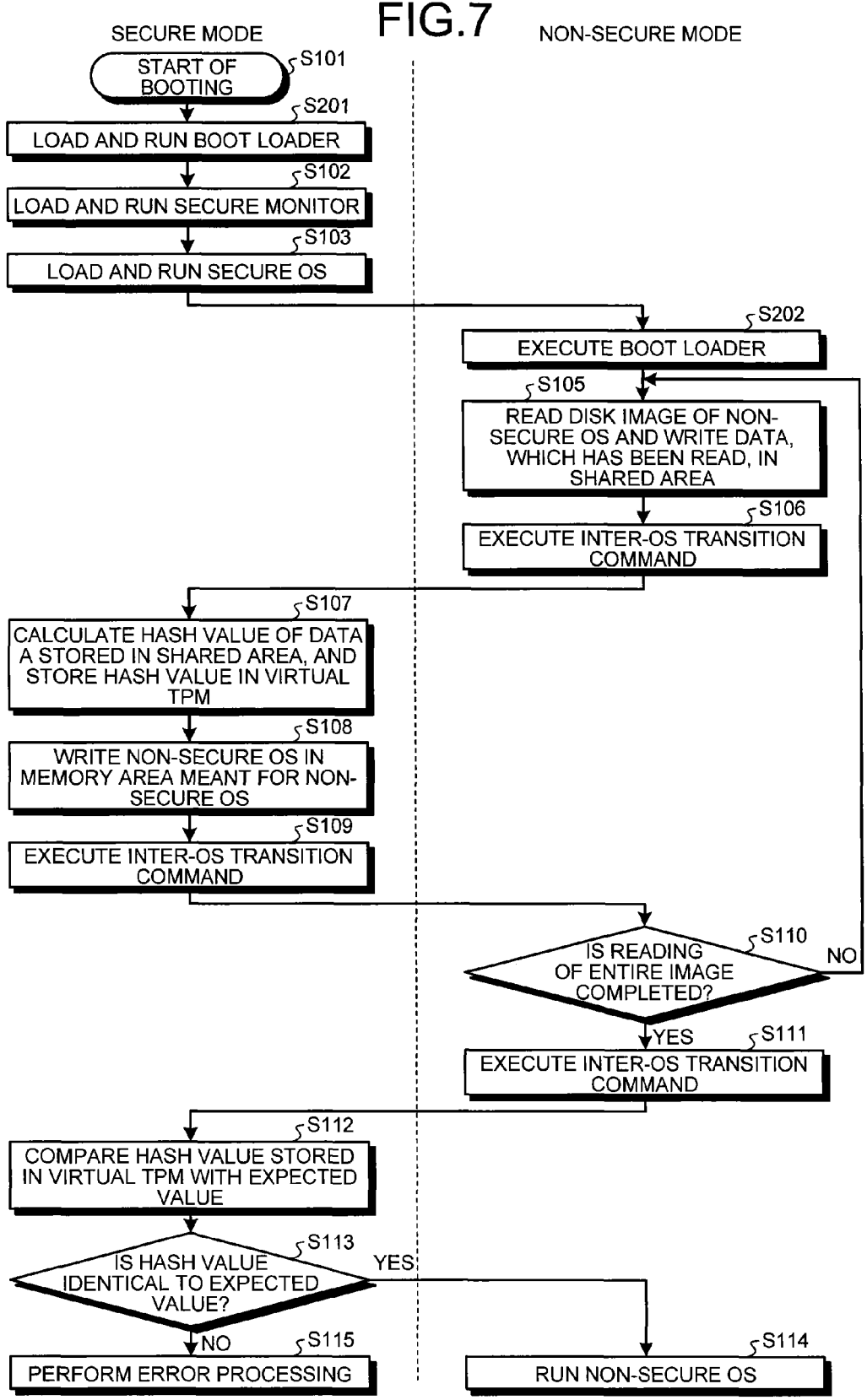

FIG.8

|  | SECURE MODE (ACCESS FOR READING/WRITING) | NON-SECURE MODE ||
|---|---|---|---|
|  |  | ACCESS FOR READING | ACCESS FOR WRITING |
| SECURE MEMORY AREA A | ACCESS ALLOWED | READING NOT ALLOWED | WRITING NOT ALLOWED |
| SECURE MEMORY AREA B | ACCESS ALLOWED | READING ALLOWED | WRITING NOT ALLOWED |
| SHARED MEMORY AREA | ACCESS ALLOWED | READING ALLOWED | WRITING ALLOWED |
| NON-SECURE MEMORY AREA | ACCESS ALLOWED | READING ALLOWED | WRITING ALLOWED |

FIG.9

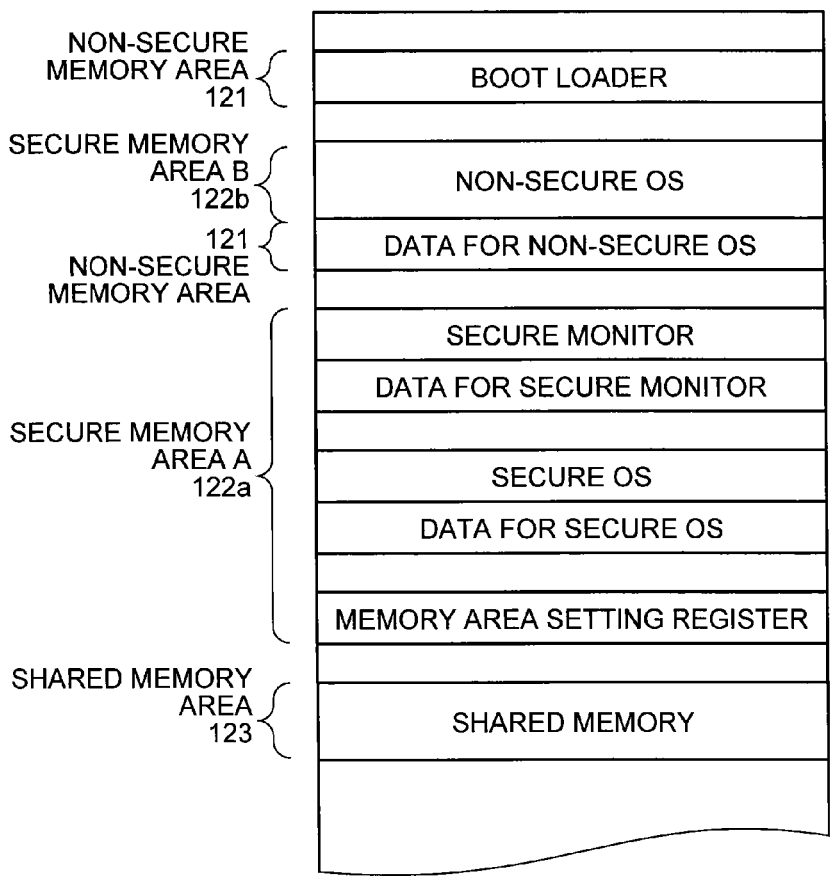

FIG.13

|  | SECURE MODE (ACCESS FOR READING/WRITING) | NON-SECURE MODE | |
| --- | --- | --- | --- |
|  |  | ACCESS FOR READING | ACCESS FOR WRITING |
| SECURE MEMORY AREA A | ACCESS ALLOWED | READING NOT ALLOWED | WRITING NOT ALLOWED |
| SECURE MEMORY AREA B' | ACCESS ALLOWED | READING NOT ALLOWED | WRITING NOT ALLOWED |
| SHARED MEMORY AREA | ACCESS ALLOWED | READING ALLOWED | WRITING ALLOWED |
| NON-SECURE MEMORY AREA | ACCESS ALLOWED | READING ALLOWED | WRITING ALLOWED |

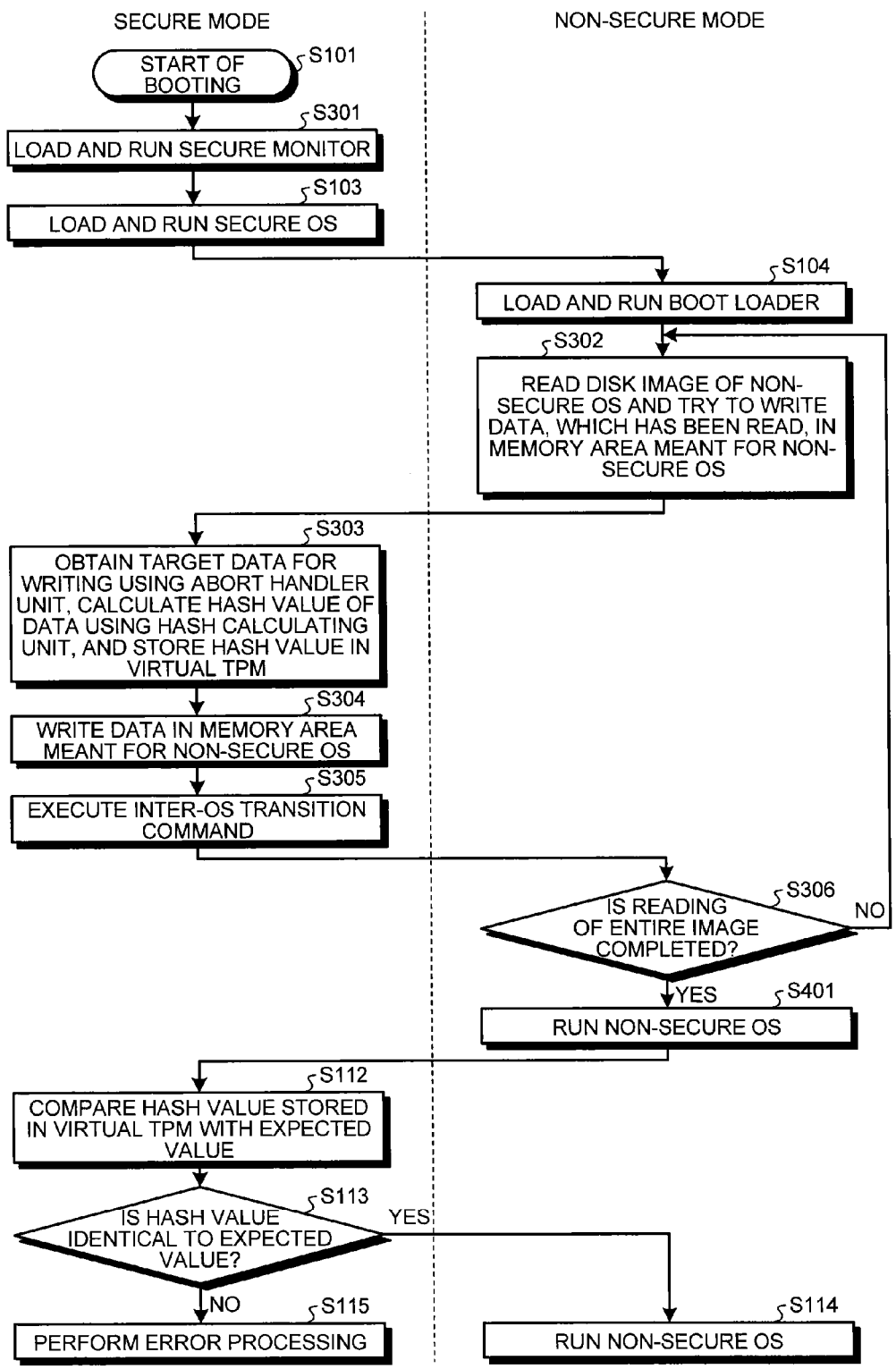

FIG.22

|  | SECURE MODE (ACCESS FOR READING/WRITING) | NON-SECURE MODE ||
| --- | --- | --- | --- |
|  |  | ACCESS FOR READING | ACCESS FOR WRITING |
| SECURE MEMORY AREA A | ACCESS ALLOWED | READING NOT ALLOWED | WRITING NOT ALLOWED |
| SECURE MEMORY AREA C | ACCESS ALLOWED | READING NOT ALLOWED | WRITING ALLOWED |
| SHARED MEMORY AREA | ACCESS ALLOWED | READING ALLOWED | WRITING ALLOWED |
| NON-SECURE MEMORY AREA | ACCESS ALLOWED | READING ALLOWED | WRITING ALLOWED |

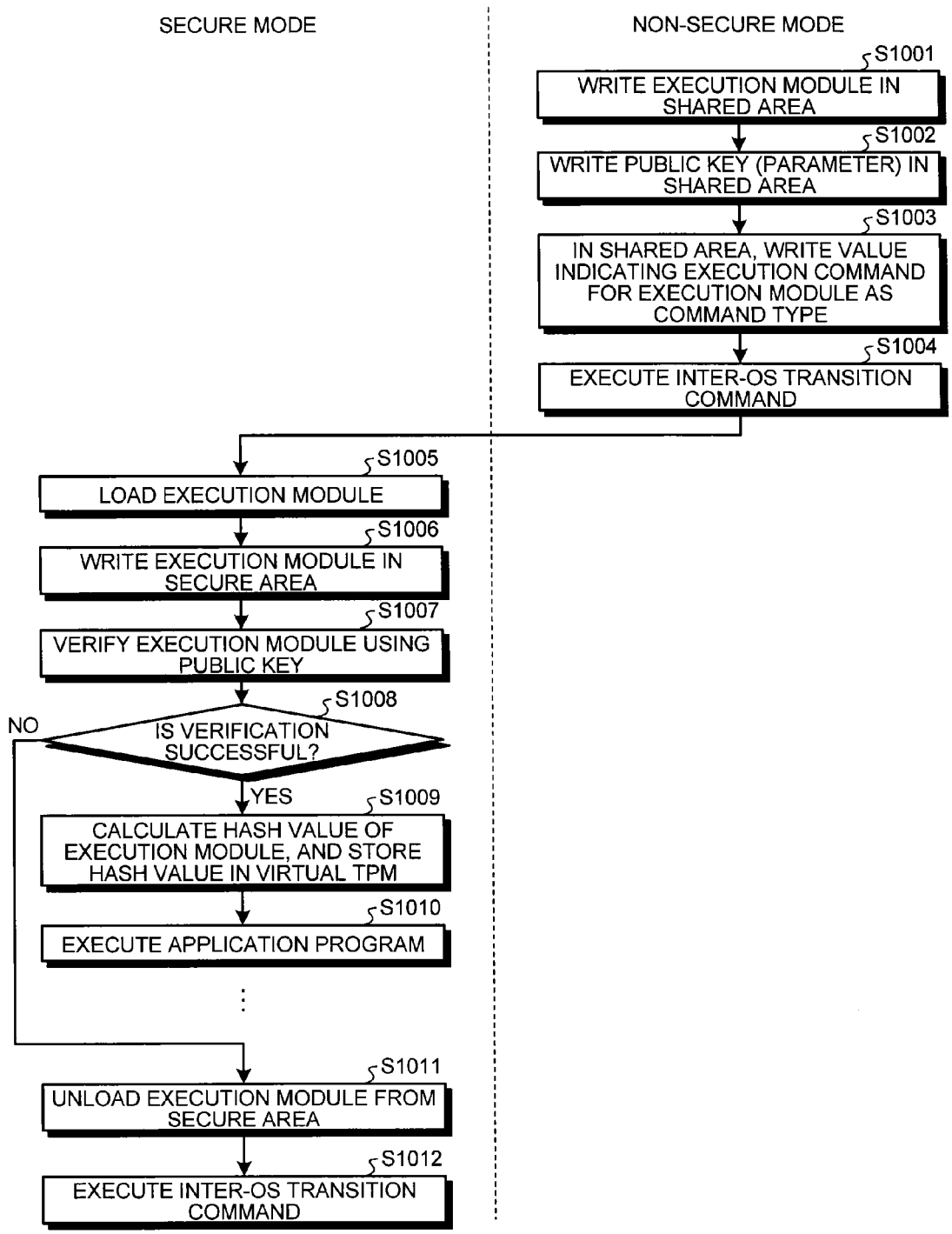

INFORMATION PROCESSING DEVICE AND COMPUTER PROGRAM PRODUCT

CROSS-REFERENCE TO RELATED APPLICATION

This application is based upon and claims the benefit of priority from Japanese Patent Application No. 2013-065227, filed on Mar. 26, 2013; the entire contents of which are incorporated herein by reference.

FIELD

Embodiments described herein relate generally to an information processing device and a computer program product.

BACKGROUND

Typically, in a system implemented as software, there used to be situations demanding prevention of confidential information such as keys from being analyzed or situations demanding prevention of the contents of operations from being altered. As a system capable of addressing such situations, a processor architecture has been proposed in which a main processor is equipped with two modes, namely, a secure mode and a non-secure mode; and computer programs that need to be prevented from attacks such as alteration or analysis are executed in the secure mode, while general-purpose computer programs are executed in the non-secure mode.

In this architecture, in the secure mode and the non-secure mode, separate operating systems (OS) are run as the operating software. That is, operations such as encrypting and decrypting of data are performed either in a secure OS unit that runs in the secure mode or in application software that runs in the secure OS unit. In contrast, general-purpose operations such as reading data from a secondary storage unit are performed either in a non-secure OS unit that runs in the non-secure mode or in application software that runs in the non-secure OS unit. Thus, in this configuration, operations are performed while switching between the secure mode and the non-secure mode as may be necessary.

Moreover, access control is performed with respect to a main memory. Hence, a memory area in the secure OS unit cannot be read or altered from the non-secure OS unit. As a result, even if the non-secure OS unit or an application program running in the non-secure OS unit has bugs (vulnerability) incorporated therein and if an attempt to intercept or alter the data in the secure OS unit or in an application program running in the secure OS unit is made from the software running in the non-secure mode with an improper use of the bugs; it becomes possible to prevent that attempt from succeeding. For that reason, it becomes possible to prevent attacks made to alter the operations that are to be protected or attacks made to obtain the data that is to be protected.

However, although a method was proposed in which the operating systems are separated and memory access from the non-secure mode to the secure mode is prevented, no technology was put into practice so as to prevent an unauthorized non-secure OS unit from being run or to protect data at the time when an application program running in the secure OS unit outputs the data to the outside of the main memory.

BRIEF DESCRIPTION OF THE DRAWINGS

FIG. 3 is a diagram illustrating an example of the memory area of a main memory unit according to the first embodiment;

FIG. 4 is a data structure diagram illustrating the policy about whether or not to allow the access to each type of memory area according to the first embodiment;

FIG. 7 is a flowchart for explaining a boot process of the non-secure OS unit in the information processing device according to a second modification example of the first embodiment;

FIG. 8 is a data structure diagram illustrating the policy about whether or not to allow the access to each type of memory area according to a third modification example of the first embodiment;

FIG. 9 is a diagram illustrating an example of the memory area of the main memory unit according to the third modification example of the first embodiment;

FIG. 13 is a data structure diagram illustrating the policy about whether or not to allow the access to each type of memory area according to the fourth modification example of the first embodiment;

FIG. 14 is a flowchart for explaining a boot process of the non-secure OS unit in the information processing device according to the fourth modification example of the first embodiment;

FIG. 22 is a data structure diagram illustrating the policy about whether or not to allow the access to each type of memory area according to the seventh modification example of the first embodiment;

FIG. 37 is a flowchart for explaining the operations performed at the time of executing an execution module in the non-secure OS unit according to the twelfth modification example of the third embodiment.

DETAILED DESCRIPTION

According to an embodiment, an information processing device includes a main memory unit, a secure OS unit, a main processor unit, an execution module, a non-secure OS unit, an address space control unit, a secure monitor memory setting unit, a shared memory area writing unit, an execution module loading unit, and an application executing unit. The main memory unit is configured to store data. The main processor unit is configured to selectively switch between a secure mode and a non-secure mode, read and write data from and to the main memory unit, and write an OS execution image of the secure OS unit to the main memory unit. The main processor unit includes a state sending unit for sending state information indicating the present mode to a bus. The secure OS unit is executed by the main processor unit in the secure mode. The execution module is configured to be executed by the main processor unit in the secure mode. The non-secure OS unit is configured to be executed by the main processor unit in the non-secure mode. The secure monitor memory setting unit is configured to set a shared memory area and an execution module memory area with respect to the address space control unit. The shared memory allows reading and writing in the secure mode and the non-secure mode of the main processor unit. The execution module memory area allows reading and writing in the secure mode of the main processor unit but does not allow reading or writing in the non-secure mode of the main processor unit. The shared memory area writing unit is configured to write an execution module to be executed in the secure OS unit to the shared memory area of the main memory unit. The execution module loading unit is configured to write the execution module that has been written to the shared memory area, to the execution module memory area. The application executing unit is configured to execute the execution module that has been written to the execution module memory area. The address space control unit is configured to determine the mode of the main processor unit based on the state information received from the bus, and control allowing and disallowing of reading and writing with respect to the main memory unit from the main processor unit according to settings performed by the secure monitor memory unit.

First Embodiment

Figure 1:
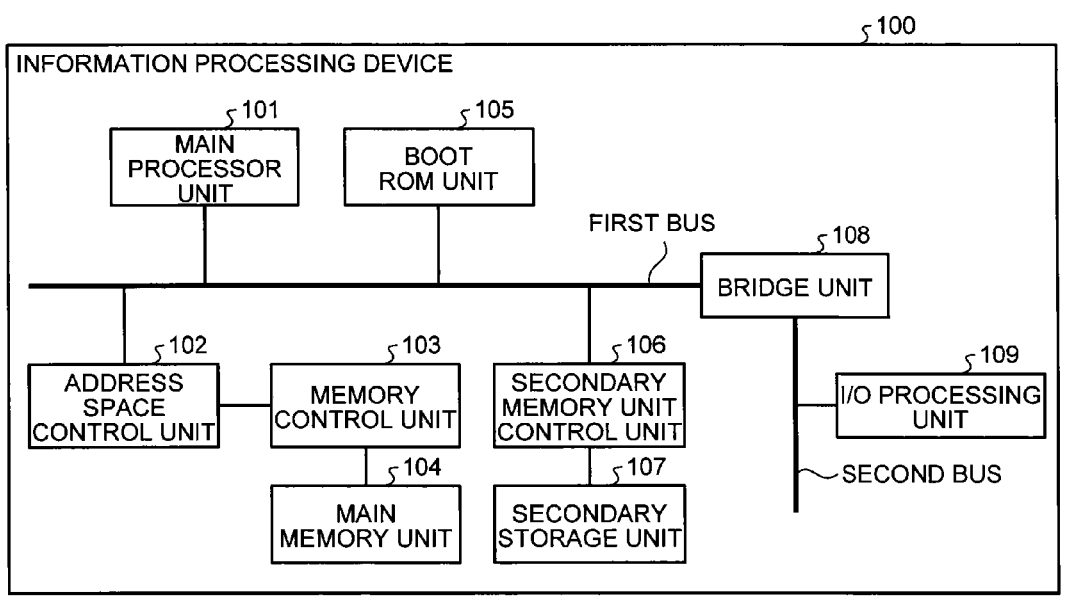
FIG. 1 is a hardware configuration diagram of an information processing device according to a first embodiment.

Exemplary embodiments are explained below in detail with reference to the accompanying drawings. FIG. 1 is a diagram that schematically illustrates a hardware configuration of an information processing device 100 according to a first embodiment. Herein, it is assumed that the information processing device 100 is, for example, a digital television broadcasting receiver, a set top box (STB), or a security camera. In the past, an architecture has been proposed in which the non-secure mode and the secure mode are separated from each other and the operations to be protected are performed in the secure mode. However, there are times when the software running in the non-secure mode also needs to be protected. For example, an attacker may launch what is called a denial of service (DoS) attack in which the contents of the OS running in the non-secure mode are altered and interception is done in such a way that the transition from the non-secure OS unit to the secure OS unit does not occur and the operations to be protected are not performed. Meanwhile, in a legacy system, confidential operations are not assumed to be performed in the secure OS unit, and there can be times when confidential operations are performed in the non-secure OS unit. Meanwhile, since it is common practice to store the non-secure OS unit in a secondary memory device, it is possible to think of an attack in which the information processing device is temporarily terminated, the non-secure OS unit is altered by removing the secondary memory device from the information processing device, and the information processing device is restarted after reinstalling the secondary memory device. In the first embodiment, such an attack can be dealt with.

The information processing device 100 includes a main processor unit 101, an address space control unit 102, a memory control unit 103, a main memory unit 104, a boot ROM unit 105, a secondary storage unit control unit 106, a secondary storage unit 107, a bridge unit 108, and an I/O processing unit 109. The main processor unit 101, the boot ROM unit 105, the address space control unit 102, the secondary storage unit control unit 106, and the bridge unit 108 are interconnected via a first bus. Moreover, the I/O processing unit 109 is connected to the bridge unit 108 via a second bus.

The main processor unit 101 sequentially processes the instructions and the data loaded therein from the main memory unit 104, and stores the processing result in the main memory unit 104. The main processor unit 101 is a general-purpose processor such as an ARM (registered trademark) Cortex-A series processor. The main processor unit 101 has at least two states, namely, a secure mode and a non-secure mode. Thus, the operating state of the main processor unit 101 can be selectively switched between the secure mode and the non-secure mode. That is, the operating software of the main processor unit 101 executes computer programs while alternatively switching between the secure mode and the non-secure mode as may be necessary. Moreover, the main processor unit 101 sends (as a state sending unit) state information, which is at least 1-bit information indicating the present state of the main processor unit 101, to the first bus. Thus, each of the modules that are connected to the first bus can monitor the state information sent to the first bus and identify the present mode of the main processor unit 101. As far as executing computer programs while selectively switching the modes is concerned; it is possible to make use of, for example, the TrsutZone (registered trademark) function, which is a security function of ARM processors.

The main memory unit 104 is a general-purpose main memory device. For example, it is possible to use a dynamic random access memory (DRAM) or a magnetic RAM (MRAM) as the main memory unit 104. The memory control unit 103 receives read/write instructions with respect to the main memory unit 104 as well as receives target data, and controls the refreshing of the main memory unit 104. When the main memory unit 104 is a DRAM; it is assumed that, for example, a DRAM controller is used.

The address space control unit 102 monitors the accesses to the memory control unit 103 from the main processor unit 101 and performs access control for each address range. For example, the setting is performed in advance in such a way that, only when the main processor unit 101 is in the secure mode, it can access a particular address area in the main memory unit 104; and, when the main processor unit 101 is in the non-secure mode, it is not allowed to access that particular address area in the main memory unit 104. When that specified particular address area is accessed by the main processor unit 101, the address space control unit 102 identifies whether the main processor unit 101 is in the secure mode or the non-secure mode by referring to the state information sent to the first bus. If the main processor unit 101 is in the secure mode, then the address space control unit 102 allows the access. In contrast, if the main processor unit 101 is not in the secure mode, then the address space control unit 102 does not allow the access and sends an exception signal (a fault signal or an abort signal) as an interrupt signal to the main processor unit 101. Meanwhile, the method by which the address space control unit 102 sets memory areas in the main memory unit 104 is described later.

The boot ROM unit 105 is used to store the program code required at the time of booting the information processing device 100. Once the information processing device 100 is booted, firstly it calls the computer programs from the boot ROM unit 105 and starts executing those computer programs. Since the boot ROM unit is a read only memory (ROM), it is not possible to rewrite the contents that have been written therein at the time of shipment.

The secondary storage unit 107 is a nonvolatile memory having a larger storage capacity as compared to the storage capacity of the main memory unit 104. For example, it is possible to use a magnetic disk or a flash memory as the secondary storage unit 107. Based on an instruction issued by the main processor unit 101, the secondary storage unit control unit 106 receives read/write instructions with respect to the main memory unit 104 as well as receives target data; and controls reading/writing of data with respect to the secondary storage unit 107. When the secondary storage unit 107 is a flash memory; it is assumed that, for example, a flash memory controller is used.

The bridge unit 108 is a bridge controller that connects the first bus to the second bus. The first bus is assumed to have, for example, the AXI specifications (AXI stands for Advance eXtensible Interface); and the second bus is assumed to be based on, for example, the APB standard (APB stands for Advance Peripheral Bus).

The I/O processing unit 109 establishes connection with input-output devices such as a mouse and a keyboard, and controls the input-output devices. When an input is received from the keyboard or the mouse, the I/O processing unit 109 sends that output as an interrupt signal to the main processor unit 101 via the bridge unit 108.

Figure 2:
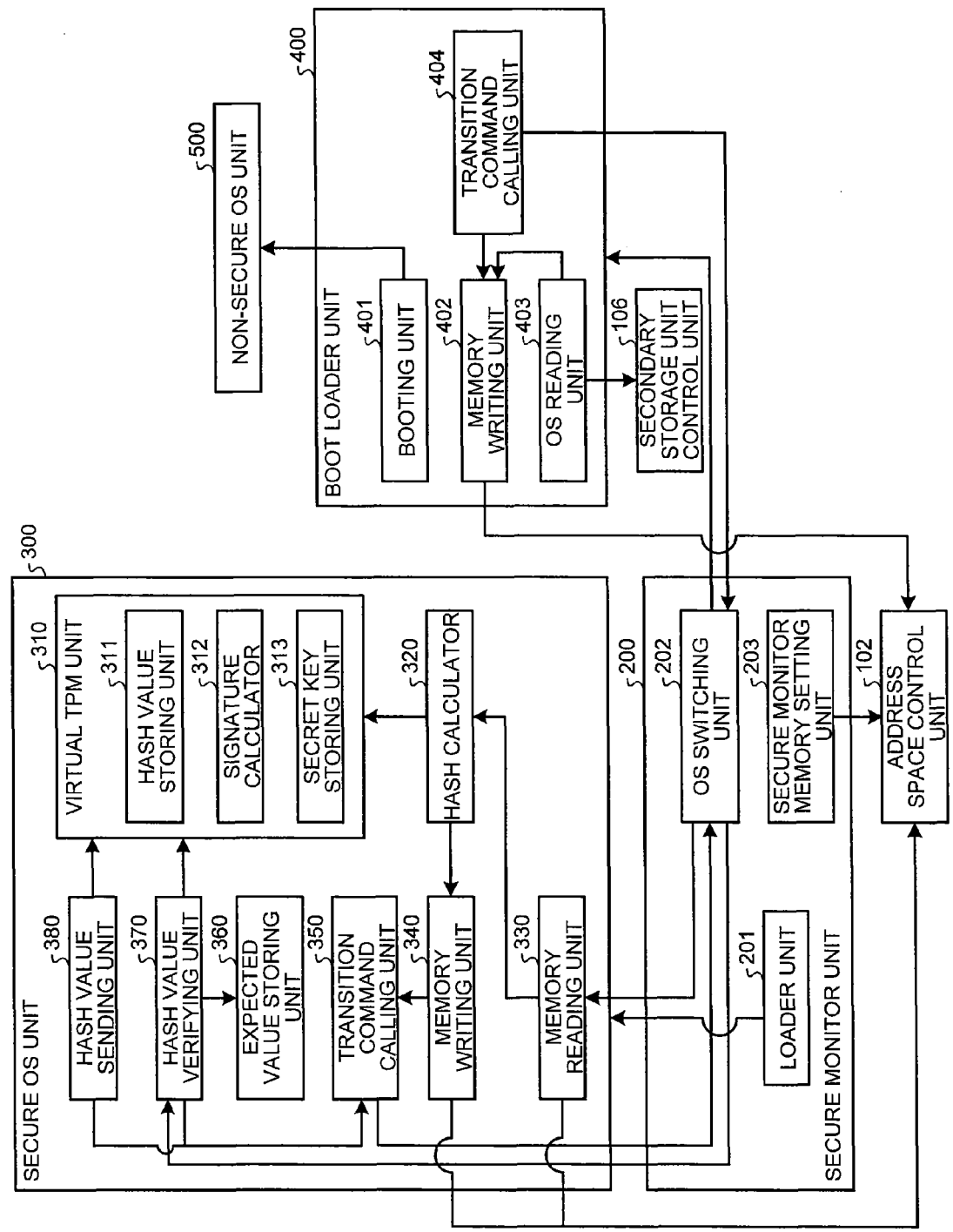
FIG. 2 is a functional configuration diagram of software components running in a main processor unit according to the first embodiment.

FIG. 2 is a diagram illustrating an exemplary configuration of software components running in the main processor unit 101. As illustrated in FIG. 2, the software components include a secure monitor unit 200, a secure OS unit 300, a boot loader unit 400, and a non-secure OS unit 500. Meanwhile, although the hardware components such as the address space control unit 102 and the secondary storage unit control unit 106 are illustrated, FIG. 2 essentially illustrates the software configuration.

The main processor unit 101 implements the software components while selectively switching between the secure mode and the non-secure mode. The OS that operates in the secure mode is the secure OS unit 300, while the OS that operates in the non-secure mode is the non-secure OS unit 500.

The secure monitor unit 200 switches between the secure OS unit 300 and the non-secure OS unit 500. Moreover, at the time of running, the secure monitor unit 200 loads and executes the secure OS unit 300. Herein, the secure OS unit 300 is the OS that operates in the secure mode.

The non-secure OS unit 500 is the OS that operates in the non-secure mode. Herein, it is assumed that the non-secure OS unit 500 is a general-purpose operating system such as Linux (registered trademark). The boot loader unit 400 reads the non-secure OS unit 500 from the secondary storage unit 107, loads it in the main memory unit 104, and starts executing it. Herein, it is assumed that the boot loader unit 400 is executed in the non-secure mode.

The secure monitor unit 200 includes a loader unit 201, an OS switching unit 202, and a secure monitor memory setting unit 203. The loader unit 201 loads the secure OS unit 300, which is stored as a file in the secondary storage unit 107 or the boot ROM unit 105, and executes the secure OS unit 300.

The OS switching unit 202 selectively switches the operating state of the main processor unit 101 between the secure mode and the non-secure mode. The operating state can be switched at the timing at which an explicit switch command is issued from the secure OS unit 300 or the non-secure OS unit 500, or at the timing at which an interrupt signal is received from a timer or an external module. When the secure OS unit 300 issues an explicit switch command, the main processor unit 101 transfers operations from the secure OS unit 300 to the OS switching unit 202 of the secure monitor unit 200. Then, the operating state is switched to the non-secure OS unit 500.

When an explicit switch command is received from the non-secure OS unit 500, the main processor unit 101 transfers the operations from the non-secure OS unit 500 to the OS switching unit 202 of the secure monitor unit 200. Thus, the operating state is switched to the secure OS unit 300. At the time of such switching, the OS switching unit 202 stores the state (context) of the pre-switching OS in the main memory unit 104 with the aim of enabling restoration to the original pre-switching state. For example, in the case of switching from the non-secure OS unit 500 to the secure OS unit 300; the OS switching unit 202 saves the register values, that is, the context being used by the non-secure OS unit 500 in a predetermined memory area managed by the secure monitor unit 200, and then executes the secure OS unit 300.

At the time of switching back from the secure OS unit 300 to the non-secure OS unit 500; the OS switching unit 202 restores the saved context of the non-secure OS unit 500 in the register. In an identical manner, in the case of switching from the secure OS unit 300 to the non-secure OS unit 500; saving and restoration of the context is performed in an identical manner. Meanwhile, at the time of switching from the secure OS unit 300 to the non-secure OS unit 500, in order to prevent a situation in which the non-secure OS unit 500, to which the operating state has been switched, refers to the values in the register and reads the state of execution in the secure OS unit 300; it is desirable that the OS switching unit 202 clears the values in the register that were being used by the secure OS unit 300.

In the case of switching the operating state using an interrupt signal from a timer or an external module, the OS switching unit 202 is instructed in advance about the target mode for switching. For example, assume that an exception signal is sent from the address space control unit 102. In that case, if the main processor unit 101 is in the secure mode, an interrupt handler of the secure OS unit 300 is executed. In contrast, if the main processor unit 101 is in the non-secure mode, the operating state is switched in a forcible manner and the interrupt handler of the secure OS unit 300 is executed.

The secure monitor memory setting unit 203 sets memory areas in the main memory unit 104, and performs access control setting with respect to each memory area.

FIG. 3 is a diagram illustrating an example in which the secure monitor memory setting unit 203 segments the memory area of the main memory unit 104. The setting for such segmentation is done by the secure monitor memory setting unit 203 as part of the operations performed during the device boot process. The memory area of the main memory unit 104 is segmented into a non-secure memory area 121, a secure memory area 122, and a shared memory area 123. The secure memory area 122 is used to store the secure OS (i.e., an OS execution image of the secure OS), secure OS data, a memory area setting register, the secure monitor (i.e., an OS execution image of the secure monitor), and secure monitor data. The shared memory area 123 is used to store the data that needs to be accessed from the secure mode as well as from the non-secure mode. Moreover, the non-secure memory area 121 is used to store the non-secure OS unit 500 (i.e., an execution image of the non-secure OS), OS data for the non-secure OS unit 500, and the boot loader (i.e., an OS execution image of the boot loader). Herein, OS data points to a variety of data (including the context) that is used by the corresponding OS. Meanwhile, unless explicitly explained, the interspaces between memory areas are assumed to be the non-secure memory area 121. Moreover, the execution image of an OS points to a binary image for the purpose of executing that OS.

FIG. 4 is a diagram illustrating the policy about whether or not to allow the access to each type of memory area of the main memory unit 104. The setting for such access control is done by the secure monitor memory setting unit 203 as part of the operations performed during the device boot process. In the example illustrated in FIG. 4, in the secure mode of the main processor unit 101, the software running in the main processor unit 101 is allowed to access each of the secure memory area 122, the shared memory area 123, and the non-secure memory area 121. That is, the secure OS unit 300 can access the secure memory area 122, the shared memory area 123, as well as the non-secure memory area 121.

In the non-secure mode, the main processor unit 101 is not allowed to access the secure memory area 122 of the main memory unit 104, but is allowed to access the shared memory area 123 and the non-secure memory area 121 of the main memory unit 104. That is, the non-secure OS unit 500 cannot access the secure memory area 122 of the main memory unit 104, but is allowed to access the shared memory area 123 and the non-secure memory area 121 of the main memory unit 104. Meanwhile, herein, accessing points to performing a reading operation or a writing operation with respect to the main memory unit 104.

Such access control with respect to the main memory unit 104 is achieved by performing the following operations. Firstly, from the main processor unit 101, the address space control unit 102 receives a signal indicating whether the main processor unit 101 is in the secure mode or in the non-secure mode. According to that signal, the address space control unit 102 gets to know the operating state of the main processor unit 101. Thus, when the main processor unit 101 attempts to access the main memory unit 104, the address space control unit 102 determines the memory areas that can be allowed to be accessed.

Meanwhile, as illustrated in FIG. 2, the secure OS unit 300 includes a virtual TPM unit 310 (TPM stands for Trusted Platform Module), a hash calculator 320, a memory reading unit 330, a memory writing unit 340, a transition command calling unit 350, an expected value storing unit 360, a hash value verifying unit 370, and a hash value sending unit 380. However, the hash value sending unit 380 may not be disposed.

The virtual TPM unit 310 further includes a hash value storing unit 311, a signature calculator 312, and a secret key storing unit 313. However, the signature calculator 312 and the secret key storing unit 313 may not be disposed.

The hash value storing unit 311 is used to store a plurality of hash values. That is, the hash value storing unit 311 refers to an input value calculated by the hash calculator 320 and a value originally stored in the hash value storing unit 311, and stores therein a value calculated using an equation given below. In the equation given below, "f" represents a hash function. As far as the hash function is concerned, it is possible to use, for example, a well-known algorithm such as SHA1, SHA-256, SHA3, or MD5. Moreover, in the equation, "||" represents the calculation of concatenation. Herein, the calculation is performed under the assumption that the initial value originally stored in the hash value storing unit 311, that is, the value at the time of implementing this hash function for the first time is "0". The value stored in the hash value storing unit 311 is held therein until at least the time at which the information processing device 100 is shut down.

(value to be newly stored in hash value storing unit
311)=*f*((input value)||(value originally stored in
hash value storing unit 311))

Meanwhile, the hash value storing unit 311 does not have an interface for setting therein an arbitrary value. For example, when an input value is set for the first time, the calculation is performed in the manner given below.

(value to be newly stored in hash value storing unit
311)=*f*((input value)||0)

Thus, the abovementioned value is stored in the hash value storing unit 311. However, it is not possible to set an input value directly in the hash value storing unit 311 without using the function f.

The secret key storing unit 313 is used to store a secret key that is used by the signature calculator 312. The virtual TPM unit 310 generates a public key and a secret key, and stores the secret key in the secret key storing unit 313. Herein, it is desirable to store the secret key in a nonvolatile memory that cannot be read by any software other than the secure monitor unit 200 and the secure OS unit 300. Of course, the secret key storing unit 313 can be configured in such a way that reading and writing with respect to it cannot be performed by any software other than the secure monitor unit 200 and the secure OS unit 300. Moreover, at the time of manufacturing the information processing device 100, a public key pair can be calculated in advance and the value of the secret key can be stored in the boot ROM unit 105. In any case, it is desirable that the key stored in the secret key storing unit 313 is statistically a unique value for the information processing device 100.

The signature calculator 312 makes use of the secret key stored in the secret key storing unit 313, calculates a signature for the value stored in the hash value storing unit 311, and outputs the result of signature calculation. As far as the public key algorithm used in signature calculation is concerned; it is possible to use, for example, the RSA algorithm, the DSA algorithm, or the ECDSA algorithm.

The memory reading unit 330 loads (reads) the data stored in the main memory unit 104. The operation of data loading is performed via the address space control unit 102. The memory writing unit 340 stores (writes) data in the main memory unit 104. The operation of data storage is performed via the address space control unit 102.

The hash calculator 320 calculates the hash value for the data read by the memory reading unit 330, and stores that hash value in the hash value storing unit 311 of the virtual TPM unit 310. As far as the hash function is concerned; it is possible to use, for example, a well-known algorithm such as SHA1, SHA-256, SHA3, or MD5.

The hash value verifying unit 370 performs a comparison operation to check whether or not the value stored in the hash value storing unit 311 is identical to a value stored in the expected value storing unit 360. Thus, the expected value storing unit 360 is used to store a value that the hash value verifying unit 370 uses in verifying the identicalness of values. In the expected value storing unit 360 is stored either one of the following two values: the value obtained at the time of manufacturing the information processing device 100 by calculating in advance the image of the non-secure OS unit 500 according to the abovementioned equation; and the value calculated in advance by the secure monitor unit 200 or the secure OS unit 300 prior to the booting of the information processing device 100. Thus, in the case when the non-secure OS unit 500 is booted without being altered, the hash value is identical with the value stored in the expected value storing unit 360. Herein, it is desirable if the value to be stored in the expected value storing unit 360 is stored in a nonvolatile memory with respect to which no software other than the secure monitor unit 200 and the secure OS unit 300 can perform writing. Of course, in the case of performing writing at the time of shipping from the factory, it is possible to use a read only memory (ROM) so as to ensure that no writing is performed thereafter.

The transition command calling unit 350 performs the operation of executing a command to switch the operating state of the main processor unit 101 from the secure mode to the non-secure mode. When this command is executed, the main processor unit 101 transfers the operations to the OS switching unit 202 of the secure monitor unit 200.

The hash value sending unit 380 uses the secret key, which is stored in the secret key storing unit 313, with respect to the value stored in the hash value storing unit 311 of the virtual TPM unit 310; requests the signature calculator 312 of the virtual TPM unit 310 to generate a signature; and obtains a signed hash value from the virtual TPM unit 310.

The boot loader unit 400 includes a booting unit 401, a memory writing unit 402, an OS reading unit 403, and a transition command calling unit 404. The OS reading unit 403 reads the non-secure OS unit 500 from the secondary storage unit 107.

The memory writing unit 402 writes the non-secure OS unit 500, which has been read by the OS reading unit 403, in the main memory unit 104. Herein, the operation of writing points to sending a write command along with target data for writing to the address space control unit 102. Then, the address space control unit 102 determines whether or not it is allowed to write the data in the main memory unit 104; and the memory control unit 103 actually writes the data in the main memory unit 104. Thus, it is not the memory writing unit 402 that writes the data in the main memory unit 104.

The booting unit 401 starts executing the non-secure OS unit 500 after the non-secure OS unit 500 is completely written in the main memory unit 104. The transition command calling unit 404 sends an OS transition command to the OS switching unit 202 of the secure monitor unit 200. The OS transition command has a parameter for informing the secure OS unit 300 about at least 1-bit information that instructs the post-transition operation to be performed. Thus, as the element of the parameter, it is conveyed to the secure OS unit 300 about whether to perform a memory read operation or a hash value verification operation after the OS transition. The explanation about the parameter is given later. In the case of instructing the secure OS unit 300 to perform a memory read operation after the OS transition, it is also possible to use a parameter that informs the secure OS unit 300 about address data which indicates the address in the main memory unit 104 at which the write operation was performed.

Figure 5:
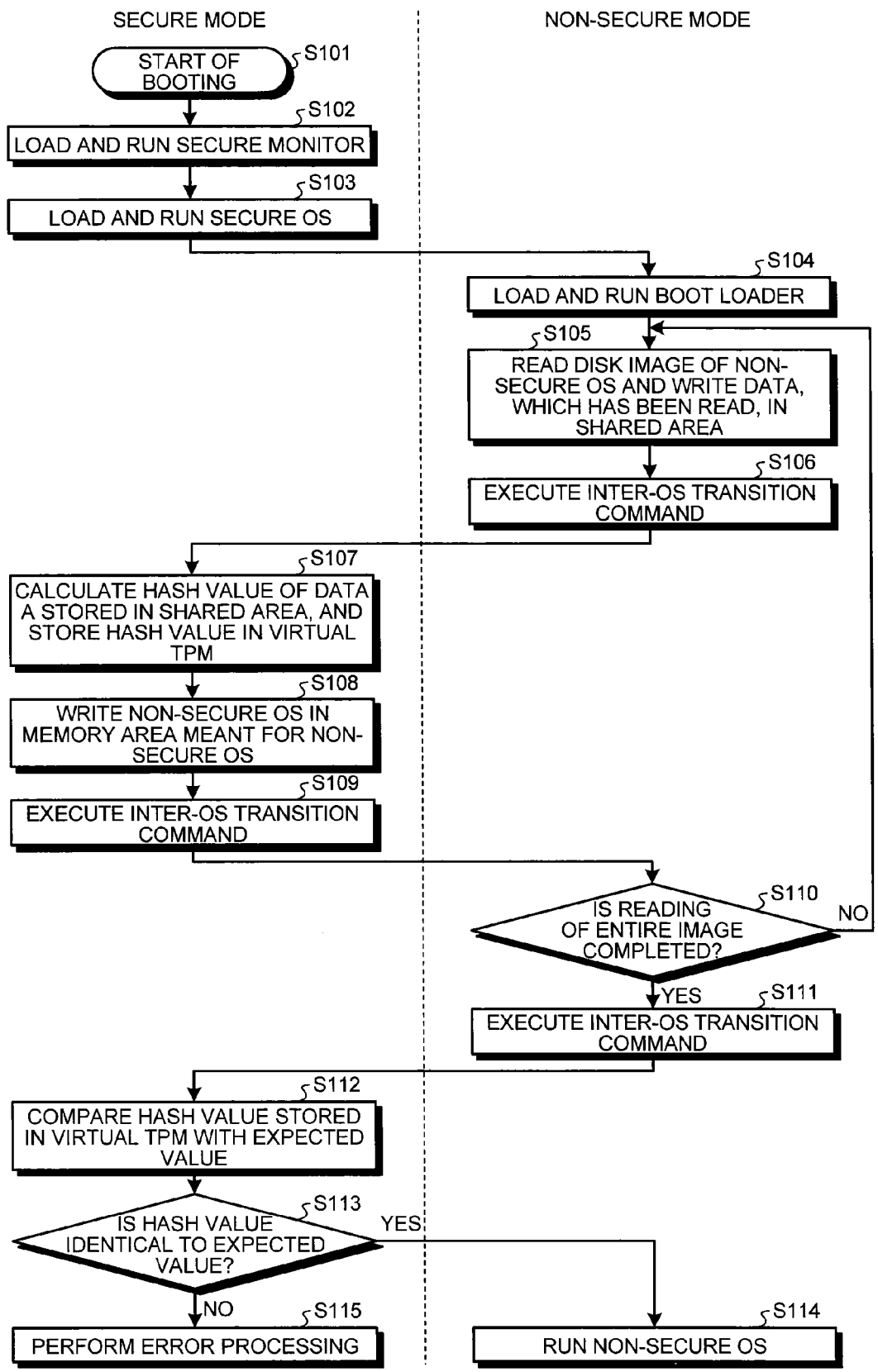
FIG. 5 is a flowchart for explaining a boot process of a non-secure OS unit in the information processing device according to the first embodiment.

FIG. 5 is a flowchart for explaining the operations starting from turning ON the power supply up to running the non-secure OS unit 500. Firstly, when the power supply is turned ON, a computer program stored in the boot ROM unit 105 is executed (Step S101). In this state, the main processor unit 101 is in the secure mode. Then, as a result of the computer program run from the boot ROM unit 105, the secure monitor unit 200 is read from the secondary storage unit 107 and is run by being written in the main memory unit 104 (Step S102). Once the secure monitor unit 200 is run, the secure monitor memory setting unit 203 thereof performs access control setting of the memory area of the main memory unit 104. More particularly, the secure monitor memory setting unit 203 segments the memory area of the main memory unit 104 as illustrated in FIG. 3 and performs access control setting as illustrated FIG. 4.

Subsequently, the secure monitor unit 200 reads the secure OS unit 300 from the secondary storage unit 107, and runs the secure OS unit 300 by writing it in the main memory unit 104 (Step S103). When the secure OS unit 300 performs an initialization operation, the transition command calling unit 350 executes an OS switch command for the secure OS unit 300. Consequently, the main processor unit 101 transfers the operations to the OS switching unit 202 of the secure monitor unit 200. Then, the OS switching unit 202 performs a context saving/restoration operation and a mode switching operation. At that time, the main processor unit 101 switches to the non-secure mode.

Subsequently, the main processor unit 101 executes the boot loader unit 400 (Step S104). As far as the execution of the boot loader unit 400 is concerned, the secure monitor unit 200 reads a computer program from the boot ROM unit 105, loads it in the main memory unit 104, and executes it. A computer program stored in the boot ROM unit 105 can read the boot loader unit 400, write it in the main memory unit 104, and execute it. Alternatively, after the secure monitor unit 200 switches the operating state of the main processor unit 101 to the non-secure mode, the secure monitor unit 200 can read the boot loader unit 400 from the secondary storage unit 107, write it in the main memory unit 104, and execute it.

Then, from the secondary storage unit 107, the boot loader unit 400 reads a disk image of the non-secure OS unit 500, and writes it in the shared memory area 123 of the main memory unit 104 (Step S105). Herein, it is assumed that software such as Linux (registered trademark) having a relatively large image size is used as the non-secure OS unit 500. For that reason, a single command is not sufficient to read the entire non-secure OS unit 500 from the secondary storage unit 107 into the shared memory area 123 of the main memory unit 104. Thus, the boot loader unit 400 reads only a portion (called data A) of the non-secure OS unit 500 from the secondary storage unit 107, writes the data A in the shared memory area 123 of the main memory unit 104, and executes an OS transition command using the transition command calling unit 404 (Step S106). At that time, after the operations are transferred to the secure OS unit 300, the following information is attached as parameters: information indicating that the secure OS unit 300 would perform a memory read operation; and information indicating the address in the main memory unit 104 at which the boot loader unit 400 has written the data A (for example, information indicating the start address and the data length of the data A).

Once inter-OS transition is performed by the OS switching unit 202 of the secure monitor unit 200; the secure OS unit 300 checks the parameters. Herein, from the parameters, the secure OS unit 300 recognizes that a memory read operation has been performed. Moreover, from the shared memory area 123 of the main memory unit 104, the secure OS unit 300 obtains the address at which the data A has been written; as well as obtains the length of the data A. Then, via the memory reading unit 330, the secure OS unit 300 obtains the data A from the shared memory area 123 of the main memory unit 104; calculates the hash value of the data A using the hash calculator 320; and stores the hash value in the hash value storing unit 311 of the virtual TPM unit 310 (Step S107).

Subsequently, the memory reading unit 330 and the memory writing unit 340 copy the data A of the non-secure OS unit 500 from the shared memory area 123 of the main memory unit 104 to the non-secure memory area 121 (Step S108). With that, it can be ensured that the data written in the non-secure memory area 121 of the main memory unit 104 becomes the data with respect to which the hash calculator 320 has completed the hash calculation. Then, the secure OS unit 300 executes an OS transition command using the transition command calling unit 350 (Step S109).

Once inter-OS transition is performed by the OS switching unit 202 of the secure monitor unit 200; the boot loader unit 400 determines whether or not reading of the image of all data of the non-secure OS unit 500 is completed (Step S110). If it is determined that reading is not yet complete (No at Step S110), then the boot loader unit 400 reads the remaining portion (called data B) of the non-secure OS unit 500 from the secondary storage unit 107. Then the system control returns to Step S105.

On the other hand, when it is determined that the entire image of the non-secure OS unit 500 has been read from the secondary storage unit 107 (Yes at Step S110), the boot loader unit 400 executes an OS transition command using the transition command calling unit 404 (Step S111). That is to say, it is determined whether or not the entire non-secure OS unit 500 is written in the non-secure memory area 121 of the main memory unit 104, and whether or not the hash value of the non-secure OS unit 500 is stored in the hash value storing unit 311 of the virtual TPM unit 310. At that time, after the operations are transferred to the secure OS unit 300, information indicating that the hash value would be verified by the secure OS unit 300 is appended as a parameter.

Once inter-OS transition is performed by the OS switching unit 202 of the secure monitor unit 200; the secure OS unit 300 checks the parameter. Herein, from the parameter, the secure OS unit 300 recognizes that the hash value is to be verified. Then, via the hash value verifying unit 370, the secure OS unit 300 checks the value stored in the hash value storing unit 311 and the value stored in the expected value storing unit 360 (Step S112), and determines whether or not those two values are identical (Step S113).

If the expected value and the hash value are identical to each other (Yes at Step S113), then the secure OS unit 300 executes an OS transition command using the transition command calling unit 350. Once inter-OS transition is performed by the OS switching unit 202 of the secure monitor unit 200; the boot loader unit 400 starts executing the non-secure OS unit 500, which is written in the non-secure memory area 121 that is meant for the non-secure OS unit 500 in the main memory unit 104, and runs the non-secure OS unit 500 (Step S114). Meanwhile, if it is determined that the hash value and the expected value are not identical (No at Step S113), then the main processor unit 101 performs error processing (Step S115).

As far as the error processing is concerned, one of the following methods can be implemented: stopping the system; displaying a message, which indicates that the verification has failed, on a display screen (not illustrated) connected to the information processing device 100; or executing an OS transition command using the transition command calling unit 350 in an identical manner to the case of successful verification, and then executing the non-secure OS unit 500.

Meanwhile, in order to match the value stored in the expected value storing unit 360 with the hash value calculated at the time of booting, the data size of the data A and the data B used at the time of calculating the value stored in the expected value storing unit 360 has to be same as the data size of the data A and the data B used in the calculation performed by the hash calculator 320 of the secure OS unit 300.

In this way, in the information processing device 100 according to the first embodiment, it can be confirmed that the non-secure OS unit 500 stored in the secondary storage unit 107 is an image of the non-secure OS unit 500 that was calculated in advance. Hence, even if the non-secure OS unit 500 is altered, it becomes possible to detect the alteration.

Such a configuration proves particularly useful in the case in which a device such as a hard disk drive (HDD) or a solid state drive (SSD) having a general-purpose interface is used as the secondary storage unit 107 and the data stored in the secondary storage unit 107 can be easily rewritten by physically attaching and detaching the secondary storage unit 107.

The non-secure OS unit 500 performs various operations that are required to keep the information processing device 100 operating. In case the data in the secondary storage unit 107 is rewritten by an unauthorized attacker, it could cause an unexpected action for the user or the system administrator. For example, assume that a determination operation related to the digital rights management (DRM) (for example, a determination operation for determining whether or not to playback contents) is being performed. At that time, an attacker may alter the non-secure OS unit 500 in such a way that the determination operation is skipped and contents playback is always made possible even if not originally allowed. In order to prevent such a situation, prior to the execution of the non-secure OS unit 500, the implementer of the information processing device 100 needs to confirm that the non-secure OS unit 500 is being executed in the intended manner. In the first embodiment, the hash value of the non-secure OS unit 500 is calculated in advance; the hash value of the image of the non-secure OS unit 500, which is read from the secondary storage unit 107, is calculated prior to the execution of the non-secure OS unit 500; and verification of whether or not the two values are identical can be performed prior to the execution of the non-secure OS unit 500. If the hash values do not match, an error can be displayed on the display screen so that the implementer becomes able to detect the alteration prior to the execution of the non-secure OS unit 500.

Moreover, in the first embodiment, it can be expected to achieve as much reduction as possible in the overhead required for the verification operation. Generally, the speed of reading from the secondary storage unit 107 is slower as compared to the speed of writing in the main memory unit 104 or the speed of reading from the main memory unit 104. In the first embodiment, during the latency time between a request issued by the non-secure OS unit 500 for reading data from the secondary storage unit 107 until the reception of data; if inter-OS transition and hash calculation can be performed, then the verification of the non-secure OS unit 500 can be performed in the same period of time that is taken in the case of not performing the verification.

First Modification Example

Meanwhile, even if the verification of the non-secure OS unit 500 is not successful; as long as the non-secure OS unit 500 is able to know the information indicating failure in the verification, there are times when it is suitable to continue with the boot process of the non-secure OS unit 500. For example, in the abovementioned example of the DRM-related determination operation, in the case of playing back the data to be protected as well as playing back the data not to be protected (such as contents without rights) in the information processing device 100, there is no need to perform DRM-related calculation at the time of playing back the data not to be protected. Hence, even if the DRM-related portion of operations is altered, it does not pose any problems. Moreover, there are also times when it is useful to confirm, as may be necessary, whether or not the verification of the non-secure OS unit 500 was successful.

Figure 6:
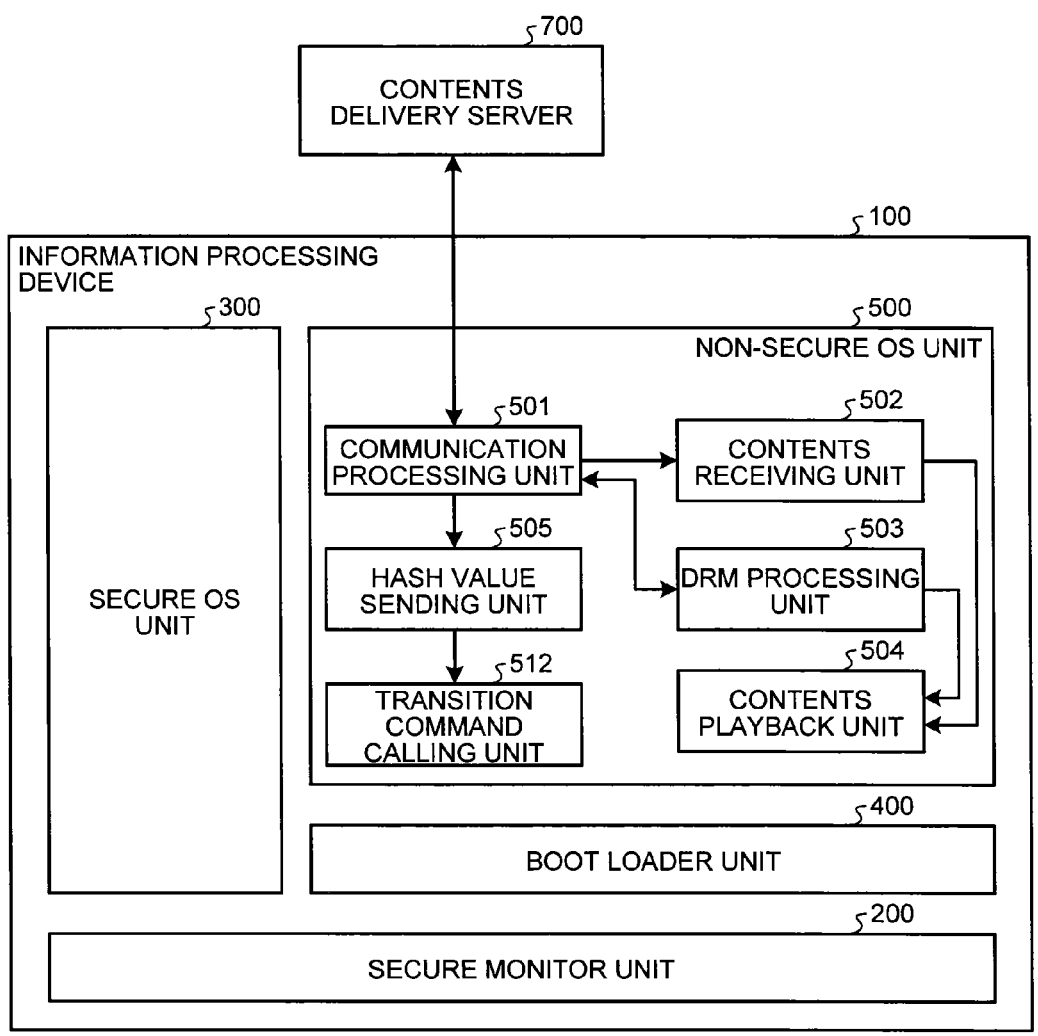
FIG. 6 is a functional configuration diagram of software components running in the main processor unit according to a first modification example of the first embodiment.

FIG. 6 is a diagram illustrating a functional configuration of the software components running in the main processor unit 101 in the case when it is confirmed, as may be necessary, whether or not the verification of the non-secure OS unit 500 was successful. As illustrated in FIG. 6, the information processing device 100 is connected to a contents delivery server 700, which is a device having the function of delivering contents such as movies or music to the information processing device 100 via a network such as the Internet. At the time of delivering the contents, it is assumed that the contents delivery server 700 checks whether or not the non-secure OS unit 500 of the information processing device 100 has been verified, and delivers contents to the information processing device 100 only when the verification has been done.

Herein, the secure OS unit 300, the secure monitor unit 200, and the boot loader unit 400 of the information processing device 100 have the same configuration as the configuration illustrated in FIG. 2. The non-secure OS unit 500 includes a communication processing unit 501, a contents receiving unit 502, a DRM processing unit 503, a contents playback unit 504, a hash value sending unit 505, and a transition command calling unit 512. The communication processing unit 501 performs communication with the contents delivery server 700. The contents receiving unit 502 receives the contents that are delivered by the contents delivery server 700. It is assumed that the contents are delivered upon being encrypted with a key according to a cryptographic algorithm such as the advanced encryption standard (AES).

The DRM processing unit 503 performs key calculation related to the DRM used in decrypting the contents. The DRM processing unit 503 receives input of an encryption key for contents decryption that is downloaded from the contents delivery server; decrypts the encryption key for contents decryption using the key included in the DRM processing unit 503; and obtains a contents decryption key by means of calculation. The contents playback unit 504 makes use of the contents decryption key calculated by the DRM processing unit 503; decrypts the encrypted contents received by the contents receiving unit 502; and plays back the contents. The hash value sending unit 505 obtains the signed hash value of the non-secure OS unit 500 that was obtained by the hash value sending unit 380 of the secure OS unit 300, and sends that hash value to the contents delivery server 700.

Firstly, prior to the delivery of contents, the contents delivery server 700 requests the information processing device 100 to send the signed hash value of the non-secure OS unit 500. More particularly, the hash value sending unit 505 requests the transition command calling unit 512 to obtain the signed hash value of the non-secure OS unit 500 from the secure OS unit 300. In that regard, firstly, the transition command calling unit 512 executes an OS switch command. Consequently, the main processor unit 101 transfers the operations to the OS switching unit 202 of the secure monitor unit 200. Then, the OS switching unit 202 performs a context saving/restoration operation and a mode switching operation. Thus, the main processor unit 101 switches to the secure mode, and executes the hash value sending unit 380 of the secure OS unit 300. Then, the hash value sending unit 380 makes use of the key stored in the secret key storing unit 313; requests the signature calculator 312 of the virtual TPM unit 310 to calculate the signed hash value for the value stored in the hash value storing unit 311; and obtains the calculation result. This calculation result represents the signed hash value of the non-secure OS unit 500. Subsequently, the hash value sending unit 380 writes that hash value in the shared memory area 123 of the main memory unit 104; executes the transition command calling unit 350; and transfers the operations back to the non-secure OS unit 500. Then, the hash value sending unit 505 of the non-secure OS unit 500 obtains the signed hash value of the non-secure OS unit 500 from the shared memory area 123, and sends that hash value to the contents delivery server 700 in response to a request received from the contents delivery server 700. Herein, the contents delivery server 700 possesses a public key corresponding to the secret key, which is stored in the secret key storing unit 313 of the virtual TPM unit 310 of the secure OS unit 300. Thus, using that public key, the contents delivery server 700 verifies the hash value of the non-secure OS unit 500. Moreover, the contents delivery server 700 verifies whether that hash value is identical to the expected value of the hash value of the non-secure OS unit 500. Only when both verifications result in success, the contents delivery server 700 sends the contents to the information processing device 100.

As a result, only when the expected non-secure OS unit 500 is operating in the information processing device 100, the contents delivery server 700 can deliver the contents. Hence, it becomes possible to prevent a situation in which the contents are provided to the information processing device 100 (the non-secure OS unit 500) that has been altered in an unauthorized manner, and thus to prevent unauthorized use of the contents. In this case, the non-secure OS unit 500 is not subject to error processing, and can be configured to perform operations as per normal except for the operations performed in cooperation with the contents delivery server 700.

Second Modification Example

FIG. 7 illustrates a different example of the flowchart illustrated in FIG. 5. In the flowchart illustrated in FIG. 5, the explanation is given for an example in which, at the time of turning ON the power supply, a computer program stored in the boot ROM unit 105 executes the secure monitor unit 200 stored in the secondary storage unit 107. In contrast, in the flowchart illustrated in FIG. 7; firstly the boot loader unit 400 that is stored in the boot ROM unit 105 is executed, and then the boot loader unit 400 loads and executes the secure monitor unit 200 that is stored in the secondary storage unit 107 (Step S201). Subsequently, the secure OS unit 300 is executed in the same sequence as the sequence illustrated in FIG. 5. When the boot process of the secure OS unit 300 is completed, the secure OS unit 300 executes an OS transition command using the transition command calling unit 350. The main processor unit 101 transfers the operations to the secure monitor unit 200. Thus, the secure monitor unit 200 switches the operating state from the secure mode to the non-secure mode and executes the boot loader unit 400 in the non-secure mode (Step S202). The subsequent operations are identical to the operations illustrated in FIG. 5. Meanwhile, since the boot loader unit 400 is stored in the boot ROM unit 105, there is no chance of it being altered from outside unlike the data stored in the secondary storage unit 107. For that reason, the boot loader unit 400 can reliably execute the operations as per the expectations of the administrator.

With reference to FIG. 5, it is necessary that the secure monitor unit 200 as well as the boot loader unit 400 is equipped with the function of loading and executing an OS. In contrast, by having the configuration as indicated by the flowchart in FIG. 7, a general-purpose function of loading and executing an OS can be provided not only in the secure OS unit 300 and the non-secure OS unit 500 but also in the boot loader unit 400. Thus, it is sufficient if the function of loading and executing an OS is provided only in the boot loader unit 400. That makes it possible to reduce the development cost.

Third Modification Example

FIGS. 8 and 9 are diagrams illustrating different examples of the area setting and the access policy in the main memory unit 104. As compared to the example illustrated in FIG. 4, the example illustrated in FIG. 9 differs in the way that the main memory unit 104 is segmented into a secure memory area A 122*a*, a secure memory area B 122*b*, the non-secure memory area 121, and the shared memory area 123; and the access rights for the non-secure mode are dividedly set as read access rights and write access rights. Herein, the access rights for the secure mode can also be dividedly set as read access rights and write access rights. However, for the sake of simplicity in explanation, it is assumed that the access rights for the secure mode are set to be common regarding reading and writing. That is, in the secure mode, a portion allowed to be accessed is allowed to be accessed for reading as well as for writing.

Thus, when the main processor unit 101 is in the secure mode, the software running in the main processor unit 101 can access each of the secure memory area A 122*a*, the secure memory area B 122*b*, the shared memory area 123, and the non-secure memory area 121 of the main memory unit 104. In other words, the secure OS unit 300 can access each of the secure memory area A 122*a*, the secure memory area B 122*b*, the shared memory area 123, and the non-secure memory area 121 of the main memory unit 104 for reading as well as for writing.

On the other hand, when the main processor unit 101 is in the non-secure mode, the secure memory area A 122*a* of the main memory unit 104 is neither allowed to be accessed for reading nor allowed to be accessed for writing by the main processor unit 101. In contrast, the secure memory area B 122*b* of the main memory unit 104 is not allowed to be accessed for writing but is allowed to be accessed for reading by the main processor unit 101. Moreover, the shared memory area 123 and the non-secure memory area 121 are allowed to be accessed for reading as well as for writing by the main processor unit 101. Thus, the non-secure OS unit 500 is not allowed to access the secure memory area A 122*a* of the main memory unit 104 for reading as well as for writing; is allowed to access the secure memory area B 122*b* only for reading; and is allowed to access the shared memory area 123 and the non-secure memory area for reading as well as for writing.

In FIG. 9 is illustrated an example in which the secure monitor memory setting unit 203 segments the memory area of the main memory unit 104. The setting for such segmentation is done by the secure monitor memory setting unit 203 as part of the operations performed during the device boot process. Thus, in the memory area of the main memory unit 104 are set the secure memory area A 122*a*, the secure memory area B 122*b*, the shared memory area 123, and the non-secure memory area 121.

The secure memory area A 122*a* is used to store the secure OS (i.e., an OS execution image of the secure OS), secure OS data, a memory area setting register, the secure monitor (i.e., an OS execution image of the secure monitor), and secure monitor data. The secure memory area B 122*b* is used to store the non-secure OS (i.e., an OS execution image of the non-secure OS). The shared memory area 123 is used to store the data that needs to be accessed from the secure mode as well as from the non-secure mode. Moreover, the non-secure memory area 121 is used to store non-secure OS data.

The non-secure OS unit 500 is written in the memory area that is meant therefor, that is, is written in the secure memory area B 122*b*. However, this write operation needs to be done by the secure OS unit 300. In the access control policy illustrated in FIG. 8, in the secure mode, it is allowed to write data in the secure memory area B 122*b*. Since the secure OS unit 300 is executed in the secure mode, the writing operation is successfully performed.

In order to execute the non-secure OS unit 500, the boot loader unit 400 as well as the non-secure OS unit 500 itself needs to read the secure memory area B 122b, which is the memory area in which non-secure OS unit 500 is installed. According to the policy settings illustrated in FIG. 8, since the boot loader unit 400 and the non-secure OS unit 500 are allowed to access the secure memory area B 122b for reading, there is no problem. On the other hand, however, writing data from the non-secure OS unit 500 in the secure memory area B 122b is not allowed. That is done so as to ensure that, after the information processing device 100 is booted, an attack such as altering the memory area of the non-secure OS unit 500 is prevented. In case there are software bugs in the non-secure OS unit 500, a generally well-known type of attack is made in which the bugs are used in an unauthorized manner to alter the operations of the non-secure OS unit 500 in an unauthorized manner. However, if the settings are done as illustrated in FIG. 8, then even if an attempt is made to change the memory area of the non-secure OS unit 500, that is, even if an attempt is made to perform writing in the secure memory area B 122b; the address space control unit 102 detects that an attempt of writing in the secure memory area B 122b was made in the non-secure mode and thus blocks that attempt. Hence, it is not possible to alter the non-secure OS unit 500.

In this way, when access rights for memory control are set in the secure monitor memory setting unit 203 of the secure monitor unit 200 via the address space control unit 102; an attack for rewriting the data in the main memory unit 104, in which the non-secure OS unit 500 is installed, can be prevented from occurring without obstructing the execution of the non-secure OS unit 500.

Figure 10:
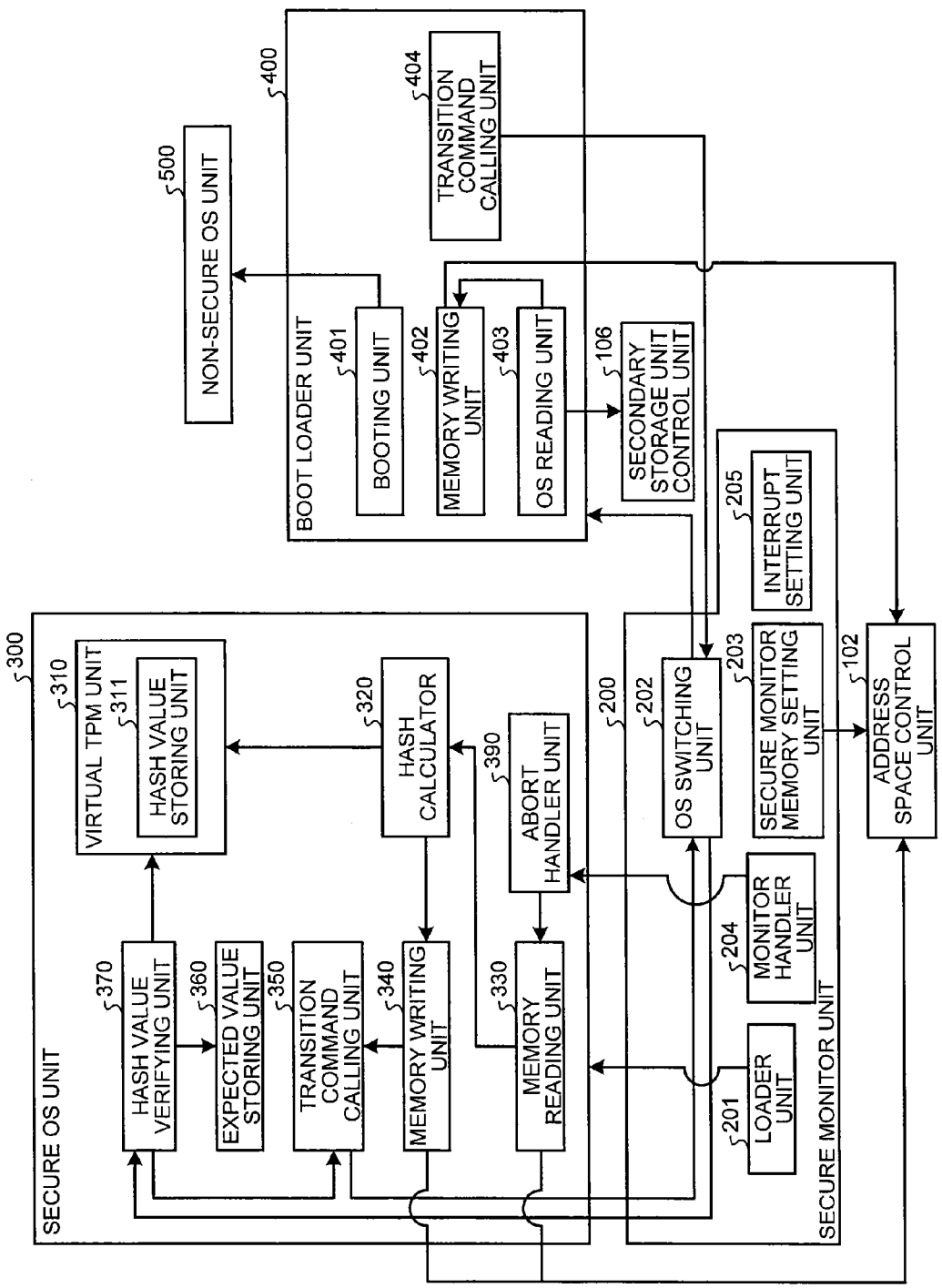
FIG. 10 is a functional configuration diagram of software components running in the main processor unit according to the third modification example of the first embodiment.

FIG. 10 is a diagram illustrating a different example of the functional configuration of the software components illustrated in FIG. 2. In the configuration illustrated in FIG. 2, when the boot loader unit 400 reads a portion of the non-secure OS unit 500 from the secondary storage unit 107, the boot loader unit 400 has to explicitly execute an OS transition command using the transition command calling unit 404. In contrast, in the configuration illustrated in FIG. 10, it is possible to omit the explicit calling of inter-OS transition done by the boot loader unit 400. Meanwhile, in this first modification example, as far as the access control of the main memory unit 104 is concerned, the settings illustrated in FIGS. 8 and 9 are applied.

As illustrated in FIG. 10, the secure monitor unit 200 includes a monitor handler unit 204 and an interrupt setting unit 205; while the secure OS unit 300 includes an abort handler unit 390. Moreover, in an identical manner to FIG. 2, the boot loader unit 400 includes the transition command calling unit 404. However, the transition command calling unit 404 is not used after a portion of the non-secure OS unit 500 is read, but is used for the calling purpose at the time of requesting the secure OS unit 300 to perform hash value calculation after the entire non-secure OS unit 500 is read in the main memory unit 104. Thus, in the operation performed at Step S106 illustrated in FIG. 5, the transition command calling unit 404 does not perform any operation.

The interrupt setting unit 205 performs setting of the main processor unit 101 in such a way that, when an exception signal of timer interrupt is generated in the address space control unit 102, the main processor unit 101 calls the monitor handler unit 204. This setting is performed as one of the operations at the time of initializing the secure monitor unit 200.

The monitor handler unit 204 is called by the main processor unit 101 in the case when an exception signal is generated in the address space control unit 102. At the time of the occurrence of the interrupt, if the monitor handler unit 204 is in the non-secure mode; then the monitor handler unit 204 stores the context of the non-secure OS unit 500 and switches to the secure mode. Then, the operations are transferred to the abort handler unit 390.

Thus, the abort handler unit 390 takes over the operations from the monitor handler unit 204, and reads data from the main memory unit 104 and stores the hash value of the data in the virtual TPM unit 310.

Figure 11:
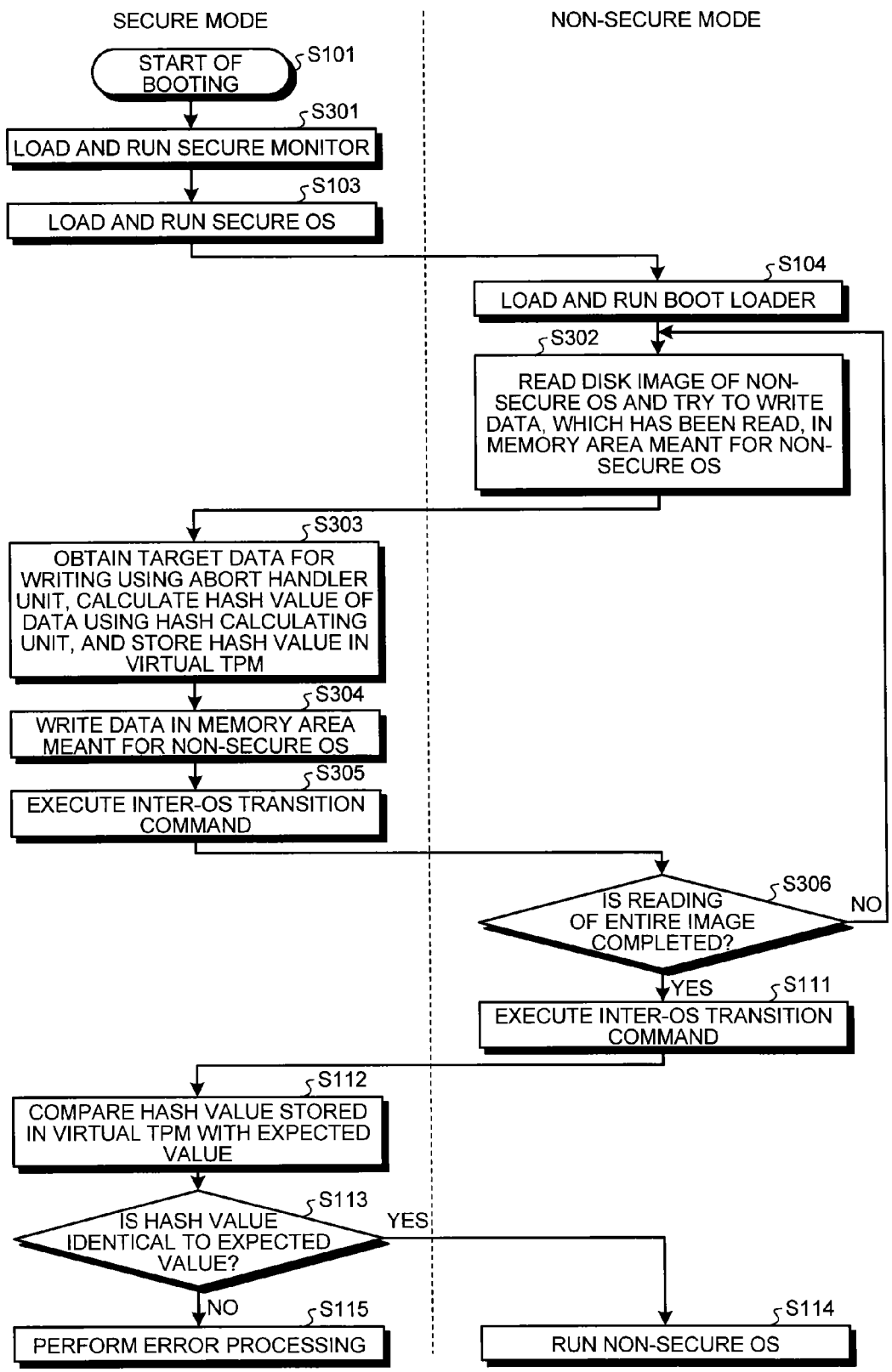
FIG. 11 is a flowchart for explaining a boot process of the non-secure OS unit in the information processing device according to the third modification example of the first embodiment.

FIG. 11 is a flowchart for explaining the operations starting from turning ON the power supply up to running the non-secure OS unit 500 in the information processing device having the configuration illustrated in FIG. 10. Till the operation in which the boot loader unit 400 is loaded and executed, the operations are identical to the operations illustrated in FIG. 5. Meanwhile, in the first embodiment, the secure monitor memory setting unit 203 also performs setting regarding the operation performed when an access policy is violated in a memory area that has been set.

As described above, when there an access is attempted while violating an access policy that has been set, the address space control unit 102 does not allow that access to establish and sends an exception signal as an interrupt signal to the main processor unit 101. As far as settings for this purpose are concerned, once the secure monitor unit 200 is loaded and executed (Step S301); when the interrupt signal is generated, the interrupt setting unit 205 performs setting of the main processor unit 101 in such a way that the main processor unit 101 executes the monitor handler unit 204 of the secure monitor unit 200. As a result of such setting, when a write request with respect to the secure memory area B 122b is received from the non-secure mode, the main processor unit 101 forcibly terminates the operations of the non-secure OS unit 500, and transfers the operations to the monitor handler unit 204 of the secure monitor unit 200.

Subsequently, till the operation in which the secure monitor unit 200 loads and executes the secure OS unit 300 (Step S103), as well as loads and runs the boot loader unit 400 (Step S104); the operations can be performed in an identical manner to that illustrated in FIG. 5.

Then, the boot loader unit 400 reads the non-secure OS unit 500 from the secondary storage unit 107 and attempts to write the non-secure OS unit 500 in the secure memory area B 122b of the main memory unit 104 using the memory writing unit 402 (Step S302). Thus, unlike at Step S105 illustrated in FIG. 5, an attempt is made to write the non-secure OS unit 500 in the secure memory area B 122b and not in the shared memory area 123. That is, the boot loader unit 400 reads a portion (called data A) of the non-secure OS unit 500 from the secondary storage unit 107, and attempts to write the data A in the secure memory area B 122b of the main memory unit 104.

At that time, the main processor unit 101 is in the non-secure mode. As illustrated in FIG. 8, in the non-secure mode, writing in the secure memory area B 122b is not allowed. Hence, the address space control unit 102 generates an exception to the main processor unit 101; and the main processor unit 101 transfers the operations to the monitor handler unit 204 according to the abovementioned setting of the interrupt setting unit 205.

The monitor handler unit 204 stores the context of the non-secure OS unit 500. This operation can be performed in a similar manner to the operation of storing the context performed at the time when the OS switching unit 202 performs transition from the non-secure OS unit 500 to the secure OS unit 300. Then, the monitor handler unit 204 switches the operating state of the main processor unit 101 from the non-secure mode to the secure mode, and lastly executes the abort handler unit 390 of the secure OS unit 300.

Subsequently, the abort handler unit 390 of the secure OS unit 300 reads, from the main memory unit 104, the command immediately previous to the occurrence of the exception. Herein, the command immediately previous to the occurrence of the exception points to the command for writing the data A in the secure memory area B 122b that is meant for the non-secure OS unit 500 in the main memory unit 104. Thus, the abort handler unit 390 obtains the destination address for writing (called address A) along with the data A; calculates the hash value of the data A using the hash calculator 320; and stores that hash value in the hash value storing unit 311 of the virtual TPM unit 310 (Step S303).

Then, via the memory writing unit 340, the abort handler unit 390 writes the data A at the address A in the secure memory area B 122b that is meant for the non-secure OS unit 500 in the main memory unit 104 (Step S304). Herein, although the secure OS unit 500 is executed in the secure mode, writing in the secure memory area B 122b from the secure mode is also allowed as illustrated in FIG. 8. Hence, the writing operation is performed successfully. Meanwhile, it is also possible to change the sequence of performing operations at Step S303 and Step S304.

Subsequently, the transition command calling unit 350 executes an OS transition command and switches the operating state of the main processor unit 101 to the non-secure mode, and returns to the operation that was performed by the non-secure OS unit 500 immediately previous to the occurrence of the exception (Step S305). That is, the non-secure OS unit 500 behaves as if it has on its own written the data A in the secure memory area B 122b that is meant for the non-secure OS unit 500 in the main memory unit 104.

Then, the boot loader unit 400 determines whether or not the secure OS unit 300 has written the entire image of the non-secure OS unit 500 in the secure memory area B 122b that is meant for the non-secure OS unit 500 in the main memory unit 104 (Step S306). If it is determined that the entire image of the non-secure OS unit 500 is not yet written (No at Step S306), the operations from Step S302 are repeated until the entire image is written. On the other hand, when it is determined that the entire image of the non-secure OS unit 500 is written (Yes at Step S306), the boot loader unit 400 executes an OS transition command using the transition command calling unit 404 (Step S111). Herein, unlike in the example illustrated in FIG. 5, the transition command calling unit 404 of the non-secure OS unit 500 is not used except in this case. Moreover, in the example illustrated in FIG. 5, the commands to be executed in the secure OS unit 300 are distinguished according to the parameters. However, herein, the parameters for distinguishing the commands are not required. The subsequent operations can be performed in an identical manner to that illustrated in FIG. 5.

Fourth Modification Example

Figure 12:
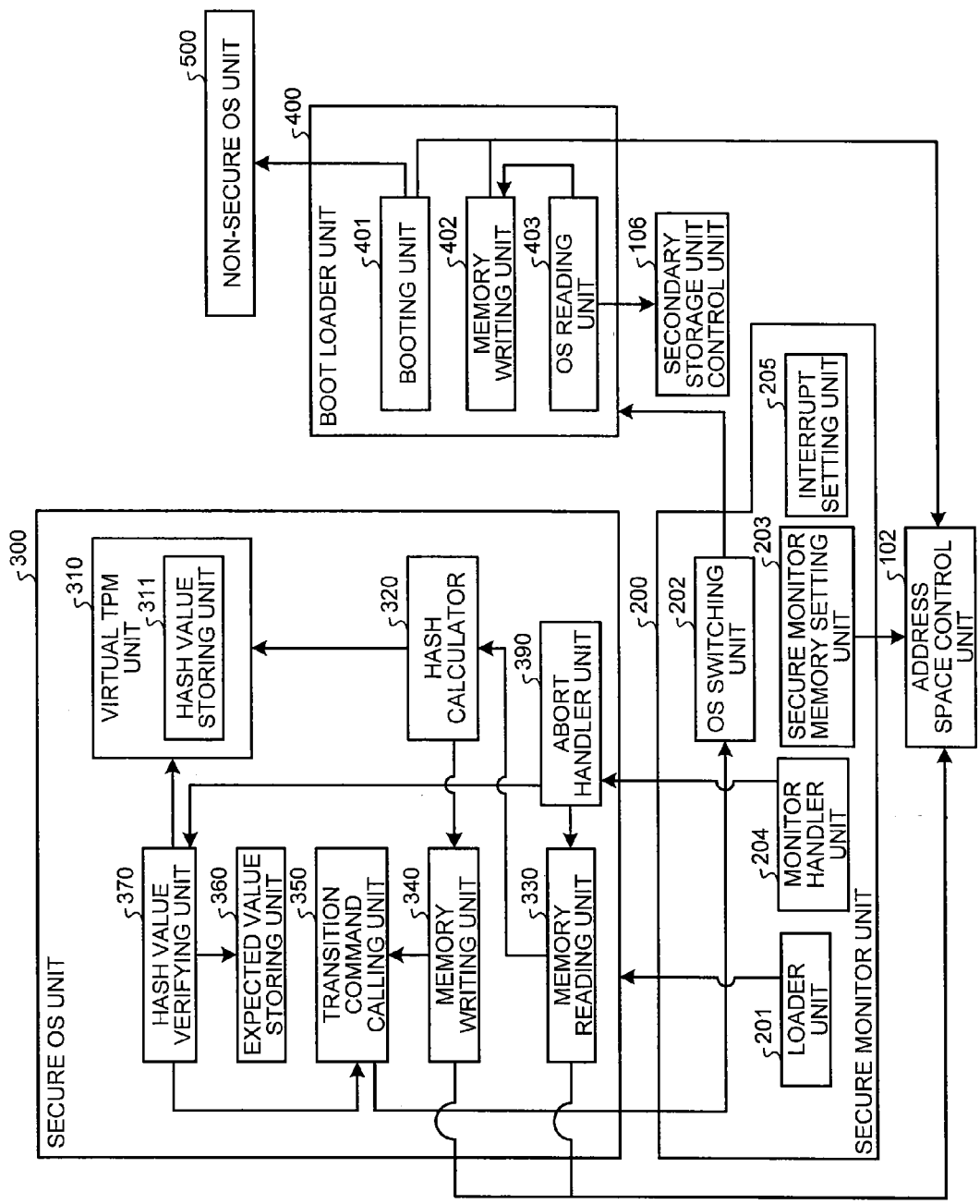
FIG. 12 is a functional configuration diagram of software components running in the main processor unit according to a fourth modification example of the first embodiment.

FIG. 12 is a diagram illustrating another configuration of the information processing device illustrated in FIG. 10. In the configuration illustrated in FIG. 10, the boot loader unit 400 writes the entire image of the non-secure OS unit 500 in the secure memory area B 122b that is meant for the non-secure OS unit 500 in the main memory unit 104, and then needs to perform explicit transition to the secure OS unit using the transition command calling unit 404. In contrast, in the configuration illustrated in FIG. 12, the explicit transition is skipped.

As compared to the configuration illustrated in FIG. 10, the configuration illustrated in FIG. 12 differs in the way that the abort handler unit 390 is connected to the hash value verifying unit 370 in the secure OS unit 300, and the boot loader unit 400 does not include the transition command calling unit 404. As far as the abort handler unit 390 is concerned; in addition to the operations explained with reference to FIG. 10, the abort handler unit 390 also identifies the cause for the exception and, when there is a data writing violation with respect to the main memory unit 104, calls the hash value verifying unit 370.

FIG. 13 is a diagram illustrating the policy about whether or not to allow the access to each type of memory area of the main memory unit 104 in the configuration illustrated in FIG. 12. In an identical manner to the example illustrated in FIG. 8, the setting for such access control is done by the secure monitor memory setting unit 203 as part of the operations performed during the device boot process. Herein, unlike in the example illustrated in FIG. 8 in which the secure memory area B 122b is allowed to be accessed for reading; in the example illustrated in FIG. 13, when the main processor unit 101 is in the non-secure mode and when a read access is attempted, a secure memory area B' 122b' is neither allowed to be accessed for reading nor allowed to be accessed for writing.

FIG. 14 is a flowchart for explaining the operations starting from turning ON the power supply up to running the non-secure OS unit 500 in the information processing device 100 having the configuration illustrated in FIG. 12. Herein, till the operation in which the boot loader unit 400 completes writing the entire image of the non-secure OS unit 500 in the area meant for the non-secure OS unit 500 in the main memory unit 104, the operations are identical to the operations illustrated in FIG. 11.

When the boot loader unit 400 detects that the entire disk image of the non-secure OS unit 500 has been written in the area meant for the non-secure OS unit 500 in the main memory unit 104 (Yes at Step S306), the boot loader unit 400 executes the non-secure OS unit 500 (Step S401). This execution points to the operation of reading the code (data) of the secure memory area B' 122b' in which is stored the data of the non-secure OS unit 500. Herein, the policy for the address space control unit 102 is set as illustrated in FIG. 13. That is, since the main processor unit 101 is operating in the non-secure mode and the area in which the data of the non-secure OS unit 500 is stored is set as the policy of the secure memory area B' 122b', the address space control unit 102 does not allow the data reading operation and generates an exception to the main processor unit 101. Then, the main processor unit 101 follows the setting of the interrupt setting unit 205 and transfers the operations to the monitor handler unit 204.

The monitor handler unit 204 stores the context of the non-secure OS unit 500. This operation can be performed in a similar manner to the operation of storing the context performed at the time when the OS switching unit 202 performs transition from the non-secure OS unit 500 to the secure OS unit 300. Then, the monitor handler unit 204 switches the operating state of the main processor unit 101 from the non-secure mode to the secure mode, and lastly executes the abort handler unit 390 of the secure OS unit 300.

Subsequently, the abort handler unit 390 of the secure OS unit 300 reads, from the main memory unit 104, the command immediately previous to the occurrence of the exception. Herein, the command immediately previous to the occurrence of the exception points to the command for reading the data from the secure memory area B' 122b' that is meant for the non-secure OS unit 500 in the main memory unit 104. Thus, the abort handler unit 390 obtains the destination address for reading (called address B) and confirms whether or not the destination address belongs to the secure memory area B' 122b'. In case the destination address does not belong to the secure memory area B' 122b', the abort handler unit 390 performs error processing and does not perform subsequent operations. However, if the destination address belongs to the secure memory area B' 122b', then the abort handler unit 390 determines that the operation is normal. Then, in the secure OS unit 300, the hash value verifying unit 370 checks whether or not the value stored in the hash value storing unit 311 is identical to the value stored in the expected value storing unit 360 (Step S112, Step S113).

Meanwhile, since the boot loader unit 400 executes the non-secure OS unit 500, it repeatedly performs the operation of reading the code (data) of the secure memory area B' 122b' that is the memory area meant for the non-secure OS unit 500. Moreover, even after the non-secure OS unit 500 is booted, it performs its own operations. Hence, as may be necessary, the non-secure OS unit 500 reads the code from the memory area meant for it. In this way, in the non-secure mode, the memory area meant for the non-secure OS unit 500 is repeatedly accessed for reading. At every read access, it is redundant to perform the hash value verification. Hence, once it is determined that the hash value and the expected value are identical; then even if there is an attempt of a read access to the memory area meant for the non-secure OS unit 500 in the non-secure mode before switching back to the non-secure mode by means of inter-OS transition, the address space control unit 102 can be set not to generate exceptions thereafter. That is, a setting command can be sent to the address space control unit 102 so as to change the access control policy settings of the address space control unit 102 from the state illustrated in FIG. 13 to the state illustrated FIG. 8. This setting can be performed by the secure OS unit 300. Alternatively, the interrupt setting unit 205 of the secure monitor unit 200 can be requested so that it performs the setting. In the policy settings illustrated in FIG. 8, the secure memory area B is allowed to be accessed for reading in the non-secure mode. Hence, even in the case when the boot loader unit 400 or the non-secure OS unit 500 performs a read access to the memory area meant for the non-secure OS unit 500 (i.e., the secure memory area B), no exception is generated. Thus, the abort handler unit 390 of the secure OS unit 300 is not executed.

As described above, in the configuration illustrated in FIG. 14, the need for the boot loader unit 400 to perform explicit transition to the secure OS unit 300 is eliminated. Thus, from the perspective of the boot loader unit 400, it is sufficient to read the non-secure OS unit 500 from the secondary storage unit 107; to load the non-secure OS unit 500 in the main memory unit 104, and to execute the non-secure OS unit 500 according to the boot process of a standard system. Thus, there is no need to modify the boot loader unit 400 to suit the first embodiment. That enables achieving reduction in the implementation cost of the device.

Fifth Modification Example

Figure 15:
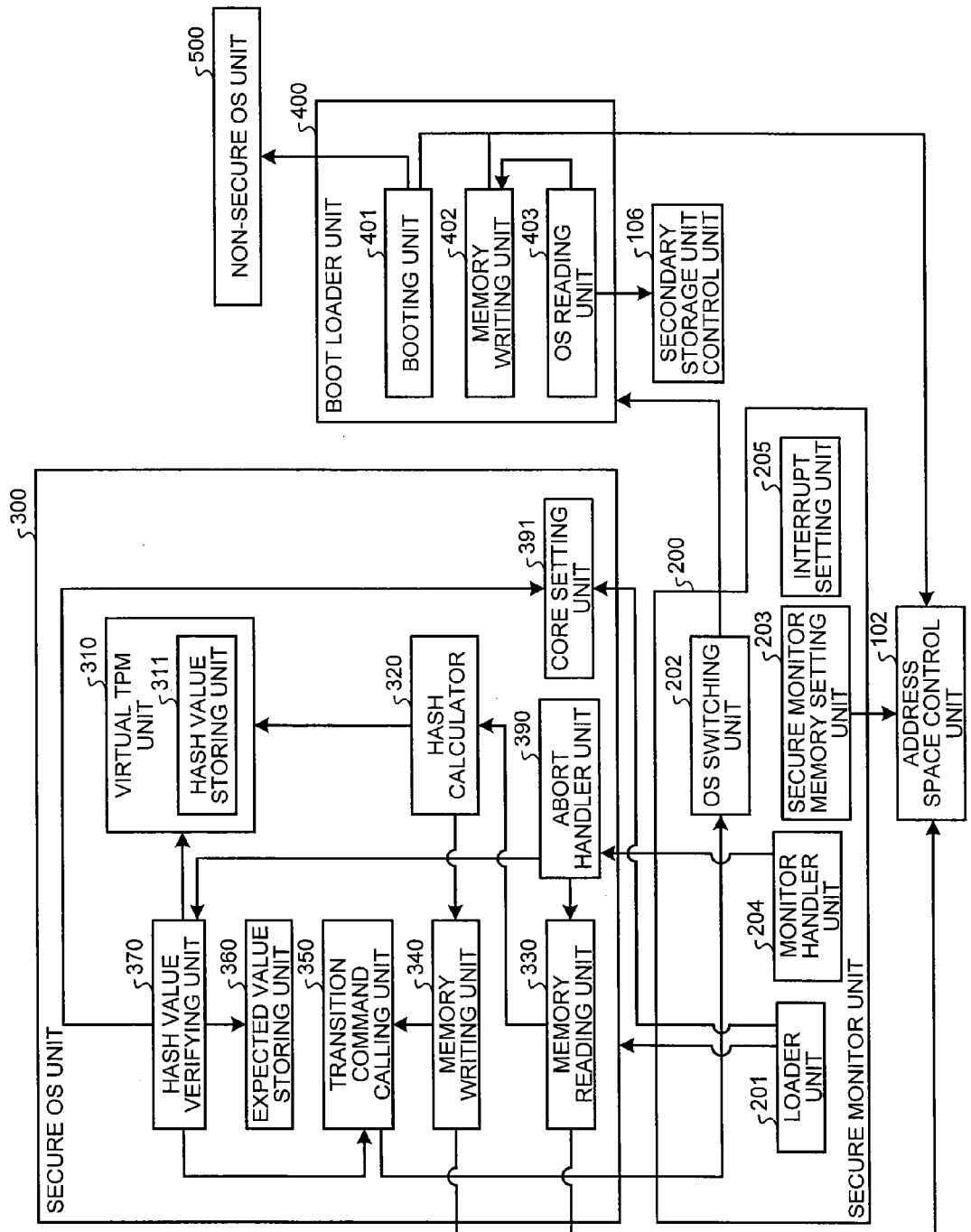
FIG. 15 is a functional configuration diagram of software components running in the main processor unit according to a fifth modification example of the first embodiment.

FIG. 15 is a diagram illustrating a different example of the configuration illustrated in FIG. 12. In the configuration illustrated in FIG. 12, it is assumed that the main processor unit 101 is a single core processor. In contrast, in FIG. 15 is illustrated a configuration in which the main processor unit 101 is a multicore processor. As compared to FIG. 12, the configuration illustrated in FIG. 15 differs in the way that the secure OS unit 300 includes a core setting unit 391, which applies a restriction that only a single core can operate until the hash value verifying unit 370 completes the verification operation, and operates the remaining cores after the verification operation is completed.

Figure 16:
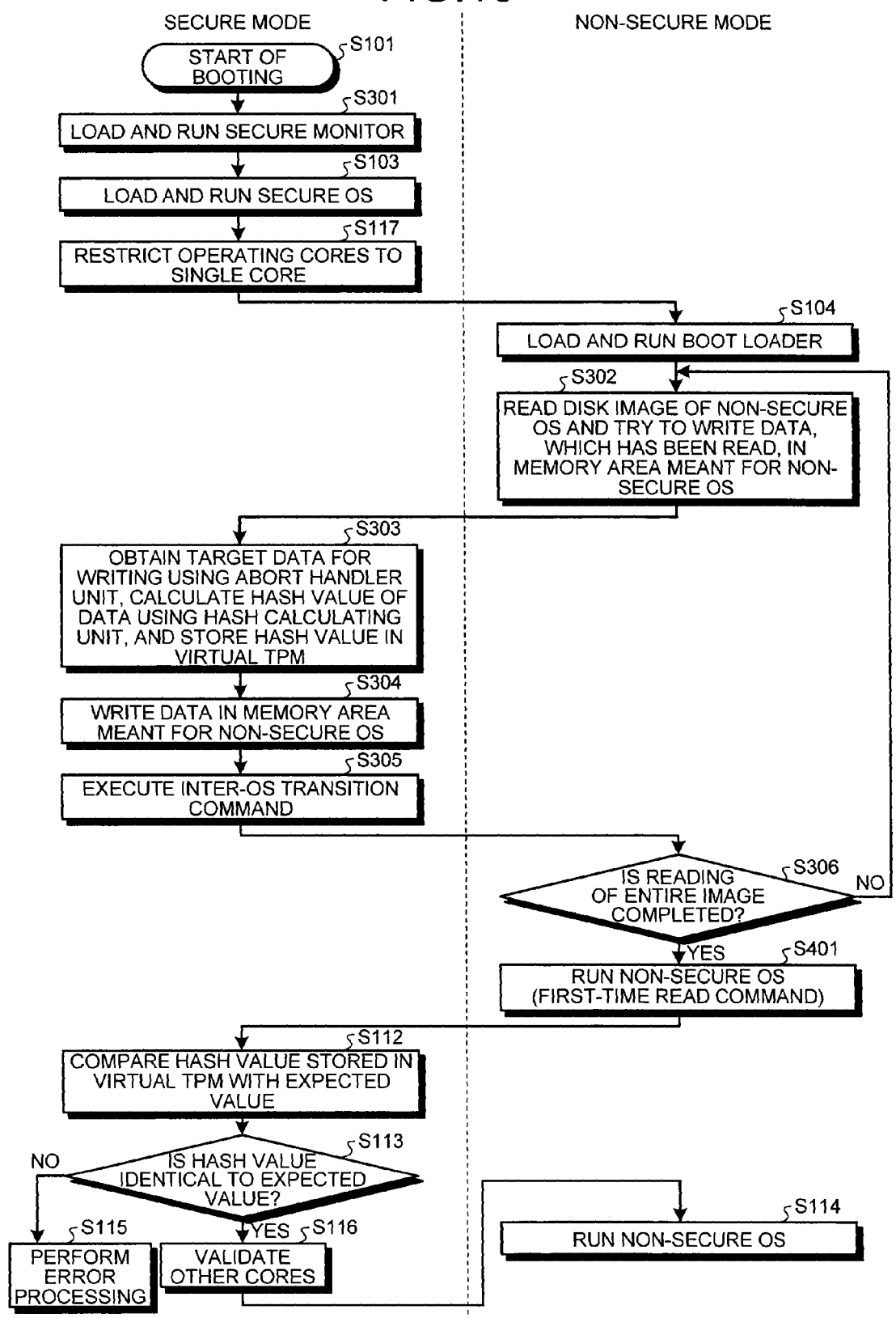
FIG. 16 is a flowchart for explaining a boot process of the non-secure OS unit in the information processing device according to the fifth modification example of the first embodiment.

FIG. 16 is a flowchart for explaining the operations starting from turning ON the power supply up to running the non-secure OS unit 500 in the information processing device 100 having the configuration illustrated in FIG. 15. Herein, till the operation in which the secure monitor unit 200 is loaded and executed, the operations are identical to the operations illustrated in FIG. 14.

The core setting unit 391 checks the number of cores in the main processor unit 101 before the inter-OS transition from the secure OS unit 300 to the non-secure mode. If the main processor unit 101 has a single core, then the subsequent operations need not be performed. However, if the main processor unit 101 has two or more cores, then the core setting unit 391 confirms that only a single core is operating in the main processor unit 101. If two or more cores are operating, then the core setting unit 391 restricts the operating cores to a single core (Step S117). Then, transition is done to the non-secure mode and the boot loader unit 400 is executed (Step S104).

Subsequently, till the operation in which the hash value verifying unit 370 verifies whether or not the hash value of the image of the non-secure OS unit 500, which is loaded in the memory area meant for the non-secure OS unit 500, is identical to the value stored in the expected value storing unit 360 (i.e., till the operation at Step S113), the operations are identical to the operations illustrated in FIG. 14. If the hash value and the expected value are identical (Yes at Step S113), then the core setting unit 391 validates the other cores that were restricted (Step S116) and runs the non-secure OS unit 500 (Step S114). Meanwhile, in order to prevent a situation in which the number of operating cores is changed by the boot loader unit 400; a memory area of the main memory unit 104 that corresponds to the register for setting the number of operating cores can be set in the secure memory area B, that is, in the area that is not allowed to be accessed for writing in the non-secure mode. Moreover, during the execution of the boot loader unit 400, before or after the transition occurs from the non-secure mode to the secure mode and data is written in the hash value storing unit 311 of the virtual TPM unit 310, an operation can be performed to check whether the boot loader unit 400 has changed the number of operating cores. If the boot loader unit 400 has changed the number of operating cores, either the system is stopped or error processing is performed in which a message indicating that the number of cores has been changed is displayed on a display screen (not illustrated).

Sixth Modification Example

Figure 17:
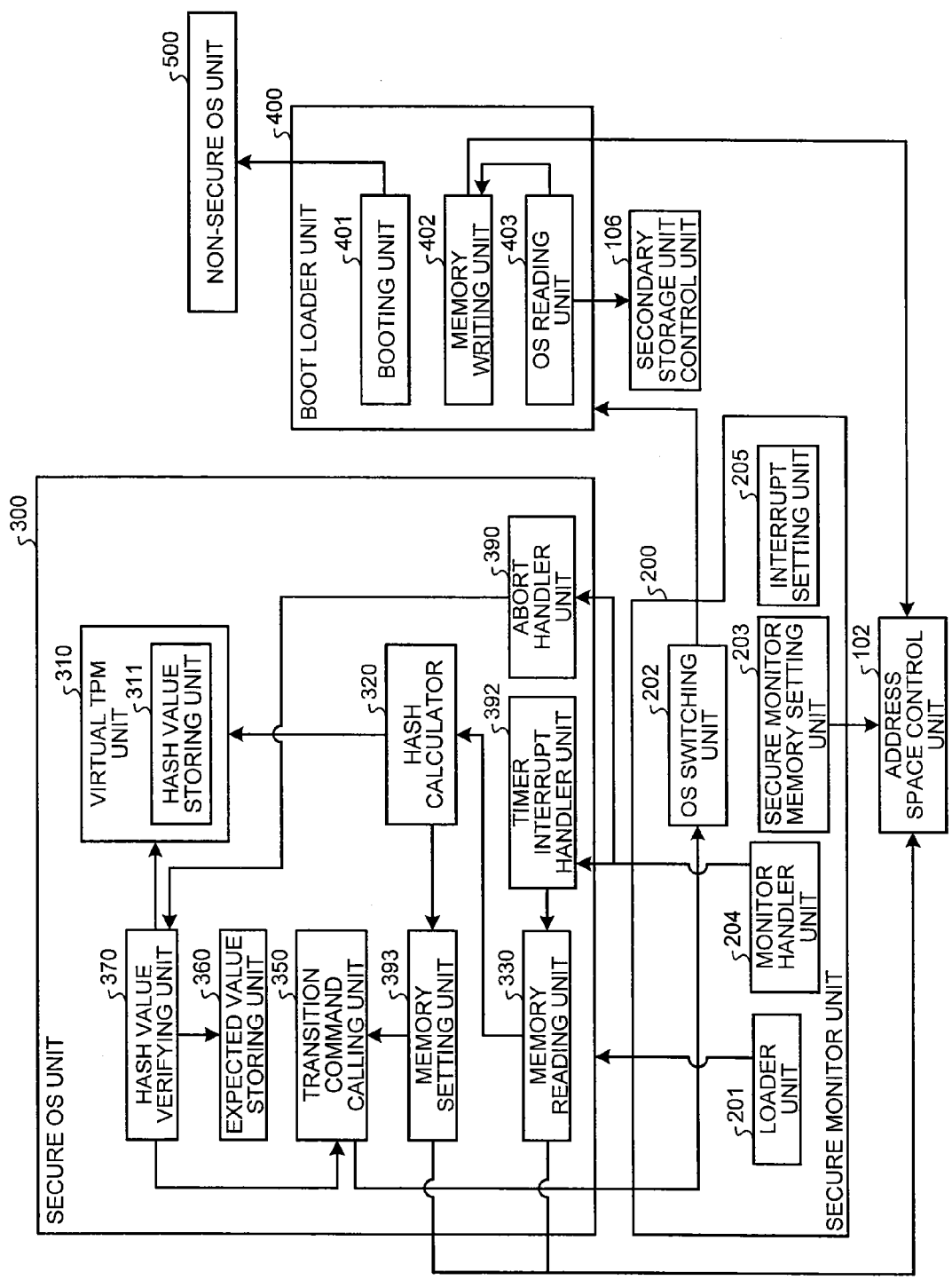
FIG. 17 is a functional configuration diagram of software components running in the main processor unit according to a sixth modification example of the first embodiment.

FIG. 17 is a diagram illustrating a different example of the configuration illustrated in FIG. 14. In the configuration illustrated in FIG. 12, the operation of writing the non-secure OS unit 500 in the main memory unit 104 is performed by the secure OS unit 300. In contrast, in the configuration illustrated in FIG. 17, the operation of writing the non-secure OS unit 500 in the main memory unit 104 can be performed by the boot loader unit 400, but the target area for verification is set to be non-writable by the secure OS unit 300.

As illustrated in FIG. 17, since the secure OS unit 300 does not write the data of the non-secure OS unit 500 in the main memory unit 104, the secure OS unit 300 does not include a memory writing unit. Moreover, every time data is stored in the hash value storing unit 311, the secure OS unit 300 makes changes in the memory area setting of the address space control unit 102. Hence, as compared to the configuration illustrated in FIG. 12, the configuration illustrated in FIG. 17 differs in the way that the secure OS unit 300 newly includes a memory setting unit 393 and a timer interrupt handler unit 392.

The memory setting unit 393 performs access control policy settings with respect to the address space control unit 102 in an identical manner to the secure monitor memory setting unit 203 of the secure monitor unit 200.

Figure 18:
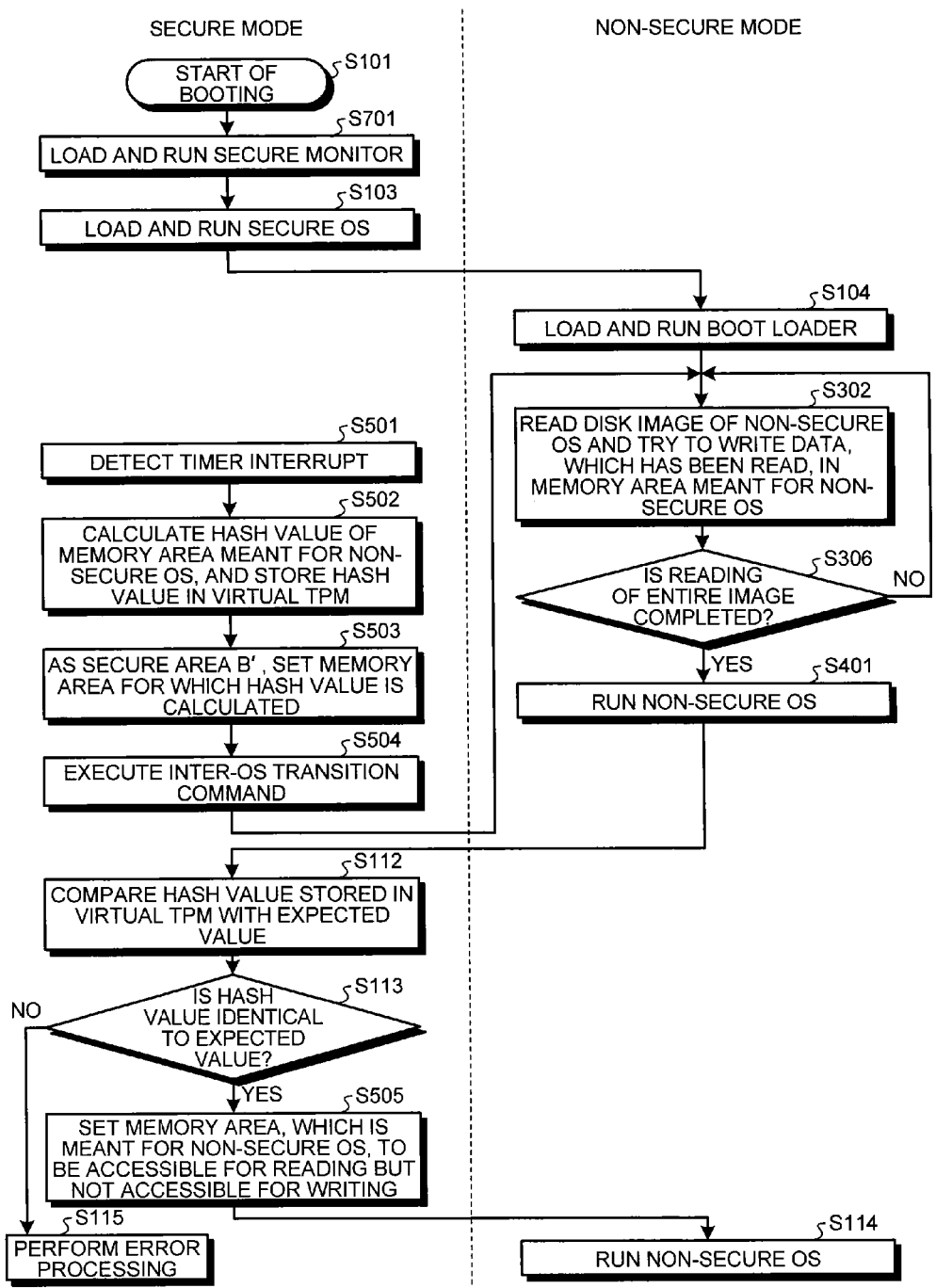
FIG. 18 is a flowchart for explaining a boot process of the non-secure OS unit in the information processing device according to the sixth modification example of the first embodiment.
Figure 19:
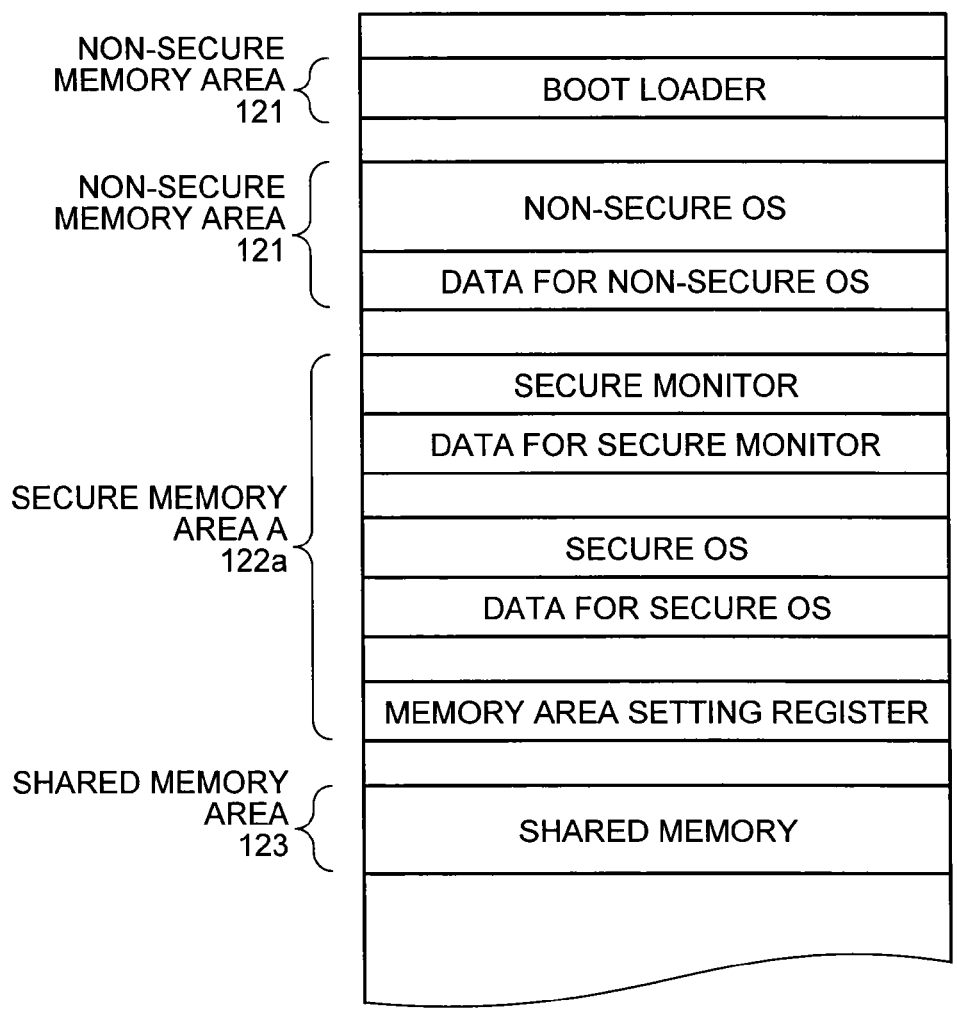
FIGS. 19 and 20 are diagrams illustrating examples in which a secure monitor memory setting unit segments the memory area according to the sixth modification example of the first embodiment.

FIG. 18 is a flowchart for explaining the operations starting from turning ON the power supply up to running the non-secure OS unit 500 in the information processing device 100 having the configuration illustrated in FIG. 17. FIG. 19 is a diagram illustrating an example in which the secure monitor memory setting unit 203 segments the memory area of the main memory unit 104. The setting for such segmentation is done by the secure monitor memory setting unit 203 as part of the operations performed during the device boot process. In the initial state, the area assigned to the non-secure OS unit 500 is set as the non-secure memory area 121.

Meanwhile, every time a certain time period elapses, the main processor unit 101 can detect an interrupt. That is, the main processor unit 101 can detect what is called a timer interrupt. That is achieved using an identical mechanism to the mechanism in which, when there is a policy violation in accessing the main memory unit 104, the address space control unit 102 sends an exception to the main processor unit 101. When a timer interrupt occurs, the interrupt setting unit 205 sets the address space control unit 102 so as to transfer the operations to the monitor handler unit 204. When the secure monitor unit 200 is loaded and booted, such setting is done by the interrupt setting unit 205 as part of the operations performed during the device boot process (Step S701).

The boot loader unit 400 reads a portion of the non-secure OS unit 500 from the secondary storage unit 107, and writes that portion in the non-secure memory area 121 that is meant for the non-secure OS unit 500 in the main memory unit 104. The writing operation is performed by the boot loader unit 400 that operates in the non-secure mode. As illustrated in FIG. 19, the memory area in which the non-secure OS unit 500 is written is set to be the non-secure memory area 121. Hence, the address space control unit 102 allows the writing operation, and a portion of the non-secure OS unit 500 is actually written in the non-secure memory area 121 of the main memory unit 104. This writing operation is performed by the boot loader unit 400 in a repeated manner.

Herein, a timer interrupt occurs during the operations of the boot loader, and the main processor unit 101 forcibly terminates the operations of the boot loader unit 400 and transfers the operations to the monitor handler unit 204 of the secure monitor unit 200 (Step S501). The monitor handler unit 204 stores the context of the boot loader unit 400. This operation can be performed in an identical manner to the operation of storing the context as performed by the OS switching unit 202 at the time of switching from the non-secure OS unit 500 to the secure OS unit 300. Then, the monitor handler unit 204 switches the operating state of the main processor unit 101 from the non-secure mode to the secure mode, and lastly executes the timer interrupt handler unit 392 of the secure OS unit 300.

Then, the timer interrupt handler unit 392 calculates the hash value up to that portion of the non-secure OS unit 500 for which the boot loader unit 400 has completed writing the image of the non-secure OS unit 500, and stores that hash value in the hash value storing unit 311 (Step S502). Moreover, the timer interrupt handler unit 392 sets the policy for the secure memory area B' 122b' as illustrated in FIG. 13 with respect to the verified memory area in the memory setting unit 393, and disallows the access for reading as well as the access for writing while in the non-secure mode (Step S503). That is, the verified memory area is neither allowed to be accessed for reading nor allowed to be accessed for writing while in the non-secure mode. The status of area setting in the main memory unit 104 at that time is illustrated in FIG. 20.

Figure 20:
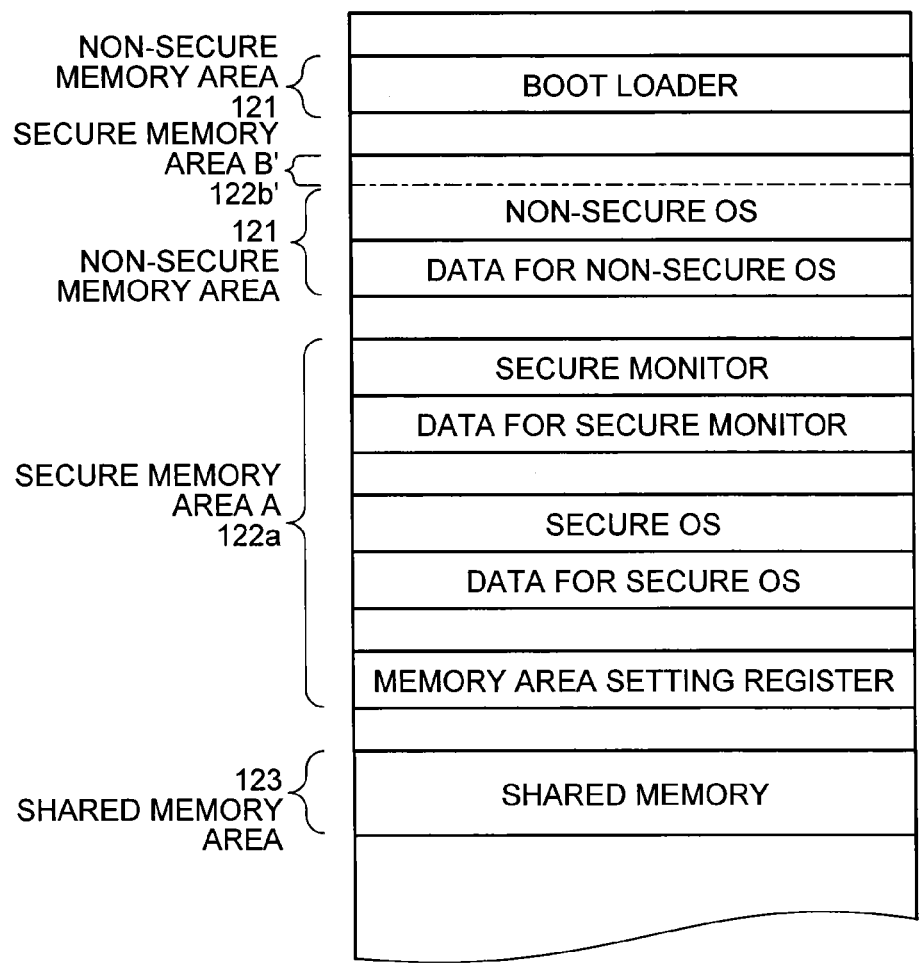

As illustrated in FIG. 20, for the verified portion in the main memory unit 104, the secure memory area B' 122b' is set. On the other hand, for each not-yet-verified portion in the main memory unit 104, the non-secure memory area 121 is set. Then, the transition command calling unit 350 switches the operating state of the main processor unit 101 from the secure mode to the non-secure mode (Step S504); restores the context; and resumes the operations of the boot loader unit 400 that were terminated due to a timer interrupt.

When the boot loader unit 400 reads the entire image of the non-secure OS unit 500 from the secondary storage unit 107; each non-secure memory area 121, in which the data of the non-secure OS unit 500 is stored, changes into the secure memory area B' 122b', that is, change into a memory area that is neither allowed to be accessed for reading nor allowed to be accessed for writing while in the non-secure mode. Once the entire image of the non-secure OS unit 500 is written in the non-secure memory areas 121 that are meant for the non-secure OS unit 500, the boot loader unit 400 runs the non-secure OS unit 500 (Step S401).

The process of running starts with the reading of the memory area meant for the non-secure OS unit 500. However, the memory area in which the data of the non-secure OS unit 500 is stored is now the secure memory area B' 122b', that is, is now disallowed from being read. For that reason, the address space control unit 102 does not allow reading, and generates an exception to the main processor unit 101. Then, the main processor unit 101 follows the setting of the interrupt setting unit 205 and transfers the operations to the monitor handler unit 204.

The monitor handler unit 204 stores the context of the non-secure OS unit 500. This operation can be performed in a similar manner to the operation of storing the context performed at the time when the OS switching unit 202 performs transition from the non-secure OS unit 500 to the secure OS unit 300. Then, the monitor handler unit 204 switches the operating state of the main processor unit 101 from the non-secure mode to the secure mode, and lastly executes the abort handler unit 390 of the secure OS unit 300.

Subsequently, the abort handler unit 390 of the secure OS unit 300 reads, from the main memory unit 104, the command immediately previous to the occurrence of the exception. Herein, the command immediately previous to the occurrence of the exception points to the command for reading the secure memory area B' 122b' in which the data of the non-secure OS unit 500 is stored. Thus, the secure OS unit 300 determines that there is going to be an attempt to execute the non-secure OS unit 500, and makes use of the hash value verifying unit 370 to determine whether or not the value stored in the hash value storing unit 311 is identical to the value stored in the expected value storing unit 360 (Step S112, Step S113).

If the hash value is identical to the expected value, then even if there is an attempt of a read access to the memory area meant for the non-secure OS unit 500 in the non-secure mode, the address space control unit 102 can be set not to generate exceptions thereafter. More particularly, when the main processor unit 101 is in the non-secure mode; the memory setting unit 393 performs setting, in the address space control unit 102, to allow reading but disallow writing in the memory area meant for the non-secure OS unit 500 (Step S505). Then, the secure OS unit 300 executes an OS transition command using the transition command calling unit 350 (Step S114). When inter-OS transition is performed by the OS switching unit 202 of the secure monitor unit 200, the boot loader unit 400 starts executing the non-secure OS unit 500, which is written in the non-secure memory area 121 of the main memory unit 104 in which the data for the non-secure OS unit 500 is stored. Meanwhile, if the hash value is not identical to the expected value, error processing is performed.

Seventh Modification Example

Figure 21:
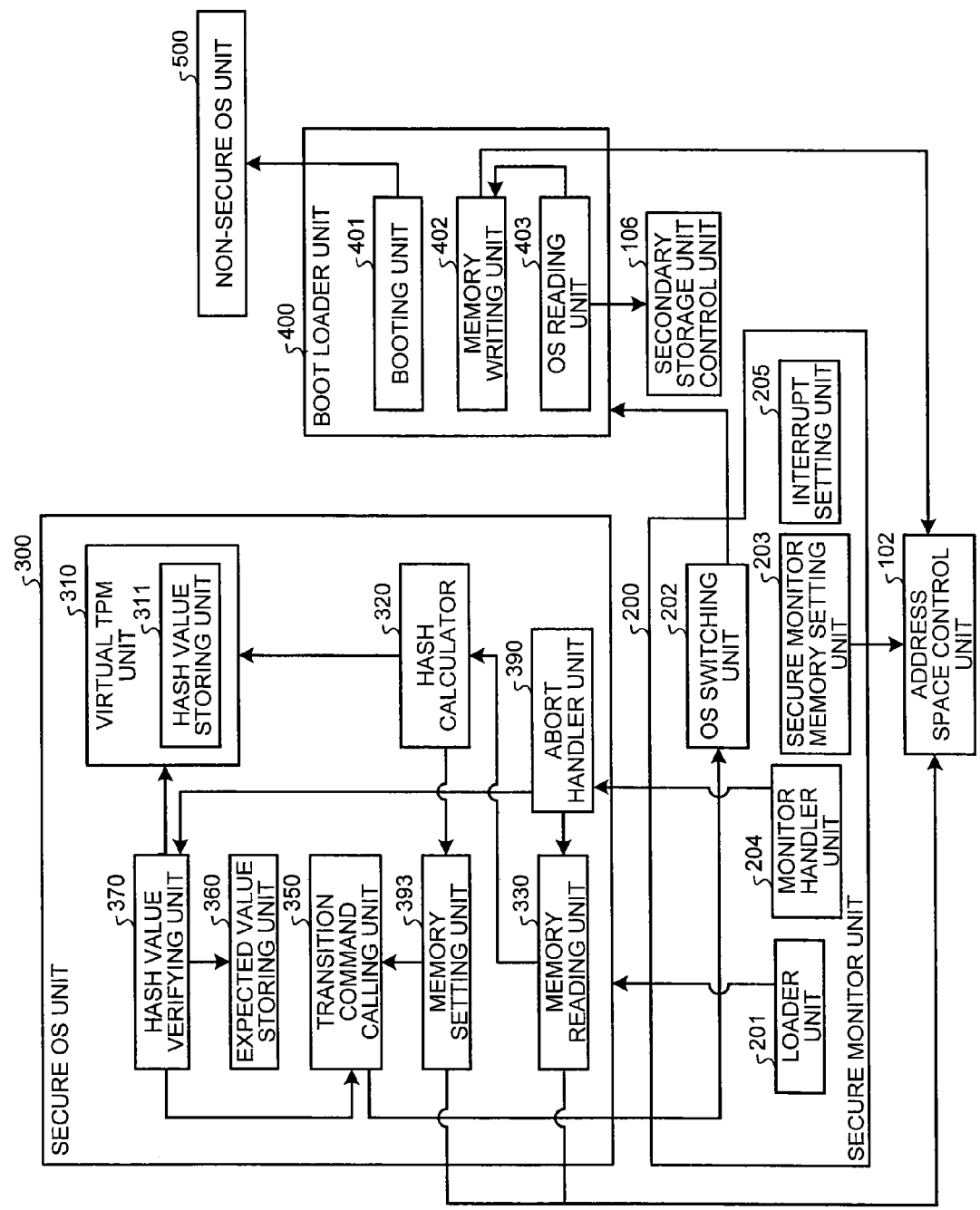
FIG. 21 is a functional configuration diagram of software components running in the main processor unit according to a seventh modification example of the first embodiment.

FIG. 21 is a diagram illustrating a different example of the configuration illustrated in FIG. 17. In the configuration illustrated in FIG. 21, the secure OS unit 300 does not include the timer interrupt handler unit 392. FIG. 22 is a diagram illustrating the policy about whether or not to allow the access to each type of memory area of the main memory unit 104 in the configuration illustrated in FIG. 21. The setting for such access control is also done by the secure monitor memory setting unit 203 as part of the operations performed during the device boot process. When the main processor unit 101 is in the non-secure mode, the secure memory area B' 122b' illustrated in FIG. 13 is neither allowed to be accessed for reading nor allowed to be accessed for writing. In contrast to the example illustrated in FIG. 13, a secure memory area C is allowed to be accessed for writing in FIG. 21.

Figure 23:
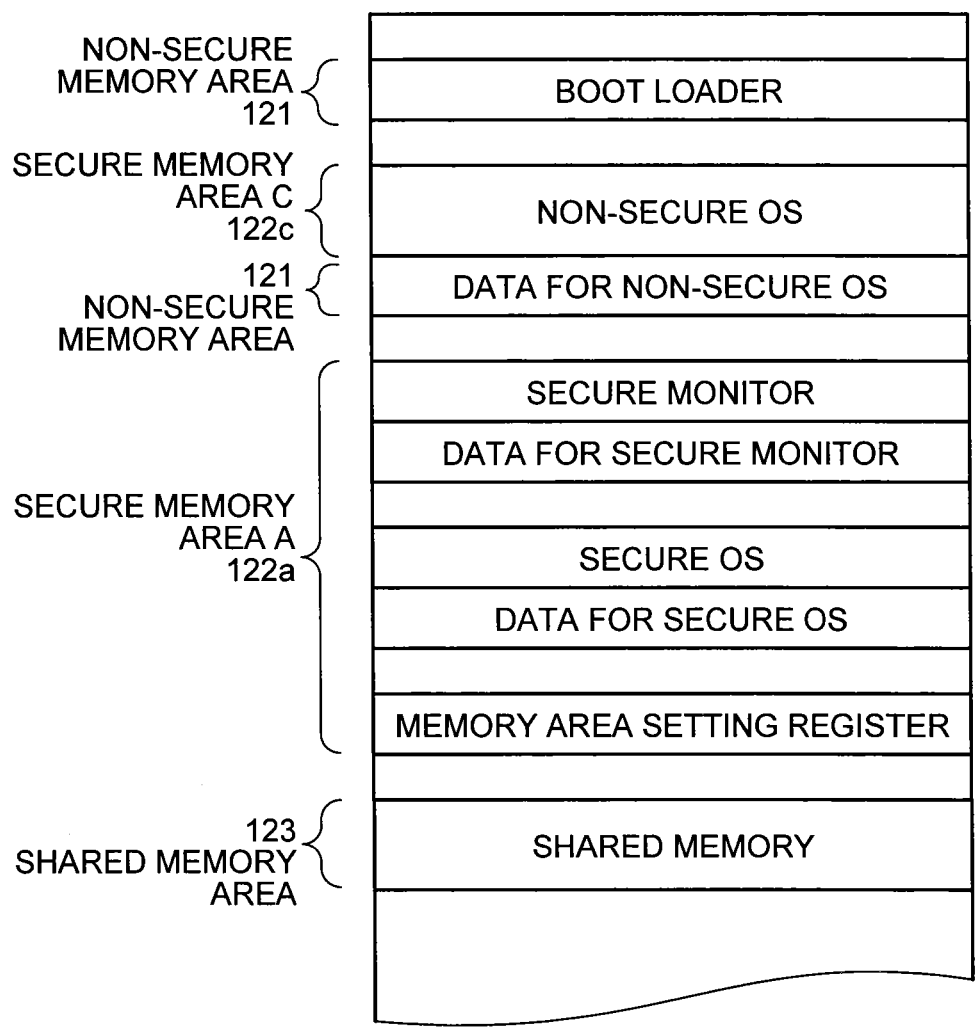
FIG. 23 is a diagram illustrating an example of the memory area of the main memory unit according to the seventh modification example of the first embodiment.

FIG. 23 is a diagram illustrating a configuration of each memory area of the main memory unit 104 present in the configuration illustrated in FIG. 21. The setting for this access control is also done by the secure monitor memory setting unit 203 as part of the operations performed during the device boot process. In the sixth modification example, when the main processor unit 101 is in the non-secure mode, the non-secure memory area 121 in which the non-secure OS unit 500 is written (i.e., the memory area meant for the non-secure OS) is allowed to be accessed for writing as well as for reading. In comparison to that, the example illustrated in FIG. 23 differs in the way that a secure memory area C 122c is allowed to be accessed for writing but not allowed to be accessed for reading.

Figure 24:
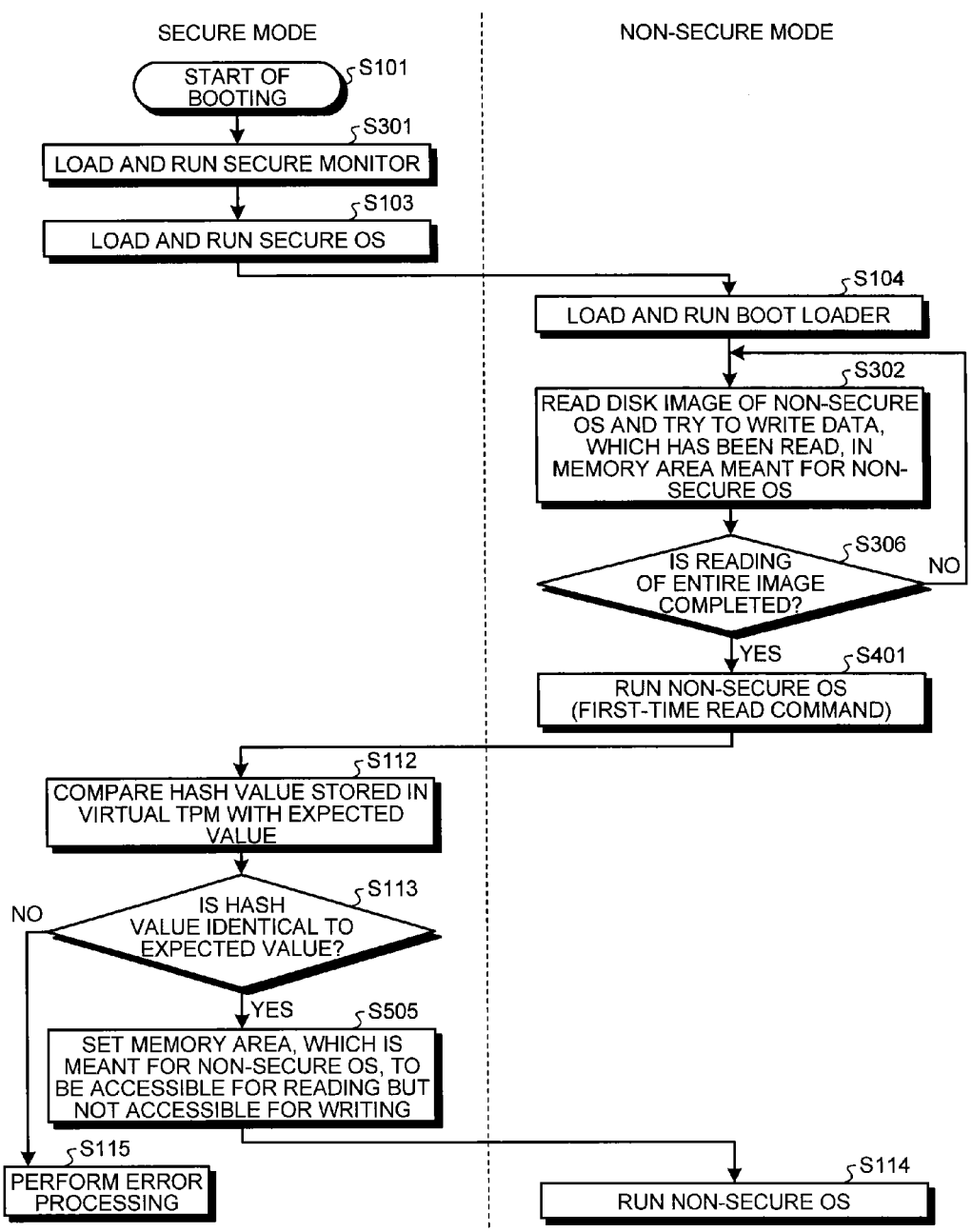
FIG. 24 is a flowchart for explaining a boot process of the non-secure OS unit in the information processing device according to the seventh modification example of the first embodiment.

FIG. 24 is a flowchart for explaining the operations starting from turning ON the power supply up to running the non-secure OS unit 500 in the information processing device 100. As illustrated in FIG. 24, till the operation in which the boot loader unit 400 reads the entire non-secure OS unit 500 from the secondary storage unit 107 and writes it in the secure memory area C 122c that is meant for the non-secure OS unit 500 in the main memory unit 104, the operations are identical to the operations performed from Step S101 to Step S302 illustrated in FIG. 18.

In the state prior to the execution of the boot loader unit 400, the memory area meant for the non-secure OS unit 500 in the main memory unit 104 is set to be the secure memory area C 122c. When the main processor unit 101 is in the non-secure mode, the secure memory area C 122c is allowed to be accessed for writing but is not allowed to be accessed for reading. That is, even in the case when the boot loader unit 400 operating in the non-secure mode writes the non-secure OS unit 500, which has been read from the secondary storage unit 107, in the non-secure memory area 121 meant for the non-secure OS unit 500; the address space control unit 102 does not block the writing operation but rather allows it. Moreover, even if such a writing operation is performed, neither the secure monitor unit 200 nor the secure OS unit 300 performs operations. Furthermore, even if a timer interrupt is notified to the main processor unit 101, neither the secure monitor unit 200 nor the secure OS unit 300 handles that timer interrupt.

Once the entire image of the non-secure OS unit 500 is written in the secure memory area C 122c meant for the non-secure OS unit 500, the boot loader unit 400 executes the non-secure OS unit 500 (Step S401). This execution starts by the reading of the secure memory area C 122c that is meant for the non-secure OS unit 500. However, the memory area in which the non-secure OS unit 500 is written is set to the secure memory area C 122c illustrated in FIG. 22, that is, is set to the memory area not allowed to be accessed for reading. For that reason, the address space control unit 102 does not allow reading and generates an exception to the main processor unit 101. Then, the main processor unit 101 follows the setting of the interrupt setting unit 205 and transfers the operations to the monitor handler unit 204.

The monitor handler unit 204 stores the context of the non-secure OS unit 500. This operation can be performed in a similar manner to the operation of storing the context performed at the time when the OS switching unit 202 performs transition from the non-secure OS unit 500 to the secure OS unit 300. Then, the monitor handler unit 204 switches the operating state of the main processor unit 101 from the non-secure mode to the secure mode, and lastly executes the abort handler unit 390 of the secure OS unit 300.

Subsequently, the abort handler unit 390 of the secure OS unit 300 reads, from the main memory unit 104, the command immediately previous to the occurrence of the exception. Herein, the command immediately previous to the occurrence of the exception points to the command for reading the secure memory area C 122c that is meant for the non-secure OS unit 500 in the main memory unit 104. Thus, the secure OS unit 300 determines that there is going to be an attempt to execute the non-secure OS unit 500, and makes use of the hash value verifying unit 370 to determine whether or not the value stored in the hash value storing unit 311 is identical to the value stored in the expected value storing unit 360 (Step S112).

If the hash value and the expected value are identical (Yes at Step S113); then even if there is an attempt of a read access to the memory area meant for the non-secure OS unit 500 in the non-secure mode, the address space control unit 102 is set not to generate exceptions thereafter. More particularly, when the main processor unit 101 is in the non-secure mode; the memory setting unit 393 performs setting, in the address space control unit 102, to allow reading but disallow writing in the memory area meant for the non-secure OS unit 500. Then, the secure OS unit 300 executes an OS transition command using the transition command calling unit 350 (Step S114). When inter-OS transition is performed by the OS switching unit 202 of the secure monitor unit 200, the boot loader unit 400 starts executing the non-secure OS unit 500 that is written in the non-secure OS unit 500 of the main memory unit 104. Meanwhile, if the hash value is not identical to the expected value (No at Step S113), error processing is performed (Step S115).

With such a configuration, prior to the execution of the non-secure OS unit 500, it is checked whether or not the expected non-secure OS unit 500 is written in the secure memory area C 122c that is meant for the non-secure OS unit 500 in the main memory unit 104. Then, at the time when the boot loader unit 400 reads the non-secure OS unit 500 from the secondary storage unit 107 and loads it in the main memory unit 104, the device can be run in a speedy manner because there is no need to switch the operating state from the non-secure mode to the secure mode and vice versa. Moreover, there is no need to modify the boot loader unit 400 to suit the first embodiment. That enables achieving reduction in the implementation cost of the device.

Second Embodiment

Given below is the explanation of a second embodiment. In the first embodiment, the non-secure OS unit 500 that is stored in the secondary storage unit 107 is not altered. Moreover, at the time of booting the information processing device 100, that is, at the time when the non-secure OS unit 500 is executed; the non-secure OS unit 500 is compared with the pre-calculated hash value so as to confirm whether the non-secure OS unit 500 represents the expected image. Only when the values match, the execution of the non-secure OS unit 500 is allowed.

Hence, in case the non-secure OS unit 500 is altered prior to the booting, the alteration can be detected at the time of booting. However, there is a risk of a different type of attack as follows: if a bug is incorporated in the non-secure OS unit 500 or in an application program running in the non-secure OS unit 500; the bug may be used in an unauthorized manner to alter the memory area meant for the non-secure OS unit 500 while the non-secure OS unit 500 is running. In the second embodiment, such a type of attack is also dealt with.

In the second embodiment, the explanation is given about the method of checking whether or not the non-secure OS unit 500 that is written in the main memory unit 104 is altered; or about the method of obtaining the signed hash value of the non-secure OS unit 500, which is currently stored in the main memory unit 104, from outside. With that, after the non-secure OS unit 500 is booted and is being executed; even if the memory area meant for the non-secure OS unit 500 in the main memory unit 104 is altered using an unauthorized computer program, it becomes possible to detect the alteration.

Meanwhile, it is possible to implement the second embodiment along with the first embodiment. That is, according to the method described in the first embodiment, it can be confirmed that the non-secure OS unit 500 that is stored in the secondary storage unit 107 at the time of booting the information processing device 100 is not altered, and it can be confirmed whether or not the image of the non-secure OS unit 500 represents the expected image. In addition, while the information processing device is in operation, it can be checked whether the non-secure OS unit 500 that is written in the main memory unit 104 is not altered.

Figure 25:
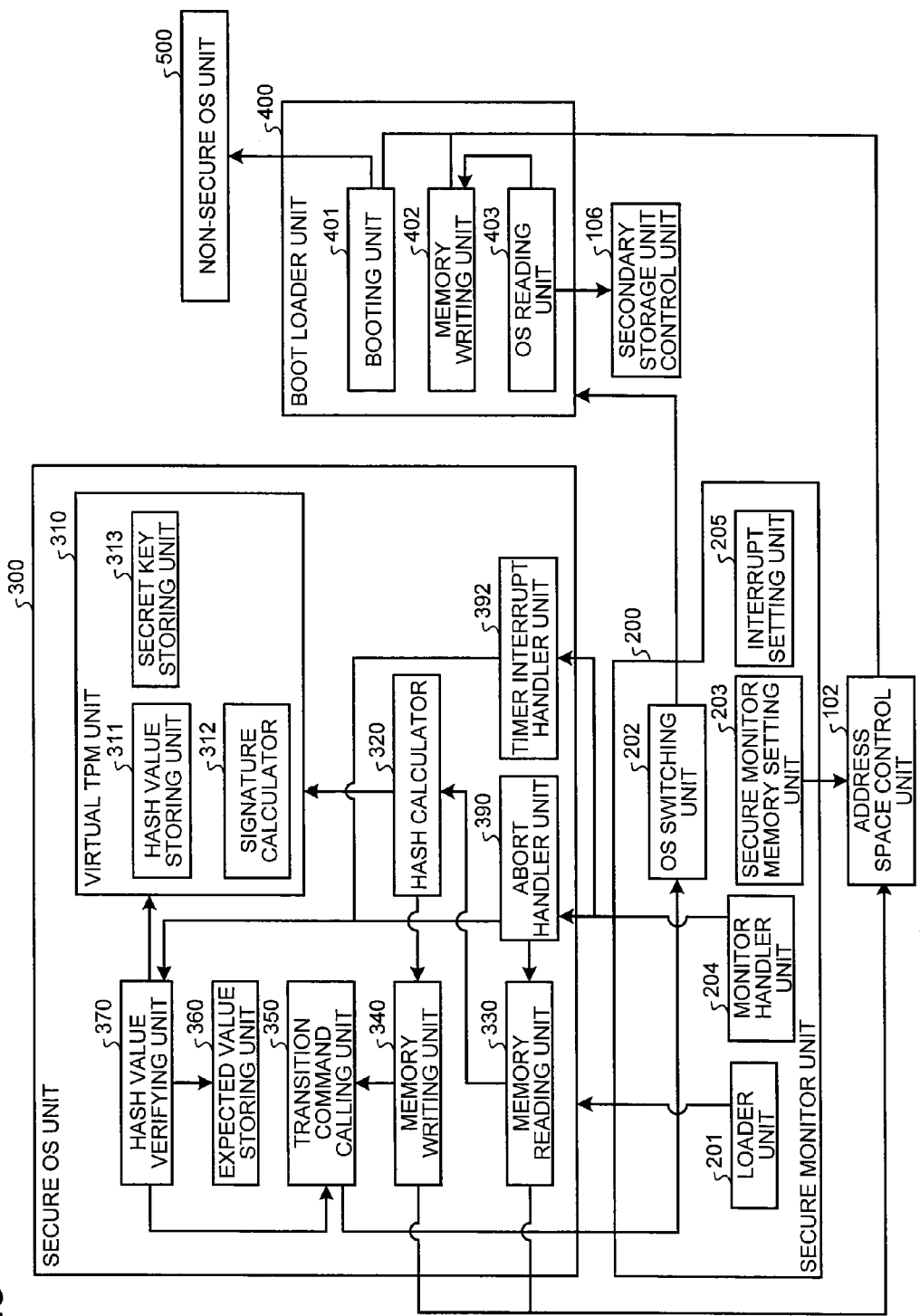
FIG. 25 is a diagram illustrating an exemplary configuration of software components running in the main processor unit according to a second embodiment.

FIG. 25 is a diagram illustrating an exemplary configuration of software components running in the main processor unit 101 in the information processing device 100 according to the second embodiment. Herein, the hardware configuration is identical to the first embodiment. As compared to the configuration illustrated in FIG. 12, the configuration illustrated in FIG. 25 differs in the way that the secure OS unit 300 includes the timer interrupt handler unit 392.

Every time a predetermined time period elapses, the timer interrupt handler unit 392 issues a hash value verification request to the hash value verifying unit 370. Then, every time a request is received, the hash value verifying unit 370 reads the image of the non-secure OS unit 500 that is written in the memory area meant for the non-secure OS unit 500 in the main memory unit 104; calculates the hash value of the non-secure OS unit 500 in a periodic manner; and confirms whether or not the hash value is identical to the expected value.

Figure 26A:
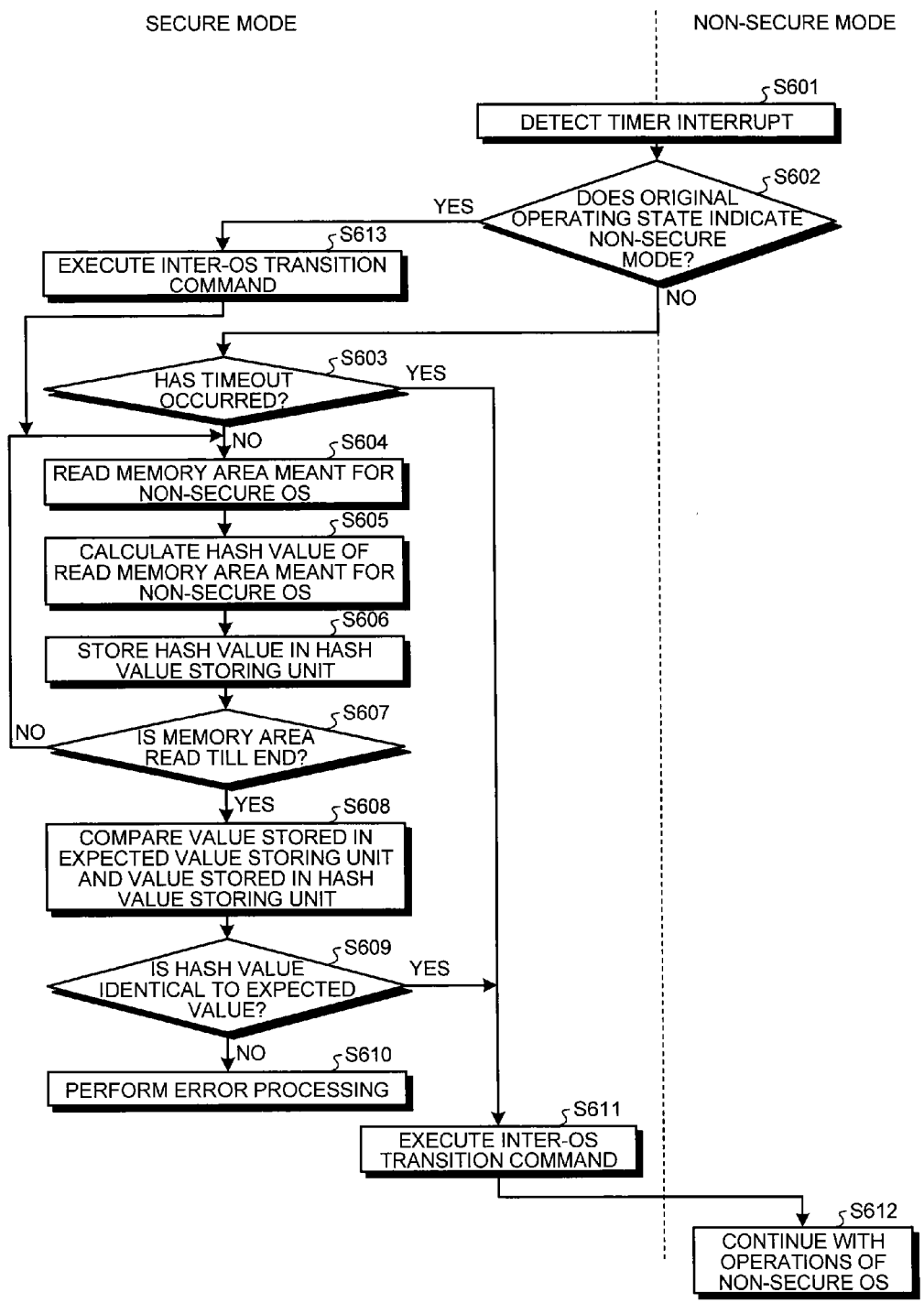
FIGS. 26A and 26B are flowcharts illustrating the operations performed when a timer interrupt occurs in the information processing device according to the second embodiment.
Figure 26B:
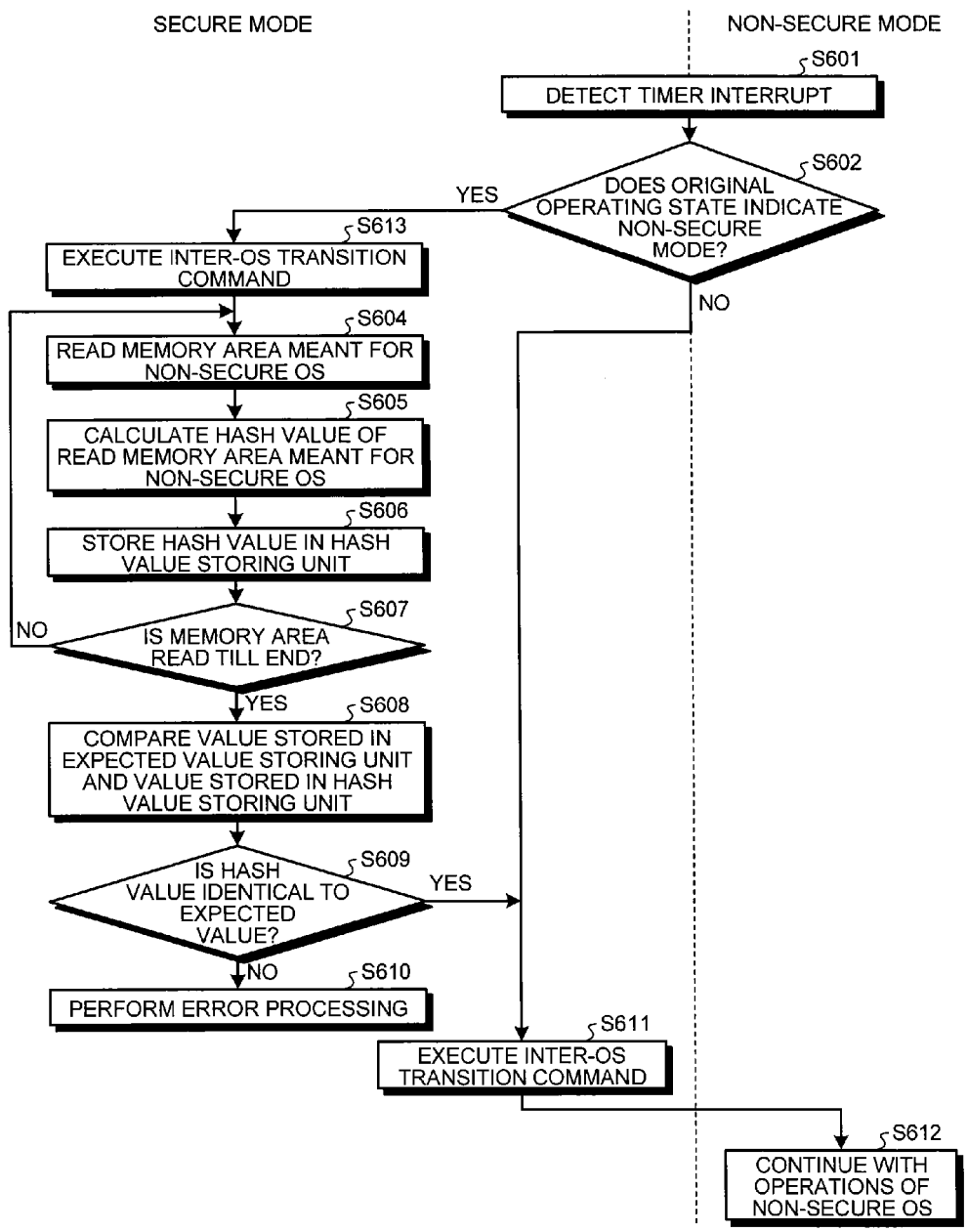

FIG. 26B is a sequence diagram illustrating the operations performed when a timer interrupt occurs. As part of the operations performed during the device boot process, when a timer interrupt occurs, the interrupt setting unit 205 of the secure monitor unit 200 performs setting to transfer the operations to the monitor handler unit 204.

The operations are started when a timer interrupt occurs and is detected while the information processing device 100 is in operation (Step S601). The main processor unit 101 forcibly terminates the operations of the non-secure OS unit 500, and transfers the operations to the monitor handler unit 204 of the secure monitor unit 200. Then, the monitor handler unit 204 firstly determines whether or not the timer interrupt occurred during the execution of the non-secure OS unit 500 or during the execution of the secure OS unit 300 (Step S602). Meanwhile, when a timer interrupt occurs; while the main processor unit 101 transfers the operations to the monitor handler unit 204 of the secure monitor unit 200, there is no change in the operating state. Hence, in order to find out the operating state before the occurrence of the timer interrupt, the present state of the main processor unit 101 can be found out.

In order to verify the image of the non-secure OS unit 500, it is necessary to read the non-secure OS unit 500 from the main memory unit 104 and calculate the hash value. Since the size of the non-secure OS unit 500 is large, it takes time to read the non-secure OS unit 500 and calculate the hash value. Hence, there are times when, in the short period of time starting from the occurrence of a timer interrupt up to the occurrence of the next timer interrupt, it is not possible to read the entire non-secure OS unit 500 from the main memory unit 104 and calculate the hash value. If the operation of calculating the hash value is continued, then it is not possible for the non-secure OS unit 500 to perform operations during that period of time. Thus, the non-secure OS unit 500 remains dormant. However, it is not desirable that the operations of the non-secure OS unit 500 are stopped for a long period of time because, in the case when a user interface such as a touch-sensitive panel is provided using the non-secure OS unit 500, the response time becomes slower; or because timeout occurs while performing network communication.

For that reason, when a timer interrupt occurs during the execution of the secure OS unit 300 (No at Step S602); it is determined that the executable time limit of the secure OS unit 300 has expired, and the operations are transferred to the non-secure OS unit 500 (Step S611). This operation can be performed in a similar manner to the operation of storing the context performed at the time when the OS switching unit 202 performs transition from the secure OS unit 300 to the non-secure OS unit 500. On the other hand, if a timer interrupt occurs during the execution of the non-secure OS unit 500 (Yes at Step S602), it is determined that the timing is right to check the non-secure OS unit 500 using the secure OS unit 300; transition to the secure mode is done; and the subsequent operations are performed (Step S613).

Meanwhile, in the case when the interval of occurrence of timer interrupts is short, the abovementioned determination need not be performed every time a timer interrupt occurs. FIG. 26A is a sequence diagram for explaining the operations performed in such a case. In the case when the interval of occurrence of timer interrupts is short, the secure mode is immediately switched to the non-secure mode. As a result, the amount of time for the secure OS unit 300 to perform operations decreases, thereby resulting in a decrease in the frequency at which the secure OS unit 300 verifies the image of the non-secure OS unit 500. In that regard, for example, if the timer interrupt occurs for N number of times, the abovementioned determination can be performed once. That is, during the secure mode, if the timer interrupt occurs for N number of times, the transition to the non-secure mode can be performed only once (Yes at Step S603). In this way, it can be determined whether or nor not the N-th timer interrupt has occurred. That is, it can be determined whether or not the executable time period in the secure mode has expired.

If a timer interrupt occurs during the execution of the non-secure OS unit 500 (Yes at Step S602); then an OS transition command is executed, and the context of the non-secure OS unit 500 is stored (Step S613). This operation can be performed in a similar manner to the operation of storing the context performed at the time when the OS switching unit 202 performs transition from the non-secure OS unit 500 to the secure OS unit 300. Then, the monitor handler unit 204 switches the operating state of the main processor unit 101 from the non-secure mode to the secure mode, and lastly executes the abort handler unit 390 of the secure OS unit 300.

The timer interrupt handler unit 392 reads OS data from the memory area of the main memory in which the non-secure OS unit 500 is written (Step S604). Then, the timer interrupt handler unit 392 makes use of the hash calculator 320 to calculate the hash value of the data read from the memory area (Step S605) and stores the hash value in the hash value storing unit 311 of the virtual TPM unit 310 (Step S606).

As described above, since the size of the non-secure OS unit 500 is large, it takes time to read the non-secure OS unit 500 and calculate the hash value. Hence, there are times when, in the short period of time starting from the occurrence of a timer interrupt up to the occurrence of the next timer interrupt, it is not possible to read the entire image of the non-secure OS unit 500 if the memory reading is performed only once. Hence, the hash value needs to be calculated by sequentially reading the memory area of the entire main memory unit 104. There, it is determined whether or not the memory area of the entire main memory unit 104 is read till the end (Step S607). If all reading is not completed (No at Step S607), the operations are repeated from Step S604. Once all reading is completed (Yes at Step S607), the hash value verifying unit 370 compares whether the image of the non-secure OS unit 500 that has been read is identical to the regular image of the non-secure OS unit 500 stored in the expected value storing unit 360 (Step S608). If the two images are identical (Yes at Step S609), that is, if there has been no alteration; then the value calculated by the secure OS unit 300 needs to be matched with the value stored in the expected value storing unit 360. In order to match the values, the size of the data that was sequentially read while calculating the value stored in the expected value storing unit 360 needs to be matched with the size of the data that is sequentially read during the calculation performed by the hash calculator 200 of the secure OS unit 300. Meanwhile, the data size is fixed in advance to a predetermined size.

In the case when a timer interrupt occurs during the calculation of the hash value of the non-secure OS unit 500 performed by the secure OS unit 300 and when the operations are transferred to the non-secure OS unit 500; an intermediate value gets stored in the hash value storing unit 311 of the virtual TPM unit 310. Then, at the time when, during the execution of the non-secure OS unit 500, a timer interrupt occurs and the operations are again transferred back to the timer interrupt handler unit 392 of the secure OS unit 300; the operations are resumed from the point of time at which the intermediate value was calculated.

When the hash value of the non-secure OS unit 500 is calculated till the end; the value stored in the expected value storing unit 360 and the value stored in the hash value storing unit 311 are compared. If the two values are identical, it indicates that the non-secure OS unit 500 has not been altered. Hence, it is determined that that the state is normal and an OS transition command is executed (Step S611), and the operations of the non-secure OS unit 500 are continued (Step S612). On the other hand, if the values are not identical, error processing is performed (Step S610).

As far as the error processing is concerned, one of the following methods can be implemented: stopping the system; displaying a message, which indicates that the verification has failed, on a monitor (not illustrated) connected to the information processing device; or executing an OS transition command using the transition command calling unit 350 in an identical manner to the case of successful verification and then executing the non-secure OS unit 500.

Meanwhile, even if the verification of the non-secure OS unit 500 is not successful; as long as the non-secure OS unit 500 is able to know the information indicating failure in the verification, there are times when it is suitable to continue with the boot process of the non-secure OS unit 500. For that reason, with respect to the value stored in the hash value storing unit 311 of the virtual TPM unit 310, the signature calculator 312 can perform signature calculation in which the value stored in the secret key storing unit 313 is used as the secret key; and can send the calculated value to the non-secure OS unit 500. Of course, even in the case when the verification is successful, the signed hash value may still be sent to the non-secure OS unit 500.

Third Embodiment

In a third embodiment, a mechanism for data protection is provided in which an application program to be protected is executed in the secure OS unit 500 so that the operations of the application program are protected from unauthorized alterations and it is ensured that the data generated by the application program is accessible only by that application program. For example, assume that an application program running in the secure OS unit generates data, and that the same application program reuses that data. In that case, even if the data is once output to a non-secure unit or a secondary memory device; the generated value and the value to be reused is identical, and it is desirable to provide a measure to prevent alteration. Moreover, depending on the use cases, there are times when it is necessary to apply a restriction by which the data generated in an information processing device can be reused only by that information processing device or a restriction by which the data generated by an application program can be used only by that application program. In the third embodiment, such issues are resolved.

Figure 27:
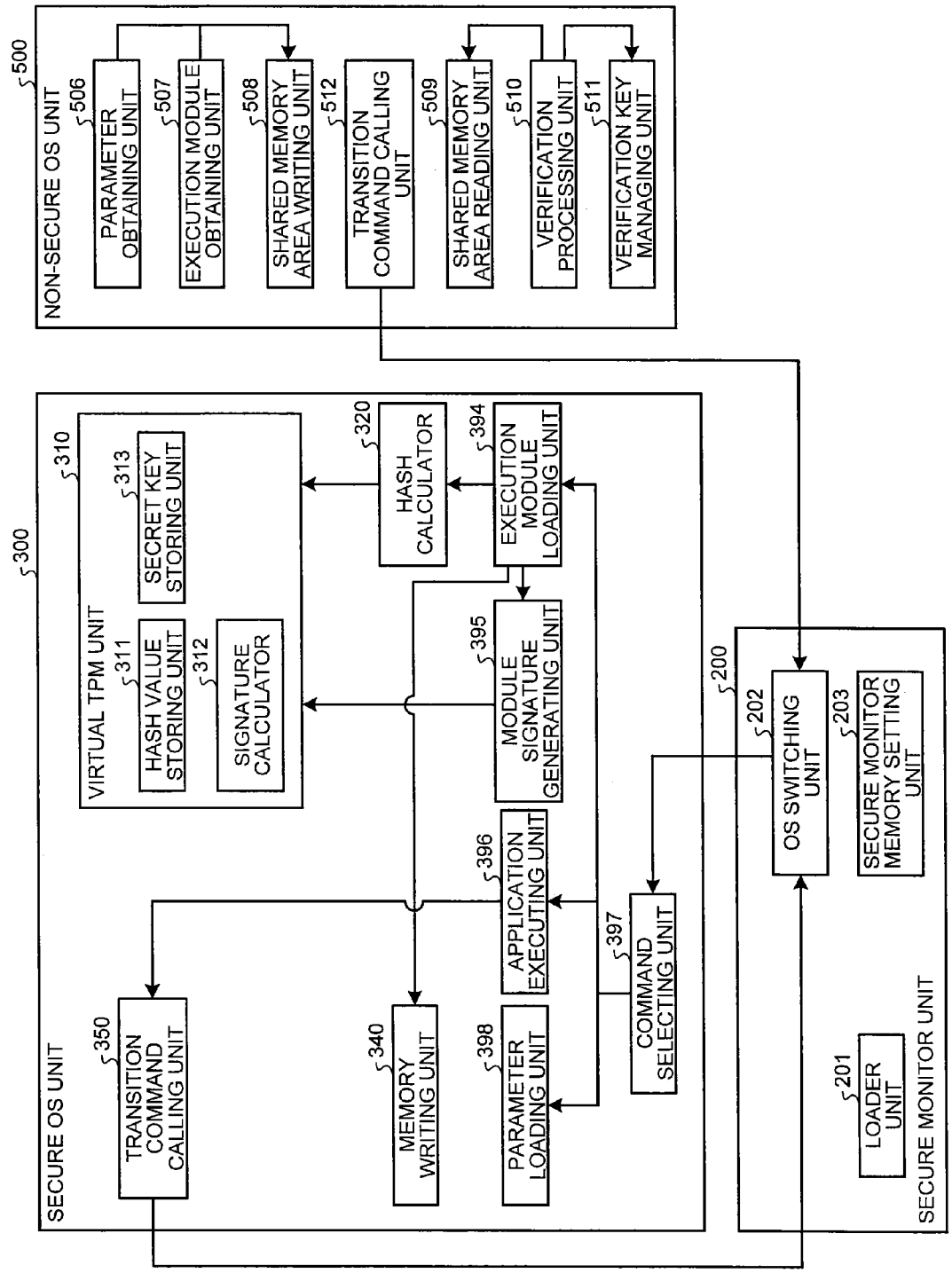
FIG. 27 is a diagram illustrating an exemplary configuration of software components running in the main processor unit according to a third embodiment.

FIG. 27 is a diagram illustrating an exemplary configuration of software components running in the main processor unit 101 in the information processing device 100 according to the third embodiment. Meanwhile, the hardware configuration is identical to the first embodiment. Herein, the software components include the secure monitor unit 200, the secure OS unit 300, and the non-secure OS unit 500.

The secure monitor unit 200 switches between the secure OS unit 300 and the non-secure OS unit 500. Moreover, at the time of booting, the secure monitor unit 200 loads and executes the secure OS unit 300.

Herein, as compared to the first embodiment, the secure OS unit 300 additionally includes an execution module loading unit 394, a module signature generating unit 395, an application executing unit 396, a command selecting unit 397, and a parameter loading unit 398. When the operations are transferred from the non-secure OS unit 500 to the secure OS unit 300, the command selecting unit 397 selects the operation to be performed next in the secure OS unit 300. The method of selection is described later.

The execution module loading unit 394 loads, in the memory area of the secure OS unit 300, an application program to be run in the secure OS unit 300 (hereinafter, called an execution module). The parameter loading unit 398 loads parameters, which are required for the application program to be run in the secure OS unit 300, in the memory area of the secure OS unit 300. The application executing unit 396 executes the application program that has been loaded in the memory area of the secure OS unit 300. The hash calculator 320 calculates the hash value corresponding to the application program that has been loaded in the memory area of the secure OS unit 300. The module signature generating unit 395 generates, with respect to the hash value generated by the hash calculator 320, a signature using a secret key stored in the virtual TPM unit 310. The memory writing unit 340 stores (writes) data in the main memory unit 104. This operation of storing the data is performed via the address space control unit 102. The virtual TPM unit 310 and the transition command calling unit 350 have an identical configuration to the first embodiment. Meanwhile, the parameters and the execution module point to the data required for the execution. For example, if the execution module performs encryption by means of public key encryption, then the parameters represent the parameters required for encryption calculation of the public key encryption or target plaintext data for encryption. In contrast, if the execution module performs decryption using symmetric-key cryptography, then the parameters represent encrypted data to be decrypted. Meanwhile, in case the execution module does not require parameters during execution, then it is not mandatory to dispose the parameter loading unit 398.

The non-secure OS unit 500 includes a parameter obtaining unit 506, an execution module obtaining unit 507, a shared memory area writing unit 508, a shared memory area reading unit 509, a verification processing unit 510, a verification key managing unit 511, and the transition command calling unit 512. Herein, the transition command calling unit 512 has an identical configuration to the first embodiment. Meanwhile, in case the execution module does not require parameters during execution, then it is not mandatory to dispose the parameter obtaining unit 506. Moreover, in case no output is done to the shared memory area 123 after the execution of the execution module, then it is not mandatory to dispose the shared memory area reading unit 509 too.

The execution module obtaining unit 507 obtains an execution module, which is to be executed in the secure OS unit 300, from the secondary storage unit 107 or from a device connected via a network. Similarly, the parameter obtaining unit 506 obtains parameters, which are required by the execution module that is to be executed in the secure OS unit 300, from the secondary storage unit 107 or from a device connected via a network. The shared memory area writing unit 508 stores (writes) the execution module, which is to be executed in the secure OS unit 300, and the parameters in the main memory unit 104. This storing operation is performed via the address space control unit 102.

The shared memory area reading unit 509 reads (loads), from the main memory unit 104, the signed hash value generated in the secure OS unit 300 for the execution module to be executed in the secure OS unit 300; and reads the processing result of the execution module generated by the application program executed in the secure OS unit 300. This reading operation is performed via the address space control unit 102.

Figure 28:
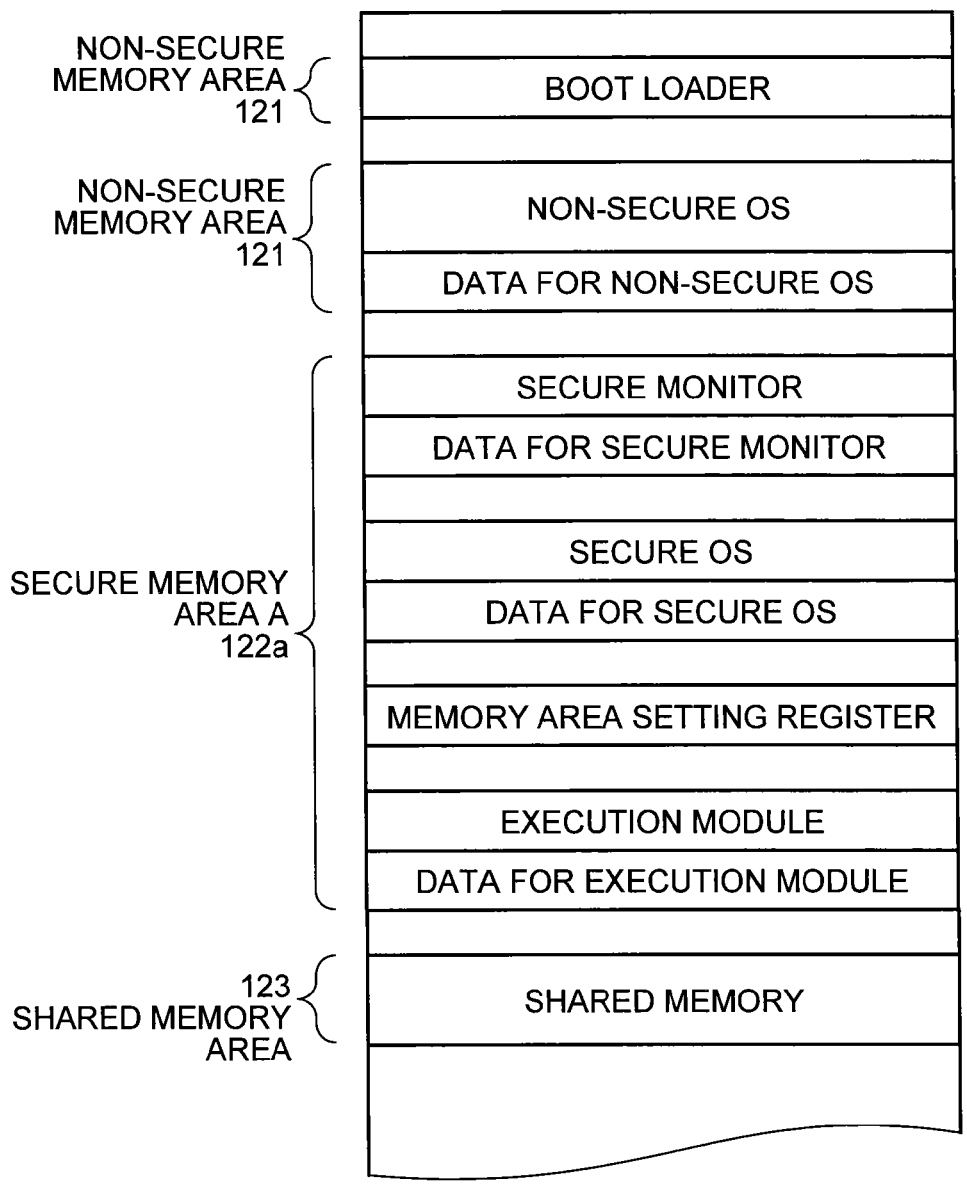
FIG. 28 is a diagram illustrating an example of the memory area of the main memory unit according to the third embodiment.

The verification processing unit 510 verifies, using a public key, the validness of the signature generated in the secure OS unit 300 for the execution module executed in the secure OS unit 300. The verification key managing unit 511 stores therein and manages the public key used by the verification processing unit 510. FIG. 28 is a diagram illustrating a memory map of the main memory unit 104 according to the third embodiment. As compared to the memory map illustrated in FIG. 9 according to the first embodiment, the memory map illustrated in FIG. 28 differs in the way that an execution module and execution module data are stored in the secure memory area A 122a. Thus, unless in the secure mode, the execution module is neither allowed to be accessed for writing nor allowed to be accessed for reading.

Figure 29:
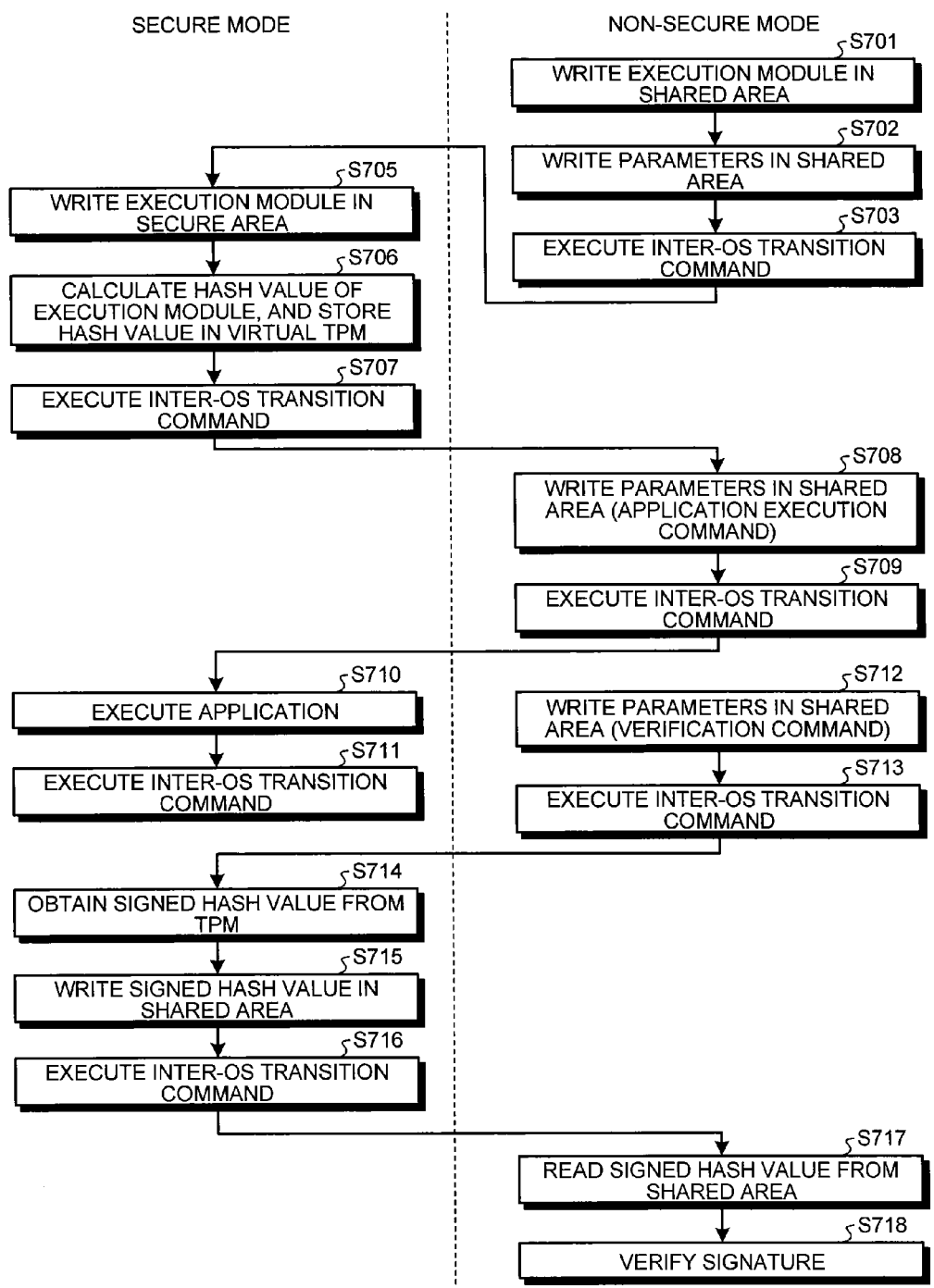
FIG. 29 is a flowchart for explaining the operations performed at the time of executing an execution module in the non-secure OS unit according to the third embodiment.

FIG. 29 is a flowchart for explaining the operations performed at the time of executing an execution module in the non-secure OS unit 500 of the information processing device 100. Firstly, the non-secure OS unit 500 or an application program running in the non-secure OS unit 500 obtains an execution module, which is to be executed in the secure OS unit 300, using the execution module obtaining unit 507; and writes the execution module in the shared memory area 123 of the main memory unit 104 using the shared memory area writing unit 508 (Step S701). Moreover, the non-secure OS unit 500 or an application program running in the non-secure OS unit 500 writes the parameters, which are required by the execution module to be executed in the secure OS unit 300, also in the shared memory area 123 (Step S702). Herein, since the shared memory area 123 is allowed by the address space control unit 102 to be accessed for reading and writing also in the non-secure mode (see FIG. 4); the abovementioned writing operations are performed successfully.

Then, the transition command calling unit 404 instructs the main processor unit 101 to perform inter-OS transition (Step S703). At that time, the transition command calling unit 404 notifies the secure OS unit 300 that the command is a load command related to the execution module and the parameters. As far as the method of notifying about the load command is concerned, it is possible to write the command type in the shared memory area 123.

The main processor unit 101 calls the OS switching unit 202 of the secure monitor unit 200. Then, the OS switching unit 202 performs the operations of saving the context of the non-secure OS unit 500, restoring the context of the secure OS unit 300, and switching the mode. After that, the OS switching unit 202 calls the command selecting unit 397.

The command selecting unit 397 identifies that the command to be executed after the present transition is a load command related to the execution module and the parameters; and thus calls the execution module loading unit 394 and the parameter loading unit 398. As far as the method of identifying the command type is concerned, it is possible to read the command type written in the shared memory area 123.

Then, the parameter loading unit 398 copies and writes the parameters of the execution module, which are written in the shared memory area 123, in the secure memory area A 122a that is the memory area meant for parameters. Similarly, the execution module loading unit 394 copies and writes an image of the execution module, which is written in the shared memory area 123, in the secure memory area A 122a that is the memory area meant also for execution modules (Step S705). At that time, the parameter loading unit 398 as well as the execution module loading unit 394 is running in the secure mode. Since the secure memory area A 122a, which is the memory area meant for execution modules and parameters, is allowed to be accessed for writing in the secure mode; the abovementioned writing operations are performed successfully. Then, the execution module loading unit 394 calls the hash calculator 320.

The hash calculator 320 calculates the hash value of the executed module that has been copied in the secure memory area A 122a, and sends the hash value to the virtual TPM unit 310. Then, the virtual TPM unit 310 stores the hash value in the hash value storing unit 311 (Step S706). Subsequently, the secure OS unit 300 executes an OS transition command using the transition command calling unit 350 (Step S707). The OS switching unit 202 of the secure monitor unit 200 performs the operations of saving the context of the secure OS unit 300, restoring the context of the non-secure OS unit 500, and switching the mode. After that, the non-secure OS unit 500 resumes the operations that were terminated due to inter-OS transition.

Then, the non-secure OS unit 500 or an application program running in the non-secure OS unit 500 writes an instruction about next application program execution in the shared memory area 123 of the main memory unit 104 (Step S708). Subsequently, the transition command calling unit 404 again performs inter-OS transition (Step S709).

The command selecting unit 397 refers to the command type written in the shared memory area 123 and identifies that the command to be executed after the present transition indicates execution of the execution module; and thus calls the application executing unit 396. Then, the application executing unit 396 executes the code that is written in the secure memory area A 122a, which is the memory area meant for the execution module in the main memory unit 104 (Step S710). The execution module makes use of the parameters, which are copied in the secure memory area A 122a, as may be necessary and performs operations.

Once the execution is completed, the secure OS unit 300 executes an OS transition command using the transition command calling unit 350, and resumes the operations of the non-secure OS unit 500 (Step S711).

At that time, the execution module can write the operation result in the shared memory area 123. For example, when the code enables the execution module to generate a public key and a secret key using a public key algorithm, the generated public key can be written in the shared memory area 123 of the main memory unit 104 so that the non-secure OS unit 500 can use the public key. Meanwhile, till now, the explanation was given about the case in which a load command of the execution module and an execution command of the execution module are different commands, and the command selecting unit identifies the command that has been issued. Herein, the load command as well as the execution command is used to perform transition to the secure mode. Alternatively, the loading and execution of the execution module can be performed in only a single transition. In that case, after Step S706, the operation at Step S710 is performed without the transition to the non-secure state.

Moreover, as may be necessary, the non-secure OS unit 500 can verify whether or not the execution module executed in the secure OS unit 300 is the intended execution module. Herein, first of all, the premise is that the non-secure OS unit 500 possesses in advance the public key corresponding to the secret key stored in the secret key storing unit 313 of the virtual TPM unit 310. For that, a method can be implemented in which an interface for obtaining the public key is provided for the virtual TPM unit 310, and the secure OS unit 300 writes the public key in the shared memory area 123.

Then, the non-secure OS unit 500 writes a value indicating verification as the command type in the shared memory area 123, and again performs inter-OS transition using the transition command calling unit 404 (Step S713).

The command selecting unit 397 of the secure OS unit 300 reads the command type from the shared memory area 123, identifies that the command to be executed after the present transition is verification of the execution module, and calls the module signature generating unit 395. Then, the module signature generating unit 395 obtains the value stored in the hash value storing unit 311 of the virtual TPM unit 310. This hash value is the hash value of the execution module calculated at Step S706. The module signature generating unit 395 requests the signature calculator 312 to perform a signing operation with respect to the obtained hash value using the secret key stored in the secret key storing unit 313. Then, the module signature generating unit 395 generates a signature corresponding to the hash value of the execution module, and obtains the signed hash value (Step S714).

Meanwhile, the secure OS unit 300 can also be configured to be able to load a plurality of execution modules. In that case, numbers are assigned to uniquely identify the execution modules, and the hash value for each execution module is stored in the hash value storing unit 311. At the time of requesting a signature, the numbers enabling unique identification can be referred to for checking the execution module with respect to which the hash value is requested, and the virtual TPM unit 310 can be instructed to request for the signed hashed value corresponding to that particular hash value.

Upon receiving the signed hash value from the virtual TPM unit 310, that is, upon receiving the signed hash value of the execution module; the secure OS unit 300 writes that hash value in the shared memory area 123 (Step S715); executes an OS transition command using the transition command calling unit 350; and resumes the operations of the non-secure OS unit 500 (Step S716).

Subsequently, the non-secure OS unit 500 reads the signed hash value from the shared memory area 123 (Step S717), and verifies the signature of that hash value using the public key that is being possessed from before (Step S718). In this way, it becomes possible for the non-secure OS unit 500 to confirm the validness of the execution module that was executed in the secure OS unit 300. Of course, it is not always necessary for the non-secure OS unit 500 to perform signature verification. Alternatively, the public key can be provided in advance to the verifier; the signed hash value can be sent to another device via a network based on a verification request; and a device connected to the network can verify the signature. With that, whether or not an execution module executed in the information processing device 100 is correct can be verified from a remote location.

Eighth Modification Example

Figure 30:
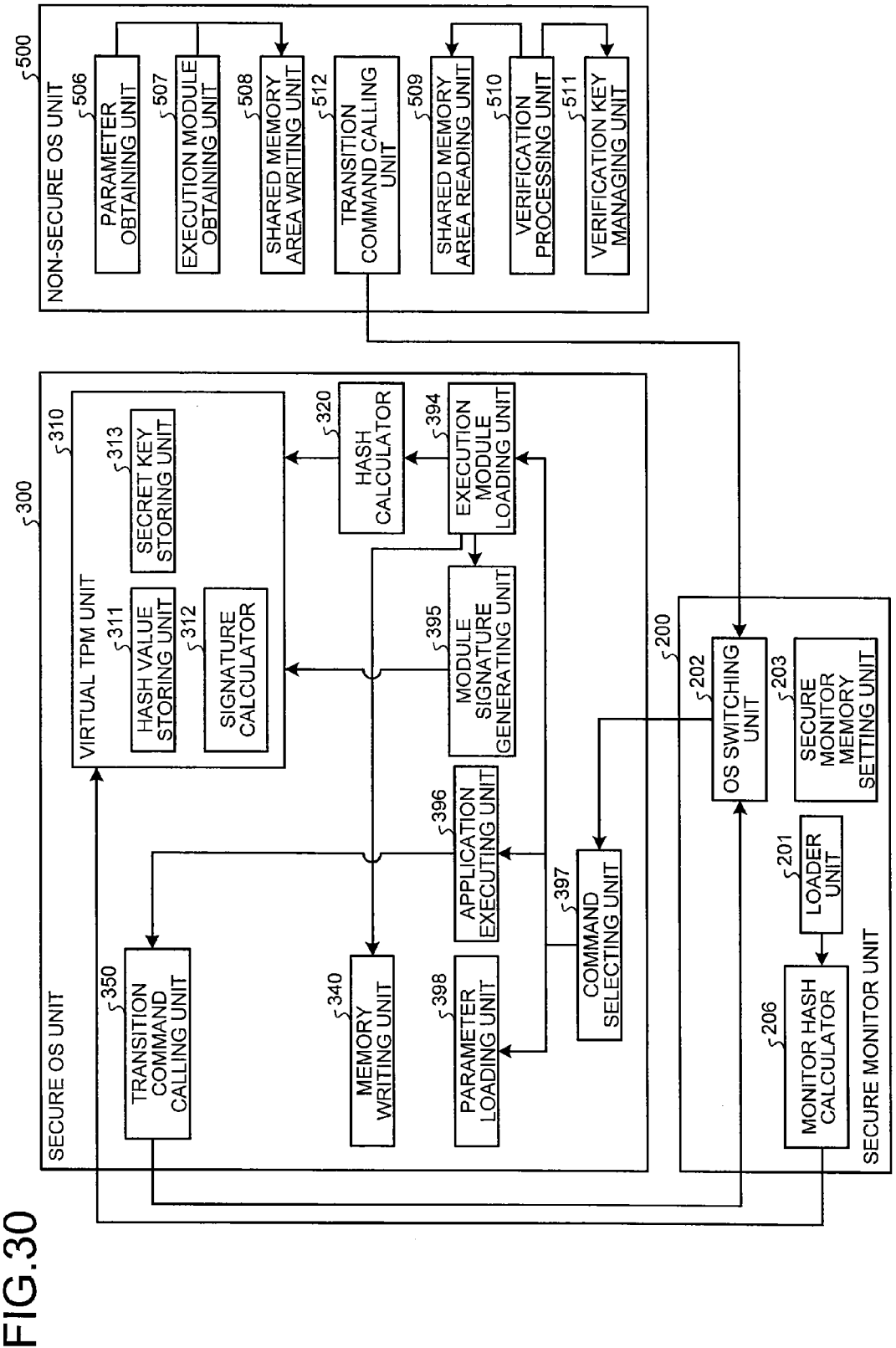
FIG. 30 is a functional configuration diagram of software components running in the main processor unit according to an eighth modification example of the third embodiment.

Although it is possible to store a plurality of hash values in the hash value storing unit 311, the hash values of execution modules can be stored in an area in which no values are stored or can be stored in an area in which the hash value of the secure OS unit 300 is stored. The configuration for such a case is illustrated in FIG. 30. As compared to the configuration illustrated in FIG. 27, the configuration illustrated in FIG. 30 differs in the way that the secure monitor unit 200 includes a monitor hash calculator 206.

Prior to the execution of the secure OS unit 300, the monitor hash calculator 206 calculates the hash value corresponding to the secure memory area 122, which is the memory area of the main memory unit 104 in which the secure OS unit 300 is stored. Then, that hash value is stored as one of the values in the hash value storing unit 311 of the virtual TPM unit 310 of the secure OS unit 300.

Meanwhile, prior to the execution of the secure OS unit 300, the hash value storing unit 311 is also not in operation.

For that reason, the hash value of the secure OS unit 300 can be calculated prior to the execution of the secure OS unit 300, and the hash calculator 320 of the secure OS unit 300 can be requested to store the hash value after the execution of the secure OS unit 300.

For example, assume that X represents the hash value of the secure OS unit 300. If that hash value of the secure OS unit 300 is input to the hash value storing unit 311, then the value of the hash value storing unit 311 becomes equal to the equation given below.

value of hash value storing unit 311=*f*(X∥0)

In that state, if the secure OS unit 300 stores the hash value of the execution module in the hash value storing unit 311 according to the flowchart illustrated in FIG. 29, then the value of the hash value storing unit 311 becomes equal to the equation given below.

value of hash value storing unit 311=*f*(hash value of execution module∥value of hash value storing unit 311)

Then, the signature calculator 312 performs a signing operation with respect to the obtained hash value using the secret key stored in the secret key storing unit 313, and sends the signed hash value to the verifier. Meanwhile, if the two hash values are not identical, then it means that either the execution module has been altered in an unauthorized manner, or the execution module was executed on a platform other than the secure OS unit 300 which is the expected platform for the verifier, or both of those cases hold true. Thus, the verifier can confirm whether or not the execution module was executed in the secure OS unit 300 as per the expectation of the verifier.

Ninth Modification Example

Figure 31:
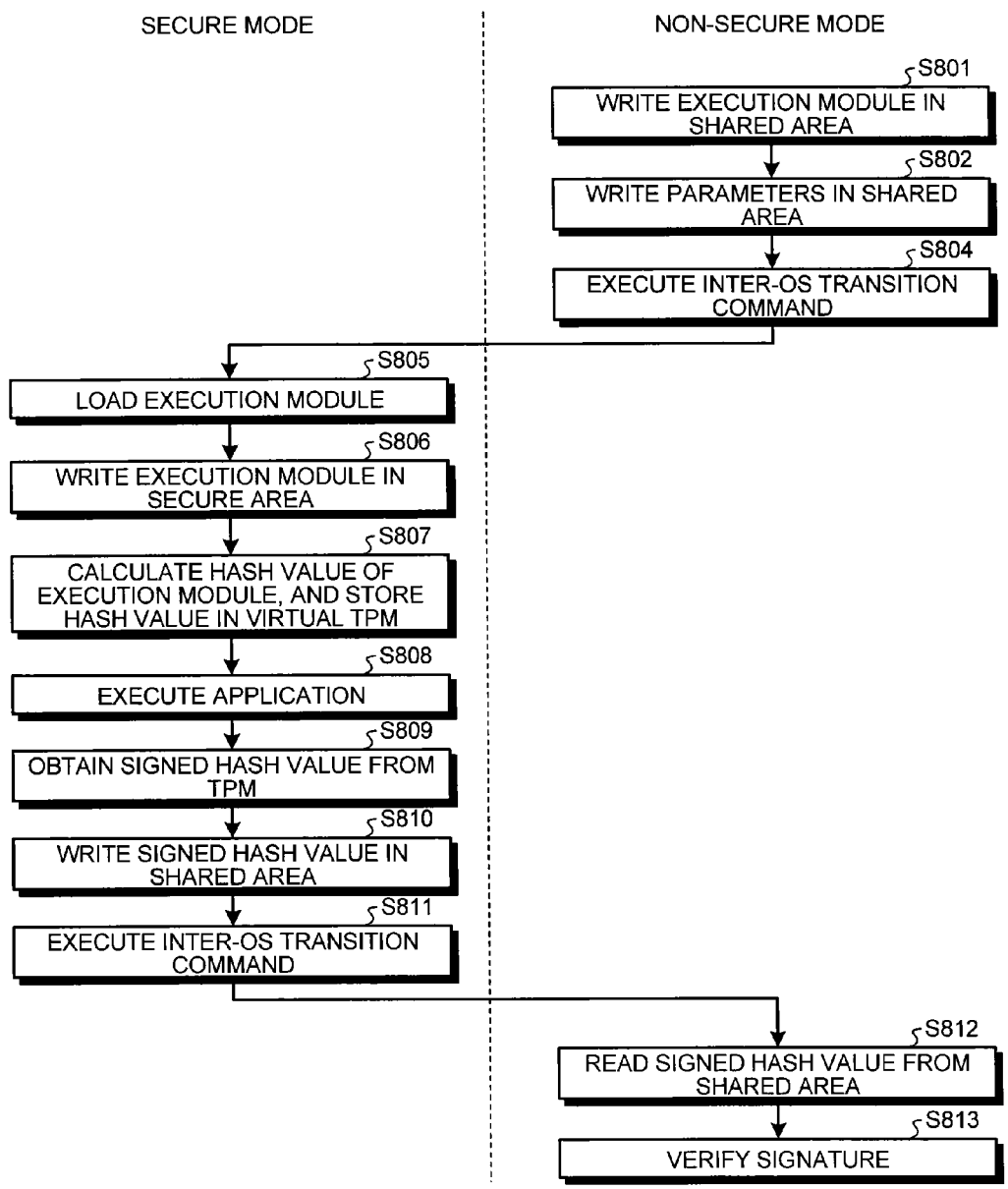
FIG. 31 is a flowchart for explaining the operations performed at the time of executing an execution module in the non-secure OS unit according to a ninth modification example of the third embodiment.

FIG. 31 is a diagram illustrating a different example of the flowchart illustrated in FIG. 29. In the flowchart illustrated in FIG. 29, the command for loading the execution module, the command for executing the execution module, and the command for verifying the execution module are separately executed, and inter-OS transition is done at the time of executing each command. In contrast, in the example illustrated in FIG. 31, all of those commands are executed in only a single inter-OS transition.

Herein, the operations performed from Step S801 to Step S807 are identical to the operations performed from Step S701 to Step S707 illustrated in FIG. 29. Subsequently, instead of performing inter-OS transition, the secure OS unit 300 executes the application program (Step S808). As may be necessary, the application program writes the processing result in the shared memory area 123.

Once the execution of the application program is completed, the secure OS unit 300 obtains the signed hash value corresponding to the execution module from the virtual TPM unit 310 (Step S809), and writes that value in the shared memory area 123 (Step S810). Then, the secure OS unit 300 performs inter-OS transition (Step S811).

Subsequently, the non-secure OS unit 500 reads the signed hash value from the shared memory area 123 (Step S812), and verifies the signature of that hash value using a public key that is possessed from before (Step S813). In this way, it is sufficient to perform inter-OS transition only once. As a result, the operations of executing the execution module as well as confirming the validness of the execution module, which was executed in the secure OS unit 300, from the non-secure OS unit 500 can be performed in a speedy manner.

Tenth Modification Example

Figure 32:
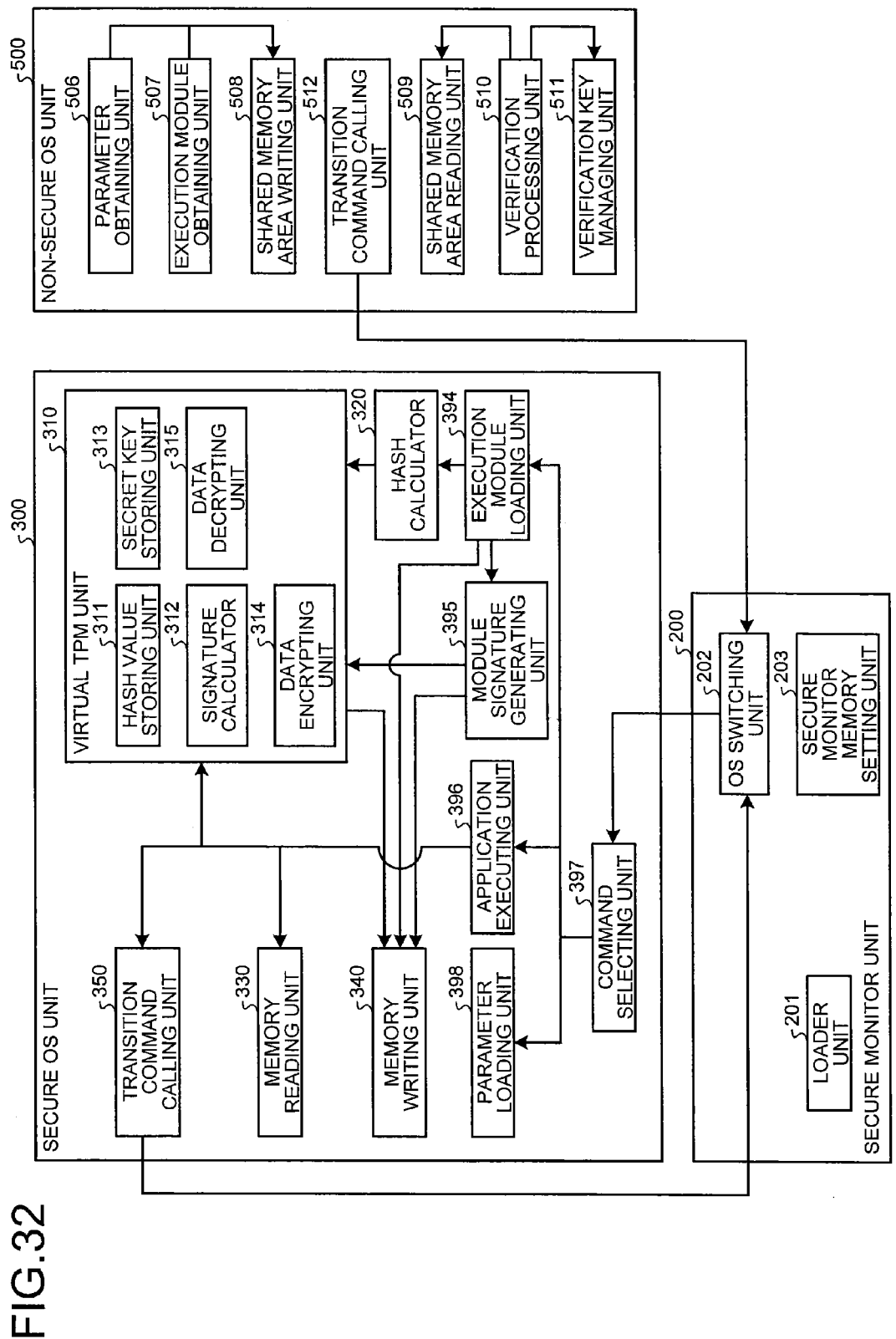
FIG. 32 is a functional configuration diagram of software components running in the main processor unit according to a tenth modification example of the third embodiment.

FIG. 32 is a diagram illustrating a different example of the configuration illustrated in FIG. 27. Herein, in addition to the configuration of the information processing device 100 illustrated in FIG. 27, the virtual TPM unit 310 includes a data encrypting unit 314 and a data decrypting unit 315; and the secure OS unit 300 includes the memory reading unit 330.

Moreover, it is assumed that the secret key storing unit 313 stores therein not only the secret key for public key encryption but also a common key for symmetric-key cryptography. Regarding the common key, the secret key storing unit 313 stores therein at least either a first common key used in the encryption of the secret key or a second common key used at the time of encrypting the data generated by the execution module. Alternatively, the first common key and the second common key can also be the same key. The data encrypting unit 314 performs data encryption in response to a request from the application executing unit 396 and using the common key stored in the secret key storing unit 313 of the virtual TPM unit 310. Moreover, the data encrypting unit 314 encrypts the secret key using the common key. The data decrypting unit 315 decrypts the encrypted data in response to a request from the application executing unit 396 and using the common key stored in the secret key storing unit 313 of the virtual TPM unit 310.

At the time of data encryption, the calculation is performed using the following equation in which the value of the hash value storing unit 311 serves as the argument.

encrypted data=g(common key of virtual TPM unit 310, data XOR value of hash value storing unit 311)

Herein, "g" represents cryptographic processing of symmetric-key cryptography such as AES or DES. Moreover, g(key, data) represents the function for encryption of "data" using AES with "key" serving as the key. Furthermore, the value of the hash value storing unit 311 is also involved in the encryption of data. The memory reading unit 330 obtains the encrypted data from the shared memory area 123.

Figure 33:
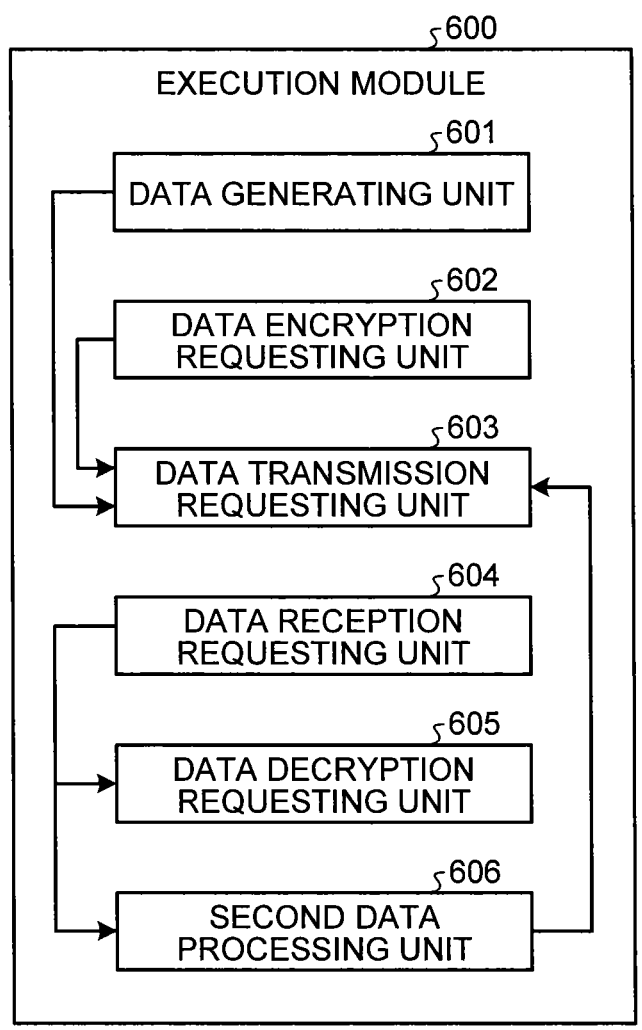
FIG. 33 is a functional configuration diagram of an execution module that is executed in a secure OS unit according to the tenth modification example of the third embodiment.

FIG. 33 is a block diagram illustrating an exemplary software configuration of an execution module 600 that is executed in the secure OS unit 300 illustrated in FIG. 32. The execution module 600 includes a data generating unit 601, a data encryption requesting unit 602, a data transmission requesting unit 603, a data reception requesting unit 604, a data decryption requesting unit 605, and a second data processing unit 606.

The data generating unit 601 generates data. For example, the data generating unit 601 generates a public key pair as the data using a public key algorithm. The data transmission requesting unit 603 requests the memory writing unit 340 of the secure OS unit 300 to write the data of an execution module in the shared memory area 123. The data encryption requesting unit 602 inputs data to the virtual TPM unit 310 and requests the virtual TPM unit 310 to encrypt the data using the common key stored in the secret key storing unit 313 of the virtual TPM unit 310. The data reception requesting unit 604 requests the memory reading unit 330 of the secure OS unit 300 to read the data from the shared memory area 123.

The data decryption requesting unit 605 inputs, to the virtual TPM unit 310, the data that has been received by the data reception requesting unit 604; and requests the virtual TPM unit 310 to decrypt the data using the common key stored in the secret key storing unit 313. The second data processing unit 606 inputs the data that has been received by the data reception requesting unit to the virtual TPM unit 310, and requests the virtual TPM unit 310 to calculate the signature value using the secret key stored in the secret key storing unit 313.

Figure 34:
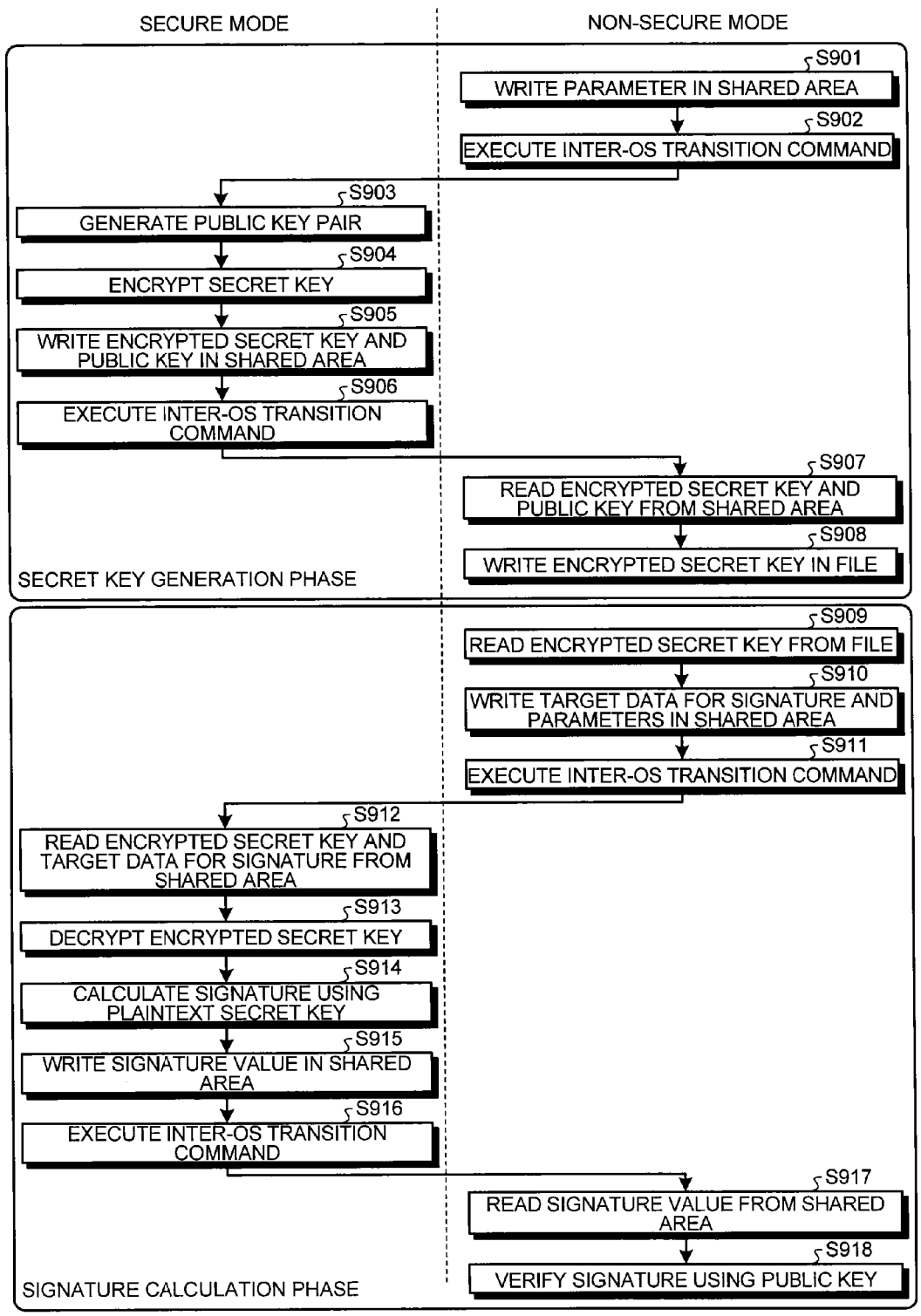
FIG. 34 is a flowchart for explaining the operations performed at the time of executing an execution module in the non-secure OS unit according to the tenth modification example of the third embodiment.

FIG. 34 is a flowchart for explaining the operations performed at the time of executing the execution module illustrated in FIG. 33 in the information processing device illustrated in FIG. 32. Herein, prior to the start of operations, it is assumed that the execution module 600 is written in the secure memory area A 122a, which is the memory area meant for execution modules in the main memory unit 104, according to the flowchart illustrated in FIG. 29 or FIG. 31; and that the execution module loading unit 394 has stored the hash value of the execution module 600 in the hash value storing unit 311 of the virtual TPM unit 310.

As illustrated in FIG. 34, the operations are divided into a secret key generation phase and a signature calculation phase. The feature of this embodiment is to ensure that neither any of the execution modules other than the execution module 600 that are executed in the secure OS unit 300 nor the non-secure OS unit 500 is able to read the value of the secret key generated by the data generating unit 601 of the execution module 600.

Firstly, the explanation is given about the secret key generation phase. As illustrated in FIG. 34, the non-secure OS unit 500 or an application program executed in the non-secure OS unit 500 (hereinafter, referred to as a non-secure application program) writes a command type, which indicates an instruction for generating a common key pair corresponding to the execution module 600, in the shared memory area 123 (Step S901). Then, the non-secure OS unit 500 performs inter-OS transition (Step S902).

The command selecting unit 397 of the secure OS unit 300 identifies that the command to be executed after the present transition indicates execution of the execution module, and calls the application executing unit 396. The execution module 600 refers to the command type and identifies that a public key pair generation command is issued, and generates the secret key and the public key using a predetermined public key algorithm (Step S903). As far as the public key algorithm is concerned; it is possible to use, for example, RSA or elliptic curve cryptography. Meanwhile, while generating the common key pair, the intermediate values that are temporarily stored in the main memory unit 104 are stored in the secure memory area A 122a that is meant for the data of execution modules. Since this memory area is specified as the secure memory area A 122a, the non-secure OS unit 500 or a non-secure application program cannot access that memory area.

Then, the execution module 600 uses the data encryption requesting unit 602 and requests the secure OS unit 300 to encrypt the secret key generated by the data generating unit 601 (Step S904). Then, the application executing unit 396 of the secure OS unit 300 calls the data encrypting unit 314 of the virtual TPM unit 310 and provides the plaintext secret key as the input. Then, the data encrypting unit 314 encrypts the secret key according to the following equation.

encrypted secret key=g(common key of virtual TPM unit 310, secret key XOR value of hash value storing unit 311)

Meanwhile, herein, a condition is assumed in which only the value of the execution module 600 is input to the value of the hash value storing unit 311 is stored. That is, it is assumed that the value of f(hash value of execution module 600∥0) is stored. Alternatively, the hash value of the execution module 600 can be stored in the hash value storing unit 311 after the hash value of the secure OS unit 300 has been stored. In that case, the value of the hash value storing unit 311 is the result of the following calculation.

value of hash value storing unit 311=f(hash value of execution module 600)∥f(hash value of secure OS unit 300∥0)

Then, the data encrypting unit 314 writes the encrypted secret key and the public key in the shared memory area 123 (Step S905) and performs inter-OS transition (Step S906). Subsequently, the non-secure OS unit 500 or the non-secure application program reads the encrypted secret key and the public key from the shared memory area 123 (Step S907) and writes each key as a file in the secondary storage unit 107 (Step S908). In this way, the secret key is encrypted by binding it to the hash value of the execution module 600.

Given below is the explanation of the signature calculation phase. Firstly, the non-secure OS unit 500 or the non-secure application program reads the encrypted secret key from the secondary storage unit 107 (Step S909) and writes it in the shared memory area 123. Then, the non-secure OS unit 500 writes a value, which indicates execution of the execution module 600 and an instruction to the execution module 600 to perform a signing operation, and the target data for signature as the command type in the shared memory area 123 (Step S910), and performs inter-OS transition (Step S911).

The command selecting unit 397 of the secure OS unit 300 reads the command type written in the shared memory area 123; identifies that the command to be executed after the present transition indicates the execution of the execution module, and calls the application executing unit 396. The execution module 600 reads the command type written in the shared memory area 123; identifies from the value that a signature generation command is issued; and further reads the secret key and the target data for signature from the shared memory area 123 (Step S912).

Subsequently, the execution module 600 uses the data decryption requesting unit 605 to decrypt the secret key with respect to the secure OS unit 300 (Step S913). The application executing unit 396 of the secure OS unit 300 calls the data decrypting unit 315 of the virtual TPM unit 310, and provides the encrypted secret key as the input. The data decrypting unit 315 decrypts the secret key using the following equation.

Plaintext secret key=g'(common key of virtual TPM unit 310, plaintext secret key XOR value of hash value storing unit 311)

Herein, g' represents decryption corresponding to the cryptographic processing of symmetric-key cryptography. Moreover, g'(key, data) represents the function for decryption of "data" using, for example, AES with "key" serving as the key.

Then, the signature calculator 312 makes use of the plaintext secret key that has been obtained as the output; calculates a signature value with respect to the target data for signature using a predetermined signature algorithm; and performs a signature in the target data (Step S914). Subsequently, the signature calculator 312 writes the signature value in the shares area (Step S915). Then, the secure OS unit 300 performs inter-OS transition (Step S916).

The non-secure OS unit 500 reads the signature value from the shared memory area 123 (Step S917). Then, as may be necessary, the non-secure OS unit 500 or the non-secure application program can verify the value of the signature using the public key (Step S918). However, the signature verification need not be performed in the information processing device 100, and can be performed in a device that possesses a public key and that is connected to a network.

The effect of performing the abovementioned operations is described below. Usually, at Step S912, the hash value of the execution module is stored in the hash value storing unit 311. Herein, assume that a different execution module 600, which is different than the execution module 600 that instructed encryption of the data, is loaded and attempts to perform decryption. At that time, since the hash value storing unit 311 is storing a value not representing the executing module 600 that instructed encryption of the data, it is not possible to obtain the plaintext secret key. It proves useful against an attack in which the power of the information processing device 100 is switched OFF, and the secondary storage unit 107, which stores therein the execution module 600, is physically removed, then the secondary storage unit 107 is connected with an external device and the external device alters the execution module 600.

If the execution module 600 is altered, then the hash value storing unit 311 happens to store a different hash value than the hash value of the original execution module 600, and the decryption using the altered execution module results in a failure. Moreover, if the value of the common key of the virtual TPM unit 310 is set to be different in each information processing device 100; then even in the case when the execution module 600 is executed in another information processing device and an attempt is made to decrypt the encrypted secret key is made in that information processing device, the value of the common key of the virtual TPM unit 310 does not match and the plaintext secret key cannot be obtained. Thus, it becomes possible to ensure that the encrypted secret key is decrypted only in the information processing device in which the secret key was encrypted and only by the execution module that had encrypted the secret key.

Meanwhile, in between the secret key generation phase and the signature calculation phase, the information processing device 100 may be rebooted. In that case, the execution module 600 is unloaded from the main memory unit 104. Then, prior to the signature calculation phase, the execution module 600 is again loaded according to the flowchart illustrated in FIG. 29 or FIG. 31, and the hash value of the execution module 600 is stored in the hash value storing unit 311.

Eleventh Modification Example

Figure 35:
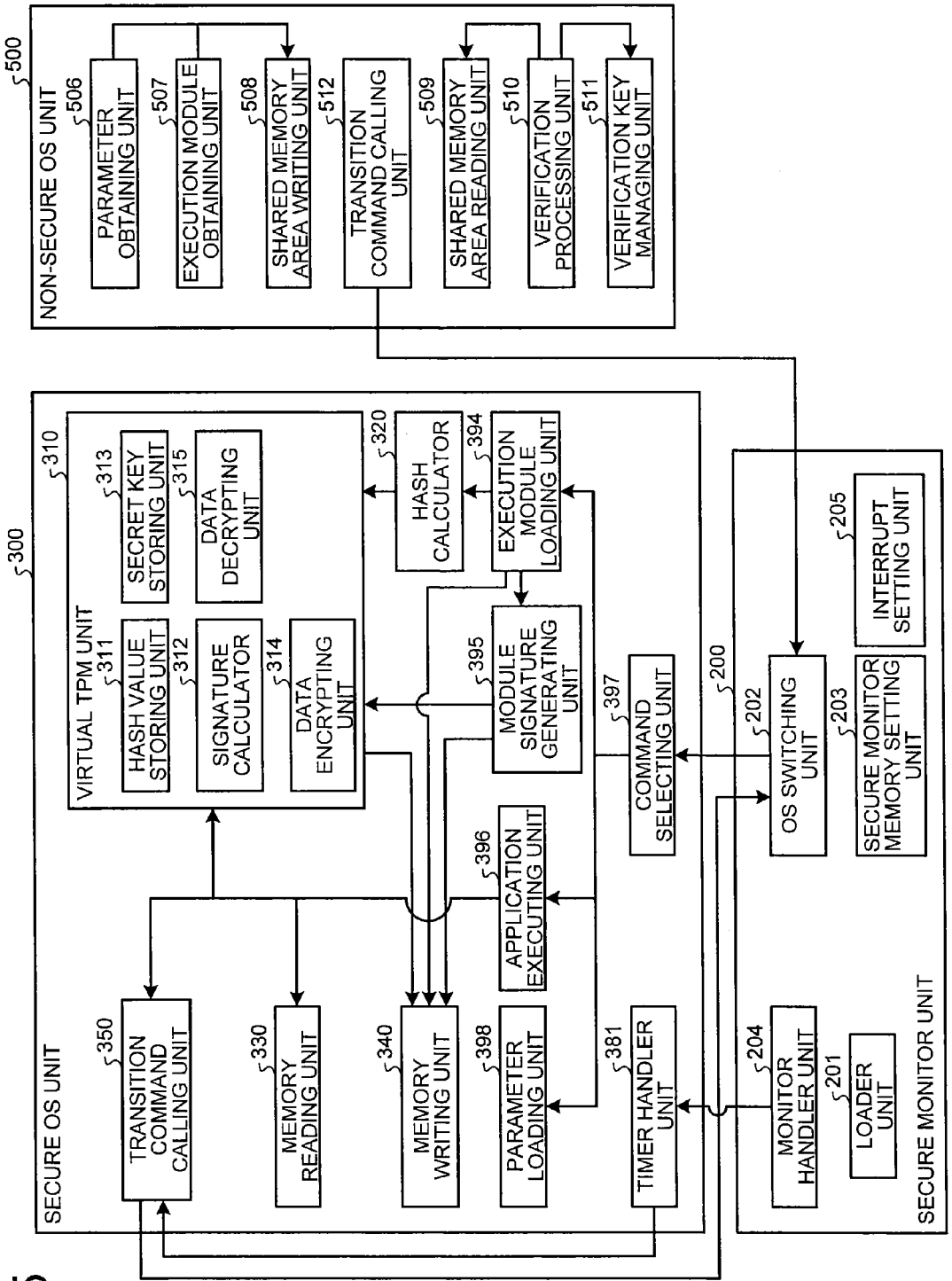
FIG. 35 is a functional configuration diagram of software components running in the main processor unit according to an eleventh modification example of the third embodiment.

FIG. 35 is a diagram illustrating a different example of the configuration illustrated in FIG. 32. As compared to the configuration illustrated in FIG. 32, the configuration illustrated in FIG. 35 differs in the way that the secure monitor unit 200 includes the interrupt setting unit 205 and the monitor handler unit 204; while the secure OS unit 300 includes a timer handler unit 381.

When a timer interrupt occurs in the main processor unit 101, the interrupt setting unit 205 performs setting in the main processor unit 101 to call the monitor handler unit 204. This setting operation is performed as one of the operations performed during the initialization of the secure monitor unit 200.

The monitor handler unit 204 is called when a timer interrupt occurs in the main processor unit 101. If the non-secure mode is the present operating state, then the monitor handler unit 204 stores the context of the non-secure OS unit 500 and switches the operating state to the secure mode. Then, the operations are transferred to the timer handler unit 381.

When a timer interrupt occurs, the timer handler unit 381 performs inter-OS transition using the transition command calling unit 350.

As explained with reference to FIG. 18, the main processor unit 101 can detect a timer interrupt. However, in the configuration illustrated in FIG. 35, during the execution of an execution module in the secure OS unit 300, if a timer interrupt occurs by the main processor unit 101, the operations of the execution module are terminated and transition to the non-secure OS unit 500 is done.

That is, if a timer interrupt occurs during the execution of an execution module, then the main processor unit 101 forcibly terminates the operations of the execution module and performs transition to the monitor handler unit 204 of the secure monitor unit 200. Then, the monitor handler unit 204 transfers the operations to the timer handler of the secure OS unit 300, and the timer handler of the secure OS unit 300 executes the transition command calling unit 350. As a result, the OS switching unit 202 stores the context of the secure OS unit 300 and performs transition to the non-secure OS unit 500. Meanwhile, in the case when the interval of occurrence of timer interrupts is short, the abovementioned determination need not be performed every time a timer interrupt occurs. For example, if the timer interrupt occurs for N number of times, the abovementioned determination can be performed at the time of occurrence of only one of the timer interrupts. In this way, it can be determined whether or not the N-th timer interrupt has occurred, that is, whether or not timeout has occurred.

With such a configuration, it becomes possible to prevent long stop in the operations of the non-secure OS unit 500. For example, since the operation of generating a public key pair based on a public key encryption algorithm is complex, there is a possibility that the operations of an execution module take a long period of time. In the configuration illustrated in FIG. 32, during this period, the non-secure OS unit 500 remains dormant. If the non-secure OS unit 500 or a non-secure application program needs to periodically perform operations such as a data obtaining operation using a sensor or network communication, then the data obtaining operation or network communication cannot be performed during the execution of the execution module. In order to prevent such a situation, the executable time of the execution module can be restricted using a timer. With that, it becomes possible to prevent a situation in which the non-secure OS unit 500 remains dormant for a long period of time.

Twelfth Modification Example

Figure 36:
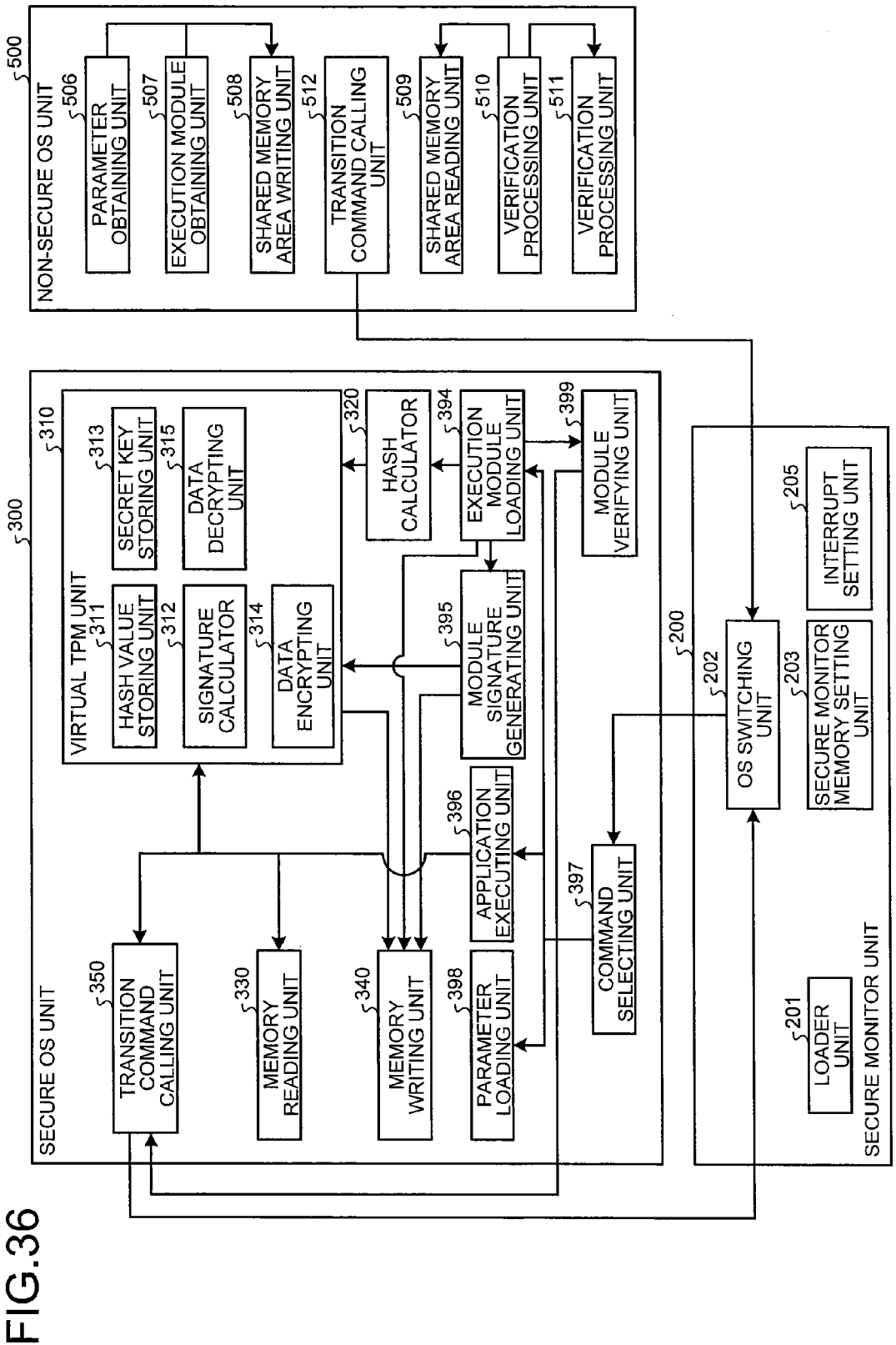
FIG. 36 is a functional configuration diagram of software components running in the main processor unit according to a twelfth modification example of the third embodiment.

FIG. 36 is a diagram illustrating a different example of the configuration illustrated in FIG. 32. As compared to the configuration illustrated in FIG. 32, the configuration illustrated in FIG. 36 differs in the way that the secure OS unit 300 includes a module verifying unit 399. In the configuration illustrated in FIG. 36, an execution module has a signature assigned thereto. Prior to the execution of the execution module by the application executing unit 396, the signature assigned to the execution module is verified and the execution module is executed only when the verification is successful.

Regarding the executing module explained with reference to FIG. 32, it is assumed that the format includes an execution code area, which is required for the execution of the execution module, and a data area such as an initial value. In contrast, regarding the executing module explained with reference to FIG. 36; in addition to the abovementioned areas, it is assumed that the format also includes a signature assigned to the execution module.

Meanwhile, the secret used in the signature can either be managed in the virtual TPM unit 310 or be managed in an external device such as an execution module distribution server (not illustrated).

FIG. 37 is a flowchart for explaining the operations performed at the time of executing the execution module, which is explained with reference to FIG. 33, in the information processing device illustrated in FIG. 36. Firstly, in the shared memory area 123, the non-secure OS unit 500 writes a signature verification public key (parameter), which corresponds to the secret key used in generating the signature of the execution module, along with the execution module (Steps S1001 and S1002). Moreover, in the shared memory area 123, the non-secure OS unit 500 writes a value indicating an execution command for the execution module 600 as the command type (Step S1003). Then, the non-secure OS unit 500 performs inter-OS transition (Step S1004).

Subsequently, the command selecting unit 397 of the secure OS unit 300 reads the command type from the shared memory area 123; identifies that the command to be executed after the present transition indicates execution of the execution module; and thus calls the execution module loading unit 394 and the application executing unit 396. Then, the execution module loading unit 394 of the secure OS unit 300 loads the execution module from the shared memory area 123 and writes it in the secure memory area 122 (Steps S1005 and S1006). Moreover, prior to the execution of the execution module, the secure OS unit 300 verifies the signature of the execution module using the public key (Step S1007). Herein, the signature can be a certificate having the chain structure formed with the public key infrastructure. That is, the public key serving as the root can be stored in the secret key storing unit 313 of the virtual TPM unit 310. If it becomes possible to verify the chained certificate using the public key and verify all chains, then it can be considered that verification of the execution module is successful.

If the verification is not successful (No at Step S1008), then the secure OS unit 300 deletes the execution module from the secure memory area 122 (Step S1011) and performs inter-OS transition to switch to the non-secure OS unit 500 (Step S1012). In this case, the execution module is not executed.

On the other hand, if the verification is successful (Yes at Step S1008), then the hash calculator 320 calculates the hash value of the execution module and stores it in the virtual TPM unit 310 (Step S1009). The subsequent operations can be performed in an identical manner to FIG. 32.

In this way, by giving a signature to an execution module, it becomes possible to confirm that the execution module has been distributed by a valid distributor and has not been altered. For example, if execution modules are given signatures by an information processing device, it becomes possible to apply a restriction by which only the execution modules confirmed in the information processing device are executed. That proves particularly useful in the case when there is a risk of alteration of the execution modules in the secondary storage unit 107.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a main memory unit configured to store data;
a main processor unit configured to
selectively switch between a secure mode and a non-secure mode,
read and write data from and to the main memory unit, and
write an OS execution image to the main memory unit, the main processor unit including a state sending unit for sending state information indicating a present mode of the main processor unit to a bus;
a secure OS unit configured to be executed by the main processor unit in the secure mode;
an execution module configured to be executed by the main processor unit in the secure mode;
a non-secure OS unit configured to be executed by the main processor unit in the non-secure mode;
a secure monitor memory setting unit configured to set a shared memory area and an execution module memory area, the shared memory area allowing reading and writing in the secure mode and the non-secure mode of the main processor unit, the execution module memory area allowing reading and writing in the secure mode of the main processor unit and not allowing reading or writing in the non-secure mode of the main processor unit;
an address space control unit configured to
determine the present mode of the main processor unit based on the state information received from the bus, and
control allowing and disallowing of reading and writing with respect to the main memory unit from the main processor unit according to settings performed by the secure monitor memory setting unit;
a shared memory area writing unit configured to write an execution module to be executed in the secure OS unit to the shared memory area of the main memory unit;
an execution module loading unit configured to write the execution module that has been written to the shared memory area, to the execution module memory area; and
an application executing unit configured to execute the execution module that has been written to the execution module memory area.

2. The device according to claim 1, further comprising:
a command selecting unit configured to determine whether a command issued by the non-secure OS unit to the secure OS unit indicates writing of the execution module to the execution module memory area of the main memory unit or indicates execution of the execution module, wherein
the execution module loading unit is configured to write the execution module that has been written to the shared memory area, to the execution module memory area when a command issued by the non-secure OS unit indicates writing of the execution module to the execution module memory area of the main memory unit,
the application executing unit is configured to execute the execution module that has been written to the execution module memory area when a command issued by the non-secure OS unit indicates execution of the execution module,
the shared memory area writing unit is configured to be executed in the non-secure mode, and
the execution module loading unit and the application executing unit are configured to be executed in the secure mode.

3. The device according to claim 1, further comprising:
a command selecting unit configured to determine whether a command issued by the non-secure OS unit to the secure OS unit indicates verification of a signature of the execution module;
a hash value calculator configured to calculate a hash value of the execution module that has been written to the execution module memory area and store the calculated hash value therein; and
a verification unit configured to verify a signature of the execution module using the calculated hash value and a public key when the command selecting unit determines that a command issued by the non-secure OS unit indicates verification of a signature of the execution module, wherein
the verification unit and the hash value calculator are configured to be executed in the secure mode.

4. The device according to claim 1, further comprising:
a key storing unit configured to store a common key;
a key generating unit configured to generate a secret key and a public key;
a data encrypting unit configured to write an encrypted secret key obtained by encrypting the secret key using the common key stored in the key storing unit, and a public key to the shared memory area; and
a module signature generating unit configured to read data from the shared memory area, and generate a signature using the read data and the secret key, wherein
the data encrypting unit and the module signature generating unit are configured to be executed in the secure mode.

5. The device according to claim 3, further comprising:
a second key storing unit configured to store a second common key; and
a second data encrypting unit configured to
encrypt data using the hash value of the execution module as calculated by the hash value calculator and using the second common key stored in the second key storing unit, and
write the encrypted data to the shared memory area, wherein
the second data encrypting unit is configured to be executed in the secure mode.

6. The device according to claim 1, further comprising:
a timer handler unit configured to
detect a timer interrupt, and
switch the main processor unit from one mode to another mode every time a predetermined time period elapses.

7. An information processing device comprising:
a main memory unit configured to store data;
a main processor unit configured to selectively switch between a secure mode and a non-secure mode, the main processor unit including a state sending unit for sending state information indicating a present mode of the main processor unit to a bus;
a secure OS unit configured to be executed by the main processor unit in the secure mode;
a non-secure OS unit configured to be executed by the main processor unit in the non-secure mode;
a secure monitor memory setting unit configured to set a shared memory area and a non-secure OS unit memory area, the shared memory area allowing reading and writing in the secure mode and the non-secure mode of the main processor unit, the non-secure OS unit memory area allowing writing an OS execution image of the non-secure OS unit;
an address space control unit configured to
determine the present mode of the main processor unit based on the state information received from the bus, and
control allowing and disallowing of reading and writing with respect to the main memory unit from the main processor unit according to settings performed by the secure monitor memory setting unit;
a shared memory area writing unit configured to write an execution module to be executed in the secure OS unit to the shared memory area of the main memory unit; and
a boot loader unit configured to write the OS execution image of the non-secure OS unit to a predetermined memory area of the main memory unit in the non-secure mode at a time of booting of the device, wherein
the secure OS unit is configured to
compare a hash value calculated from the OS execution image of the non-secure OS unit that has been written to the non-secure OS unit memory area, with an expected value of the hash value of the OS execution image of the non-secure OS unit, and
determine that the data of the non-secure OS unit is correct and allow execution of the non-secure OS unit when the hash value and the expected value are identical.

8. The device according to claim 7, wherein
the secure monitor memory setting unit is configured to allow writing to the non-secure OS unit memory area in the secure mode and not allow writing to the non-secure OS unit memory area in the non-secure mode,
the boot loader unit is configured to write the OS execution image of the non-secure OS unit to the shared memory area, and
the secure OS unit is configured to copy a first portion of the OS execution image of the non-secure OS unit from the shared memory area to the non-secure OS unit memory area, the first portion being a portion from which calculation of the hash value is completed.

9. The device according to claim 7, further comprising:
a monitor handler unit configured to perform exception processing to switch from the non-secure mode to the secure mode when an access that is not allowed is attempted in the address space control unit, wherein
the secure monitor memory setting unit is configured to set the non-secure OS unit memory area as a memory area that is allowed to be accessed for reading and not allowed to be accessed for writing in the non-secure mode,
the boot loader unit is configured to send a command to write the OS execution image of the non-secure OS unit to the non-secure OS unit memory area in the non-secure mode at the time of booting,
the monitor handler unit is configured to switch to the secure mode and hand over operations to the secure OS unit when the command for writing to the non-secure OS unit memory area is sent by the boot loader unit, and
the secure OS unit is configured to copy the OS execution image of the non-secure OS unit to the non-secure OS unit memory area in the secure mode.

10. The device according to claim 7, further comprising:
a timer handler unit configured to
detect a timer interrupt, and
switch the main processor unit to the secure mode every time a predetermined time period elapses, wherein
the secure OS unit is configured to
calculate the hash value for a portion of the OS execution image of the non-secure OS unit stored in the main memory unit for which hash value calculation is not yet completed when the timer handler unit performs operations for the timer interrupt, and switch the main processor unit back to the non-secure mode that was present prior to the start of the operations for the timer interrupt upon completion of the hash value calculation.

11. The device according to claim 7, further comprising:
a timer handler unit configured to
detect a timer interrupt, and
switch the main processor unit to the secure mode every time a predetermined time period elapses, wherein
the secure OS unit is configured to
calculate the hash value of the OS execution image of the non-secure OS unit stored in the main memory unit,
compare the hash value with an expected value of the hash value of the OS execution image of the non-secure OS unit, and
identify whether the non-secure OS unit has been altered and instruct the non-secure OS unit to perform predetermined error processing when the hash value and the expected value are not identical.

12. A computer program product comprising a non-transitory computer-readable medium containing a program executed by a computer that includes a main memory unit configured to store data, and a main processor unit configured to selectively switch between a secure mode and a non-secure mode, read and write data from and to the main memory unit, and write an OS execution image to the main memory unit, the main processor unit including a state sending unit for sending state information indicating a present mode of the main processor unit to a bus, wherein the program causes the computer to:

execute, by the main processor unit, a secure OS unit in the secure mode;

execute, by the main processor unit, an execution module in the secure mode;

execute, by the main processor unit, a non-secure OS unit in the non-secure mode;

set a shared memory area and an execution module memory area, the shared memory area allowing reading and writing in the secure mode and the non-secure mode of the main processor unit, the execution module memory area allowing reading and writing in the secure mode of the main processor unit and not allowing reading or writing in the non-secure mode of the main processor unit;

determine the present mode of the main processor unit based on the state information received from the bus;

control allowing and disallowing of reading and writing with respect to the main memory unit from the main processor unit according to the setting;

write the execution module to be executed in the secure OS unit to the shared memory area of the main memory unit;

write the execution module that has been written to the shared memory area, to the execution module memory area; and execute the execution module that has been written to the execution module memory area.

13. The computer program product according to claim 12, wherein the program further causes the computer to:
determine whether a command issued by the non-secure OS unit to the secure OS unit indicates writing of the execution module to the execution module memory area of the main memory unit or indicates execution of the execution module;

upon writing the execution module, write the execution module that has been written to the shared memory area, to the execution module memory area when a command issued by the non-secure OS unit indicates writing of the execution module to the execution module memory area of the main memory unit; and upon executing the execution module, execute the execution module that has been written to the execution module memory area when a command issued by the non-secure OS unit indicates execution of the execution module, wherein the writing of the execution module to be executed in the secure OS unit is executed in the non-secure mode, and
the writing of the execution module to the execution module memory area and the executing the execution module are executed in the secure mode.

14. The computer program product according to claim 12, wherein the program further causes the computer to:
determine whether a command issued by the non-secure OS unit to the secure OS unit indicates verification of a signature of the execution module;

calculate a hash value of the execution module that has been written to the execution module memory area and store the calculated hash value therein; and verify a signature of the execution module using the calculated hash value and a public key when the command selecting unit determines that a command issued by the non-secure OS unit indicates verification of a signature of the execution module, wherein the calculation of the hash value and the verification of the signature are executed in the secure mode.

15. The computer program product according to claim 12, wherein the program further causes the computer to:
store a common key to a key storing unit;
generate a secret key and a public key;
write an encrypted secret key obtained by encrypting the secret key using the common key stored in the key storing unit, and a public key to the shared memory area;
read data from the shared memory area; and
generate a signature using the read data and the secret key, wherein
the writing of the encrypted secret key and the generation of the signature are executed in the secure mode.

16. The computer program product according to claim 14, wherein the program further causes the computer to:
store a second common key to a second key storing unit;
encrypt data using the hash value of the execution module as calculated by the hash value calculator and using the second common key stored in the second key storing unit; and
write the encrypted data to the shared memory area, wherein
the encryption of the data is executed in the secure mode.

17. The computer program product according to claim 12, wherein the program further causes the computer to:
detect a timer interrupt, and
switch the main processor unit from one mode to another mode every time a predetermined time period elapses.

* * * * *